United States Patent
Katou et al.

(10) Patent No.: US 8,836,186 B2
(45) Date of Patent: Sep. 16, 2014

(54) BUS BAR DEVICE, STATOR, MOTOR AND MANUFACTURING METHOD FOR STATOR

(75) Inventors: Hiroshi Katou, Toyokawa (JP); Yukihide Ishino, Kosai (JP)

(73) Assignee: Asmo Co., Ltd, Shizuoka-ken (JP)

( * ) Notice: Subject to any disclaimer, the term of this patent is extended or adjusted under 35 U.S.C. 154(b) by 325 days.

(21) Appl. No.: 13/443,412

(22) Filed: Apr. 10, 2012

(65) Prior Publication Data

US 2012/0262014 A1 Oct. 18, 2012

(30) Foreign Application Priority Data

Apr. 15, 2011 (JP) ................................. 2011-091585

(51) Int. Cl.
  *H02K 11/00* (2006.01)
(52) U.S. Cl.
  USPC .......................................................... 310/71
(58) Field of Classification Search
  CPC .............................. H02K 5/225; H02K 3/522
  USPC ........................................... 310/71, 180, 184
  See application file for complete search history.

(56) References Cited

U.S. PATENT DOCUMENTS

2004/0251752 A1* 12/2004 Shinzaki et al. ................ 310/71
2010/0033044 A1* 2/2010 Isshiki et al. .................... 310/71

FOREIGN PATENT DOCUMENTS

JP 3430839 B2 5/2003

* cited by examiner

*Primary Examiner* — Hanh Nguyen
(74) *Attorney, Agent, or Firm* — Christensen Fonder P.A.

(57) ABSTRACT

A bus bar device electrically connects a plurality of coils arranged along a circumferential direction of the bus bar device to form an annular shape in entirety. A plurality of bus bars is arranged so that a plurality of layers is formed in a radial direction of the bus bar device. Each of the bus bars is formed from an arc-shaped conductive wire. A plurality of connection wires is respectively connected to the plurality of coils. The connection wires are arranged to overlap the bus bars and intersect the bus bars in the axial direction. Intersection portions at which the bus bars and the connection wires intersect include connection intersection portions at which the connection wires are electrically connected to the bus bars.

13 Claims, 17 Drawing Sheets

BUS BAR DEVICE, STATOR, MOTOR AND MANUFACTURING METHOD FOR STATOR

BACKGROUND OF THE INVENTION

The present invention relates to a bus bar device for electrically connecting a plurality of coils provided in a motor, a stator including the bus bar device, a motor including the bus bar device, and a method for manufacturing a stator including the bus bar device.

There is a conventional brushless motor including a bus bar device having a plurality of bus bars for electrically connecting a plurality of coils arranged in a circumferential direction and supplying current from an external power supply to the coils. Japanese Patent No. 3430839 describes an example of a bus bar device including a plurality of bus bars held by an annular bus bar holder. Each of the bus bars has an arcuate shape and is formed from a linear coated conductive wire covered by an insulative coating. A connection wire is formed on each of the two ends of each bus bar. The connection wire extends in a radial direction of the bus bar device and projects radially outward from the bus bar holder. The bus bar device is arranged on one axial end of a stator core around which the plurality of coils is wound. The connection wires and ends of the coils are arranged in parallel radially outward from the bus bar holder. Then, connection terminals are mounted on the connection wires and the ends of the coils that are arranged in parallel to one another so as to surround the peripheries of the connection wires and the ends of the coils. The connection wires and the ends of coils are electrically connected to one another by swaging the connection terminals, the connection wires and the ends of the coils.

In the bus bar device described in Japanese Patent No. 3430839, the bus bars are formed from linear coated conductive wires. Hence, scrap materials are less prone to be generated and yield is high. However, the connection wires extend radially outward from the arcuate bus bars, and project radially outward of the bus bar holder. This has resulted in a problem in which the bus bar device is increased in size in the radial direction. Accordingly, it is difficult to reduce the size of the motor, which includes the bus bar device, in the radial direction.

SUMMARY OF THE INVENTION

It is an object of the present invention to provide a bus bar device including bus bars formed from conductive wires that can be reduced in size in the radial direction, a stator including the bus bar device, a motor including the bus bar device, and a method for manufacturing the stator including the bus bar device.

To achieve the above object, a first aspect of the present invention provides a bus bar device electrically connecting a plurality of coils arranged along a circumferential direction to form an annular shape in entirety. The bus bar device includes the circumferential direction, a radial direction, and an axial direction. A plurality of bus bars is arranged to form a plurality of layers in the radial direction. Each of the bus bars is formed from an arc-shaped conductive wire. A plurality of connection wires is respectively connected to the coils. The connection wires are arranged to overlap the bus bars in the axial direction and intersect with the bus bars. The bus bars and the connection wires intersect at intersection portions including connection intersection portions at which the plurality of connection wires is electrically connected to the bus bars.

A second aspect of the present invention provides a stator. The stator includes the coils arranged along the circumferential direction, and the bus bar device according to the first aspect arranged on one side of the coils in the axial direction. The bus bars are arranged so as to form a plurality of layers within a range of widths of the coils in the radial direction.

A third aspect of the present invention provides a motor including the stator according to the second aspect and a rotor arranged inside the stator.

A fourth aspect of the present invention provides a method for manufacturing the stator according to the second aspect. The stator manufacturing method includes the following steps. A step of preparing the coils arranged along the circumferential direction. The connection wires, which are formed by ends of the coils, extend along the direction. A step of arranging the bus bars at a side of one end of the coils in the axial direction so that the bus bars form a plurality of layers in the direction. A step of arranging the connection wires on the bus bars so that the connection wires overlap with the bus bars and intersect with the bus bars in the axial direction by bending the ends of the coils. A step of welding the connection intersection portions in the intersection portions, at which the connection wires and the bus bars intersect, and electrically connecting the connection wires and the bus bars.

A fifth aspect of the present invention is a method for manufacturing the stator according to the second aspect. The stator manufacturing method includes the following steps. A step of arranging a plurality of core segments, around which the coils are respectively wound, along the circumferential direction. The core segments are arranged so that ends of the coils, which extend straight along an axial direction of the core segments, are radially arranged inside the core segments. A step of arranging the bus bars on the ends of the radially arranged coils. The bus bars are arranged so that the bus bars are overlapped with each other in the radial direction to form a plurality of layers and so that the bus bars overlap and intersect the ends of the coils in the axial direction. A step of welding the connection intersection portions in the intersection portions, at which the ends of the coils and the bus bars intersect, and electrically connecting the ends of the coils, which form the connection wires, and the bus bars. A step of bending the ends of the coils outside the bus bars in the radial direction to arrange the bus bars at a side of one end of the core segments in the axial direction and connecting the core segments along the circumferential direction to form an annular stator core.

BRIEF DESCRIPTION OF THE DRAWINGS

The invention, together with objects and advantages thereof, may best be understood by reference to the following description of the presently preferred embodiments together with the accompanying drawings in which.

DESCRIPTION OF THE PREFERRED EMBODIMENTS

First Embodiment

A first embodiment of the present invention will now be described with reference to the drawings.

Figure 1:
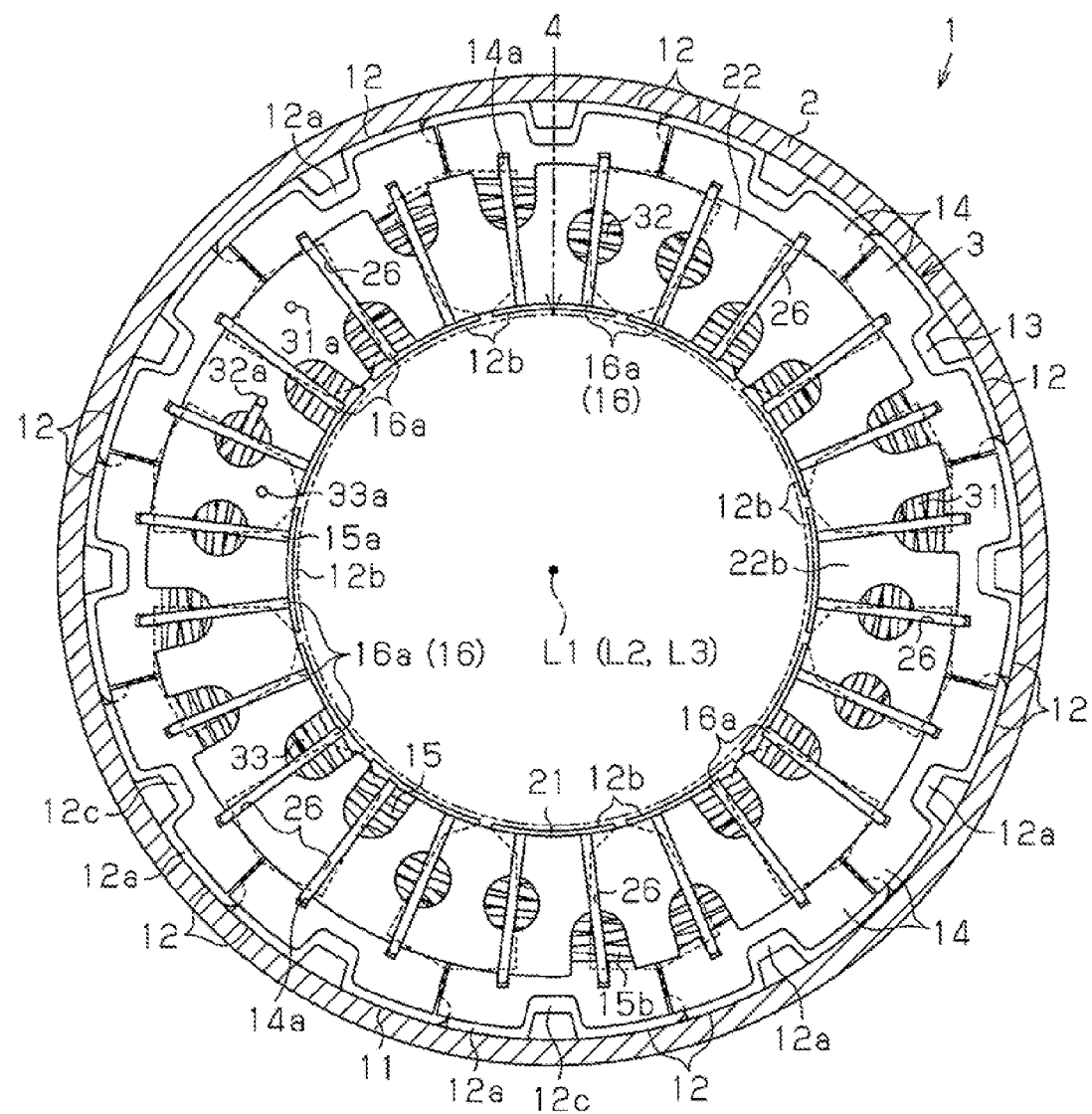
FIG. 1 is a cross-sectional view of a brushless motor according to a first embodiment of the present invention.
Figure 2A:
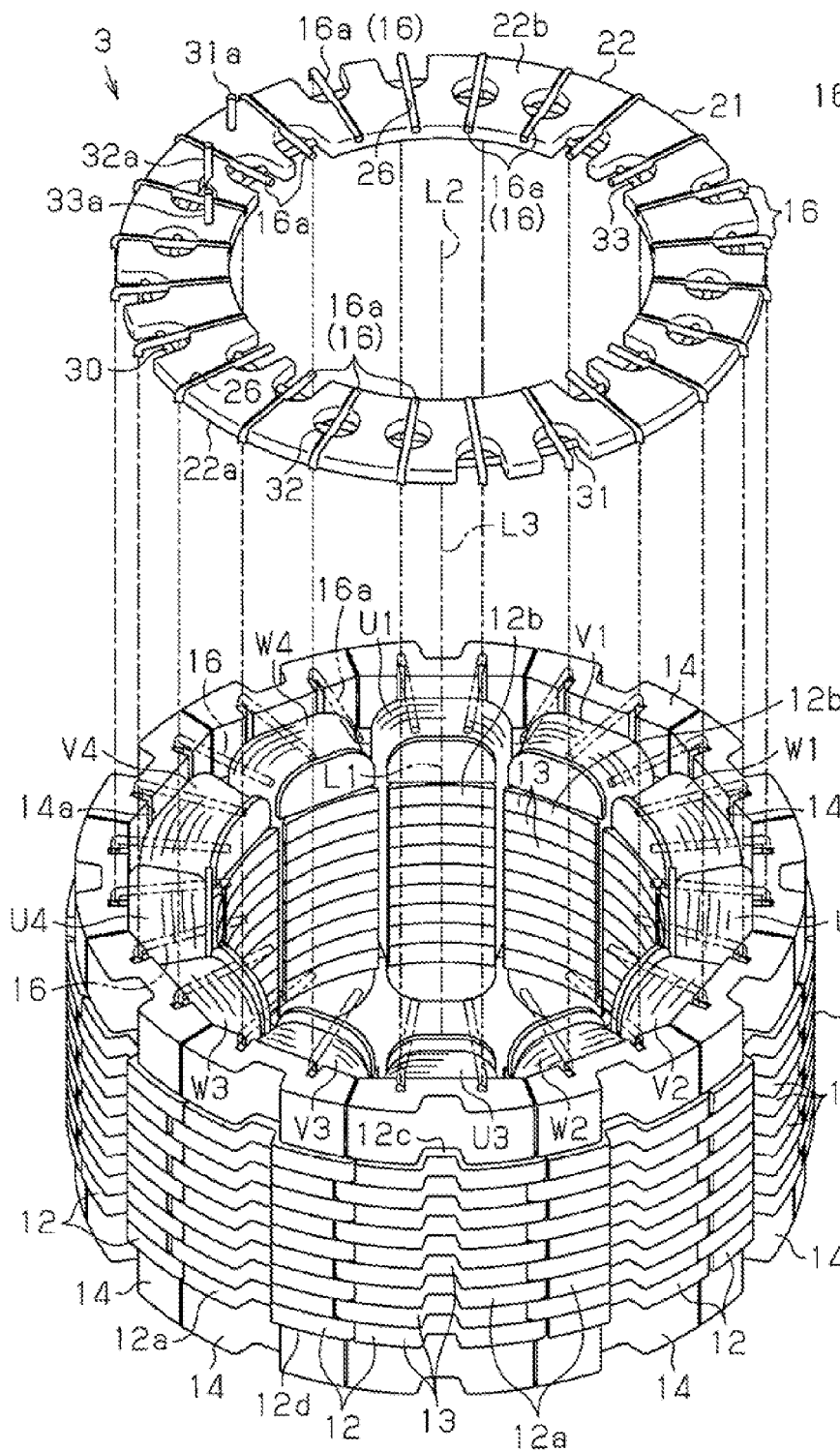
FIG. 2A is an exploded perspective view of a stator shown in FIG. 1.

As shown in FIG. 1, a brushless motor 1 of the first embodiment includes a housing case 2, which is cylindrical and has a closed end, an annular stator 3, which is press-fitted and fixed to an inner peripheral surface of the housing case 2, and a rotor 4, which is arranged in the stator 3 so as to be rotatable in a circumferential direction. As shown in FIG. 2A, the stator 3 includes a substantially annular stator core 11, a plurality of (twelve in the first embodiment) coils U1 to U4, V1 to V4, and W1 to W4, which are wound around the stator core 11, and a bus bar device 21, which supplies power to the coils U1 to U4, V1 to V4, and W1 to W4. In the description hereafter, the "axial direction", "radial direction," and "circumferential direction" respectively mean the axial direction, radial direction, and circumferential direction of the bus bar device 21 unless otherwise specified. The axial direction, radial direction, and circumferential direction of the bus bar device 21 respectively correspond to the axial direction, radial direction, and circumferential direction of each of the brushless motor 1 and the stator 3.

As shown in FIGS. 1 and 2A, the stator core 11 is formed to be annular by connecting twelve core segments 12 in the circumferential direction. Each core segment 12 is T-shaped as viewed from the axial direction. Each core segment 12 includes a connection portion 12a, which is arcuate as viewed from the axial direction, and a tooth 12b, which extends radially inward from a central part of the connection portion 12a in the circumferential direction. A plurality of core sheets 13 is formed by punching a magnetic steel plate into a predetermined shape in a pressing process. The core segment 12 is formed by stacking the plurality of core sheets 13 so that thickness-wise direction of the core sheets 13 coincide with the direction of a center axis L1 of the connection portion 12a. Insulators 14 are mounted from the two axial ides of each of the core segments 12 to cover two end surfaces 12c and 12d of the core segment 12 in the axial direction, two side surfaces of the tooth 12b in the circumferential direction, and a radially inner surface of the connection portion 12a. The insulator 14 is made of an insulative synthetic resin.

Figure 2B:
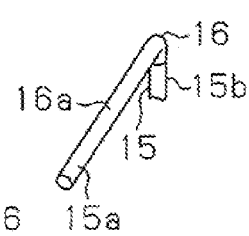
FIG. 2B is an enlarged perspective view of a connection end shown in FIG. 2A.

The coils U1 to U4, V1 to V4, and W1 to W4 are wound around the plurality of teeth 12b by winding coated conductive wires 15 around the insulators 14. The core segments 12 and the coils U1 to U4, V1 to V4, and W1 to W4 are insulated from one another by the insulators 14, which are arranged between the core segments 12 and the coils U1 to U4, V1 to V4, and W1 to W4. As shown in FIG. 2B, the coated conductive wire 15 is formed by covering an outer circumferential surface of a conductive metal wire 15a with an insulative coating 15b.

As shown in FIG. 2A, connection ends 16 which are winding-starting ends and winding-ending ends of each of the coils U1 to U4, V1 to V4, and W1 to W4 are drawn out to one side (upper side in FIG. 2A) of each of the coils U1 to U4, V1 to V4, and W1 to W4 in the axial direction. As shown in FIG. 2B, in each of the connection ends 16, the insulative coating 15b is removed and the metal wire 15a is exposed. As shown in FIG. 2A, two end holding portions 14a, which are formed by grooves extending in the axial direction, are formed on each insulator 14. In the insulator 14, the two end holding portions 14a are formed on both sides of the tooth 12b in the circumferential direction and in the vicinity of basal part of the teeth 12b. The end holding portions 14a open at both axial sides and the radially inner side. A total of twenty-four end holding portions 14a formed on the twelve insulators 14 are arranged on one axial side (i.e., side in which the connection end 16 is drawn out) of the stator core 11 at equal angular intervals (15° intervals in the first embodiment) in the circumferential direction. The connection end 16 serving as the winding-starting end and the connection end 16 serving as the winding-ending end of each of the coils U1 to U4, V1 to V4, and W1 to W4 are drawn out from both axial sides of the teeth 12b in the circumferential direction proximal to the basal parts of the teeth 12b, and parts near the bases of the connection ends 16 are inserted into the proximal end holding portions 14a and held by the end holding portions 14a. The parts near the bases of the connection ends 16 are held by the end holding portions 14a. This maintains the bases of the connection ends 16 at fixed positions with respect to the stator core 11. A portion of the connection end 16 that is closer to its distal than a portion held by the end holding portion 14a is bent inward in the radial direction. A portion of the connection end 16 from the bent portion to the distal end defines the connection wire 16a, which extends along the radial direction. That is, in the first embodiment, the connection wire 16a is formed from the connection end 16. Each of the connection wires 16a is slightly longer than the teeth 12b in the radial direction, and the total of twenty-four connection wires 16a are arranged next to one another at equal angular intervals (15° intervals in the first embodiment) in the circumferential direction so as not to overlap one another in the axial direction.

The stator core 11 is formed by molding the twelve core segments 12 to be annular so that distal ends of the teeth 12b face a radially inward direction after the insulators 14 are mounted on the core segments 12 and the coated conductive wires 15 are wound. In the stator 3 of the first embodiment, the twelve coils U1 to U4, V1 to V4, and W1 to W4 are arranged in a clockwise direction along the circumferential direction from the upper and farther side as viewed in FIG. 2A in the order of coil U1, coil V1, coil W1, coil U2, coil V2, coil W2, coil U3, coil V3, coil W3, coil U4, coil V4, and coil W4.

Figure 3:
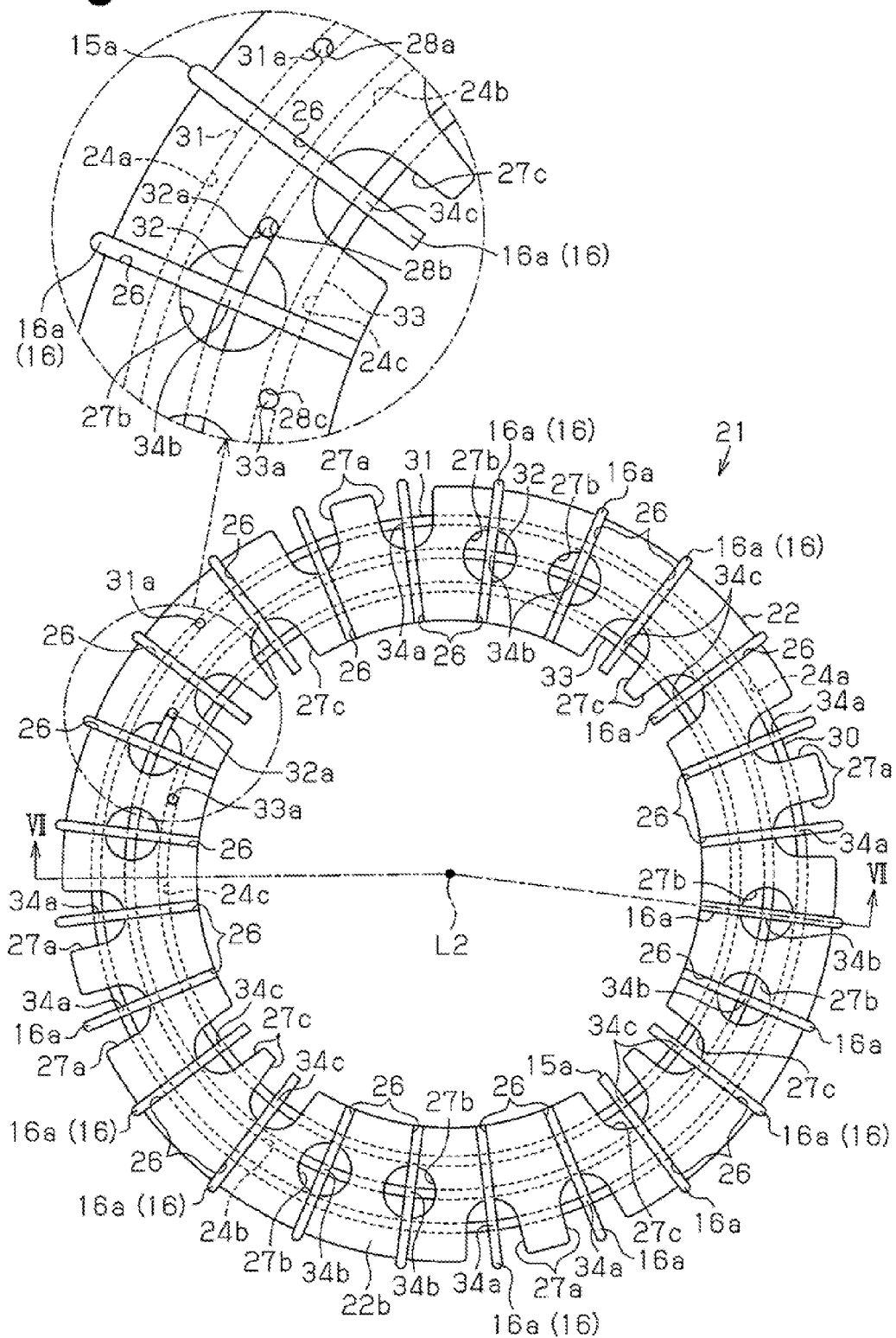
FIG. 3 is a plan view of a bus bar device shown in FIG. 1.

The bus bar device 21 is arranged at one axial side of the stator core 11, that is, at one axial side of each of the coils U1 to U4, V1 to V4, and W1 to W4. As shown in FIG. 3, the bus bar device 21 includes a bus bar holder 22, which is made of an insulative synthetic resin, and three bus bars (i.e., U-phase bus bar 31, V-phase bus bar 32 and W-phase bus bar 33), which are formed from conductive wires 30 and held by the bus bar holder 22. The conductive wire 30 of the first embodiment is made of a conductive metal wire (tin-plated copper wire for example) having a circular cross-section. An outer diameter of the conductive wire 30 is substantially equal to an outer diameter of the metal wire 15a of the coated conductive wire 15.

As shown in FIGS. 1 and 2A, the bus bar holder 22 has the shape of an annular plate. The outer diameter of the bus bar holder 22 is smaller than the outer diameter of the stator core 11. The radial width of the bus bar holder 22 is slightly greater than the radial widths of the coils U1 to U4, V1 to V4, and W1 to W4 and is substantially equal to a length of the connection wire 16a.

Figure 4:
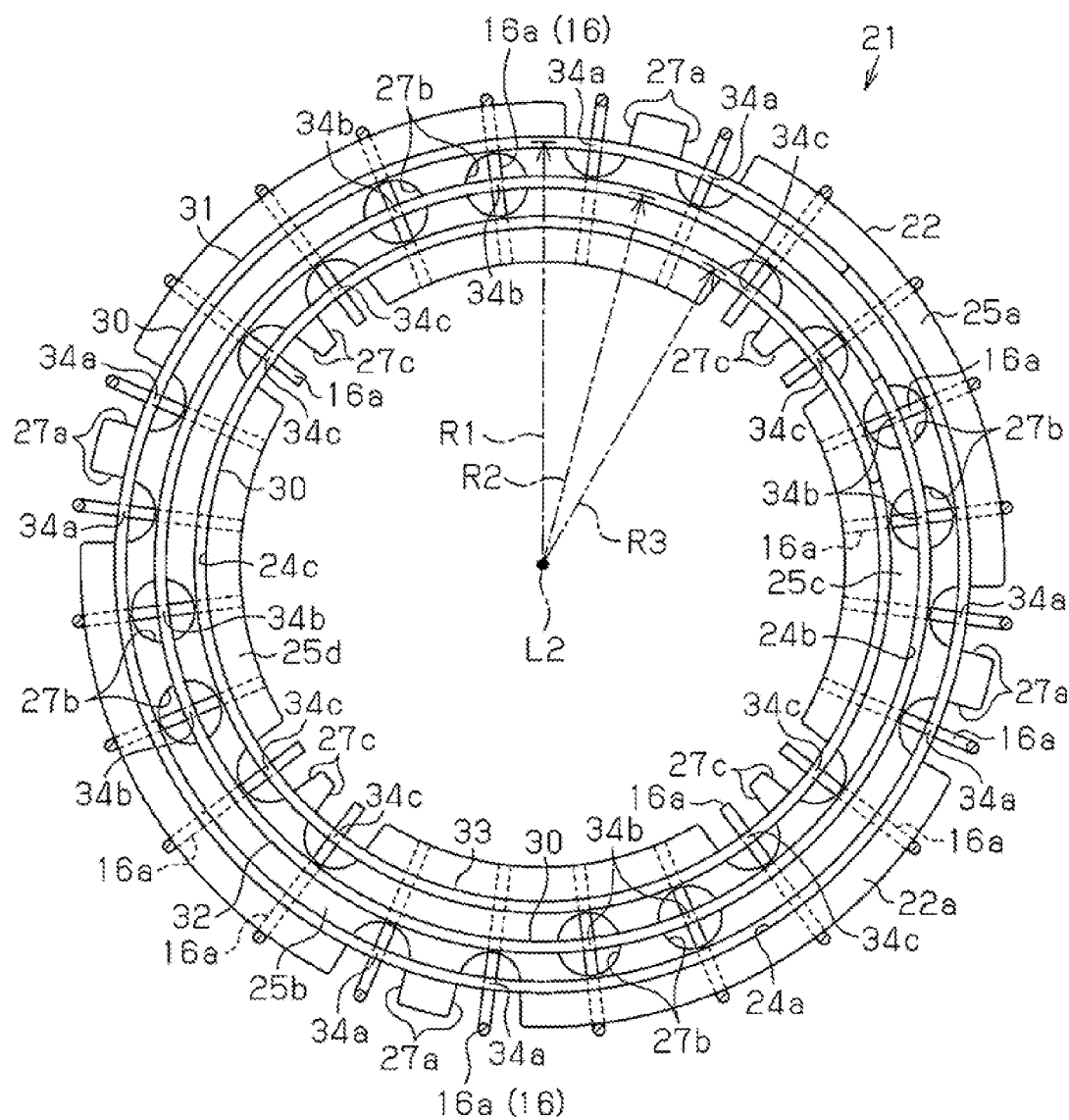
FIG. 4 is a bottom view of the bus bar device shown in FIG. 1.
Figure 6:
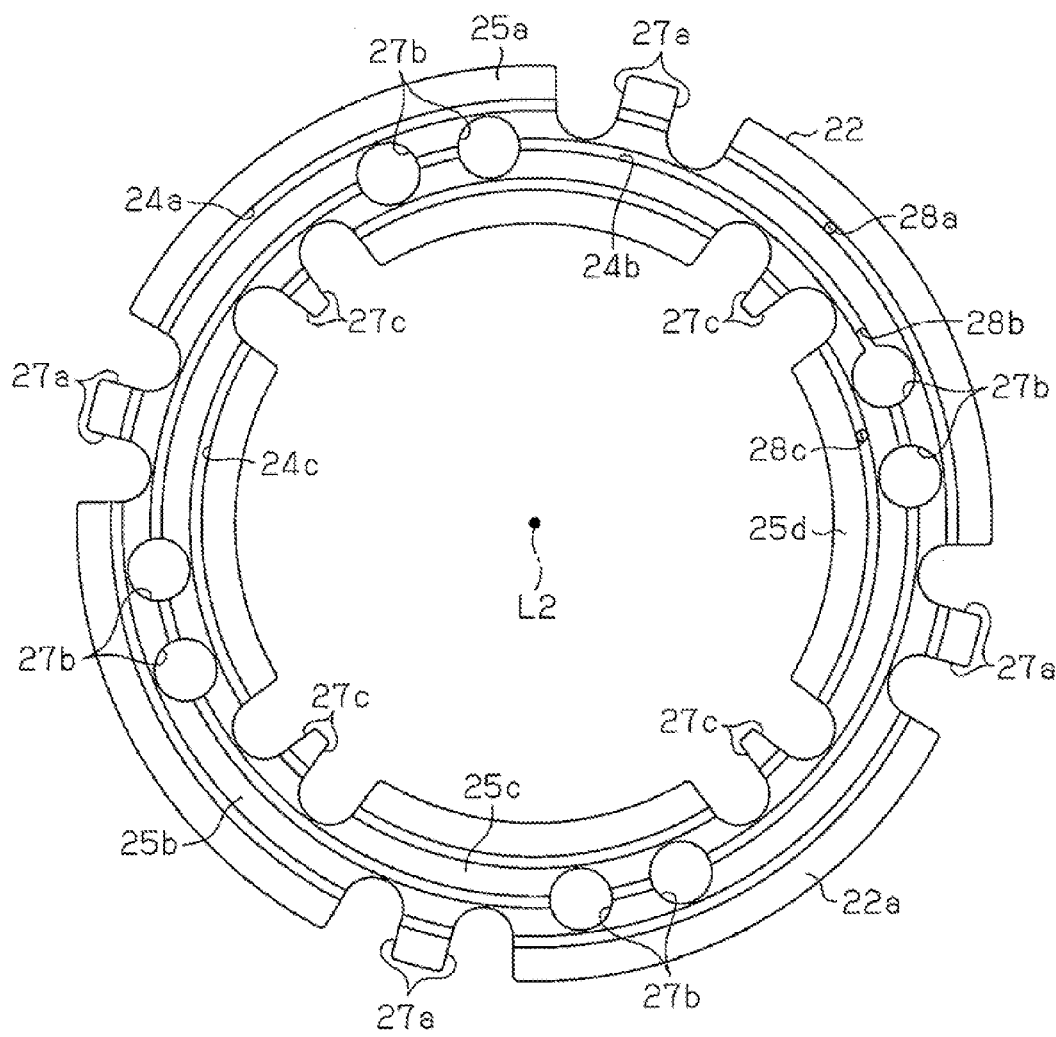
FIG. 6 is a bottom view of the bus bar holder shown in FIG. 1.
Figure 7:
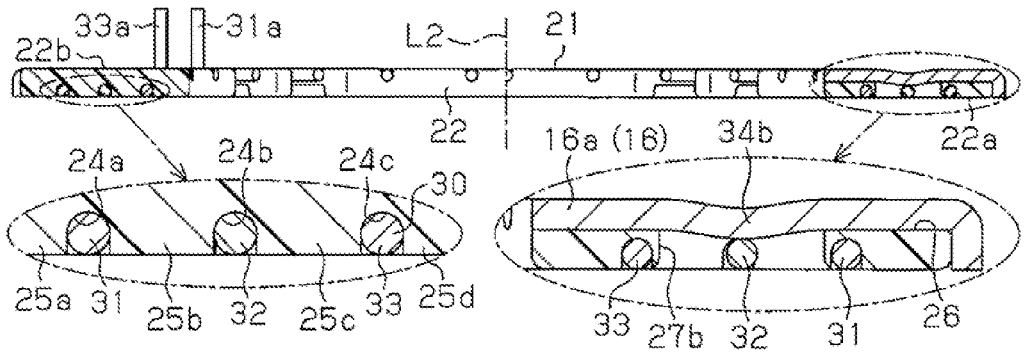
FIG. 7 is a cross-sectional view of the bus bar holder taken along line VII-VII in FIG. 3.

As shown in FIGS. 2A, 4, and 6, a first accommodating groove 24a, a second accommodating groove 24b and a third accommodating groove 24c are formed in a first end surface of the bus bar holder 22 in the axial direction. The first end surface corresponds to an opposing surface 22a, which is opposed to the stator core 11 and the coils U1 to U4, V1 to V4, and W1 to W4 in the axial direction. The first to third accommodating grooves 24a to 24c are formed by hollowing the opposing surface 22a in the axial direction and have substantially annular (arcuate) shapes extending along the circumferential direction of the bus bar holder 22. Among the first to third accommodating grooves 24a to 24c, the first accommodating groove 24a is formed on an outermost side in the radial direction. The second accommodating groove 24b is formed inward from the first accommodating groove 24a in the radial direction, and the third accommodating groove 24c is formed inward from the second accommodating groove 24b in the radial direction. The first to third accommodating grooves 24a to 24c are formed concentrically with a center axis L2 of the bus bar holder 22. The distance between the first accommodating groove 24a and the second accommodating groove 24b in the radial direction is equal to the distance between the second accommodating groove 24b and the third accommodating groove 24c in the radial direction. As shown in FIG. 7, the widths of the first to third accommodating grooves 24a to 24c in the radial direction are equal to the outer diameter of the conductive wire 30, and the depths (axial depths) of the first to third accommodating grooves 24a to 24c are substantially equal to the outer diameter of the conductive wire 30.

As shown in FIGS. 6 and 7, formation of the first to third accommodating grooves 24a to 24c in the axial end of the bus bar holder 22 at the side of the opposing surface 22a forms first to fourth positioning projections 25a to 25d. The first to fourth positioning projections 25a to 25d project in the axial direction toward the side of the openings of the first to third accommodating grooves 24a to 24c from the bottom surfaces of the first to third accommodating grooves 24a to 24c. The first positioning projection 25a has the form of a substantially annular (arcuate) protrusion extending along the outer circumferential edge of the bus bar holder 22 outward from the first accommodating groove 24a in the radial direction. The second positioning projection 25b has the form of a substantially annular (arcuate) protrusion extending along the circumferential direction between the first accommodating groove 24a and the second accommodating groove 24b. The third positioning projection 25c has the form of a substantially annular (arcuate) protrusion extending along the circumferential direction between the second accommodating groove 24b and the third accommodating groove 24c. The fourth positioning projection 25d has the form of a substantially annular (arcuate) protrusion extending along an inner circumferential edge of the bus bar holder 22 inward from the third accommodating groove 24c in the radial direction. The first to fourth positioning projections 25a to 25d are formed concentrically with the center axis L2 of the bus bar holder 22 like the first to third accommodating grooves 24a to 24c. The heights of the first to fourth positioning projections 25a to 25d in the axial direction are substantially equal to the outer diameter of the conductive wire 30.

Figure 5:
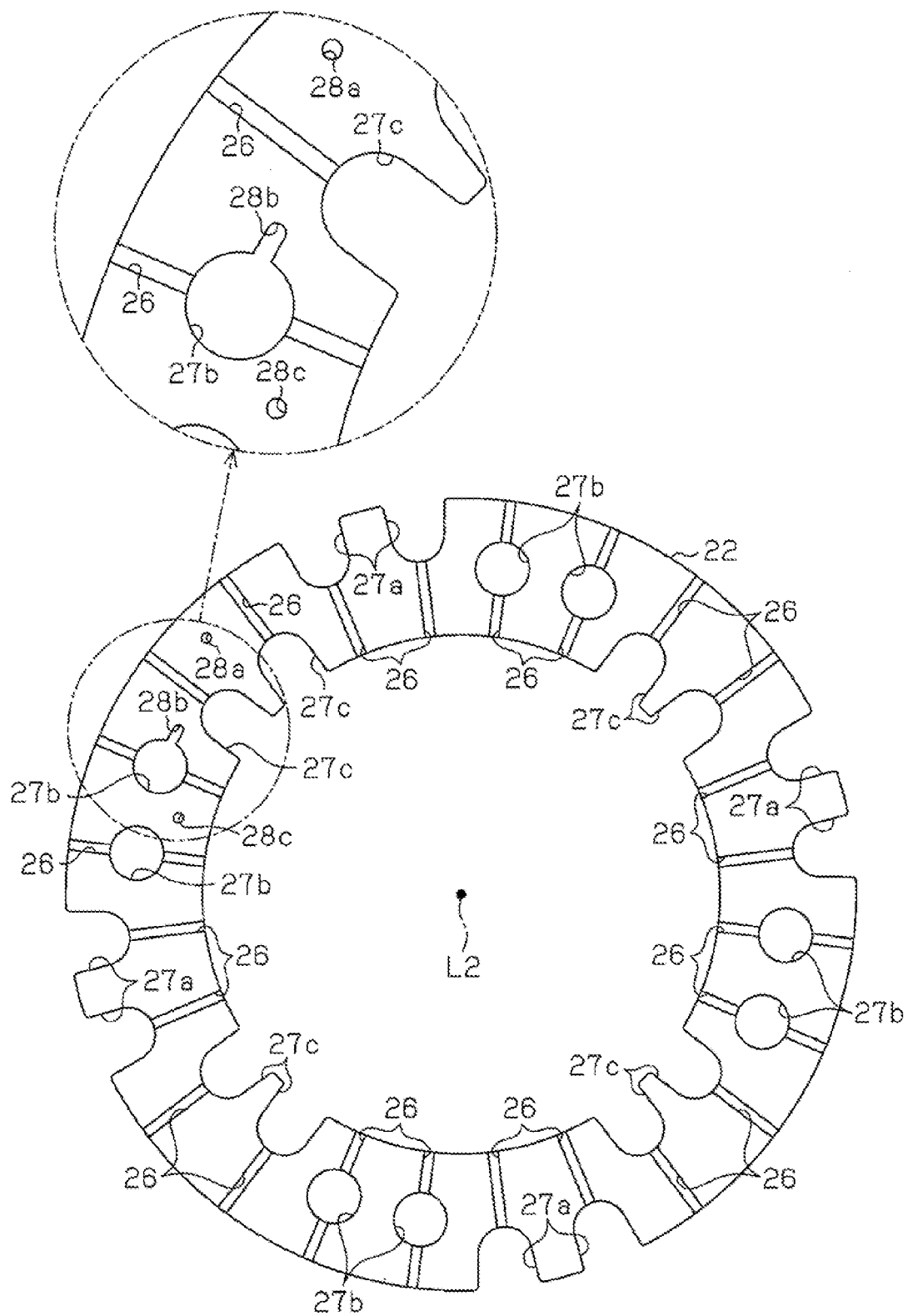
FIG. 5 is a plan view of a bus bar holder shown in FIG. 1.

As shown in FIGS. 3 and 5, a plurality of guide grooves 26 serving as guides is formed in a second end surface of the bus bar holder 22 in the axial direction, i.e., in a non-opposing surface 22b, which is an axial end surface of the bus bar holder 22 at the side opposite to the opposing surface 22a. In the first embodiment, twenty-four guide grooves 26 are formed. This number is the same as the number of the connection ends 16 provided on the stator 3. The guide grooves 26 are formed by hollowing the non-opposing surface 22b in the axial direction, and the guide grooves 26 extend from an outer circumferential edge to an inner circumferential edge of the bus bar holder 22 along the radial direction. The guide grooves 26 open at the other axial side (i.e., side opposite to the opposing surface 22a) and both radial sides. The twenty-four guide grooves 26 are formed at equal angular intervals (15° intervals in the first embodiment) in the circumferential direction. The depths and widths of the guide grooves 26 are constant from their radially outer ends to radially inner ends. The depth of the guide groove 26 (depths in the axial direction) is substantially equal to the diameter of the connection wire 16a (i.e., diameter of metal wire 15a), and the width of the guide groove 26 (width in the circumferential direction) is substantially equal to the diameter of the connection wire 16a (i.e., diameter of metal wire 15a).

First connecting portions 27a, second connecting portions 27b, and third connecting portions 27c, which are holes extending through the bus bar holder 22 in the axial direction, are formed in the bus bar holder 22. Eight first connecting portions 27a are formed in the bus bar holder 22 of the first embodiment. When the bus bar holder 22 is viewed from the non-opposing surface 22b, the eight first connecting portions 27a are formed at four locations at 90° intervals in the circumferential direction and at the same positions as the guide grooves 26, with two first connecting portions 27a located at each location. As shown in FIGS. 4 and 6, when the bus bar holder 22 is viewed from the opposing surface 22a, the eight first connecting portions 27a are formed near the outer circumference of the bus bar holder 22 and at substantially the same location as the first accommodating groove 24a. When the first connecting portion 27a is viewed from the opposing surface 22a, the first connecting portion 27a intersects with the first accommodating groove 24a in the radial direction and is U-shaped so as to open radially outward. The width of the first connecting portion 27a in the radial direction is greater than the diameter of the metal wire 15a and the diameter of the conductive wire 30. The width of the first connecting portion 27a in the circumferential direction is greater than the diameter of the metal wire 15a and the diameter of the conductive wire 30.

As shown in FIGS. 3 and 5, eight second connecting portions 27b are formed in the bus bar holder 22 of the first embodiment. When the bus bar holder 22 is viewed from the non-opposing surface 22b, the eight second connecting portions 27b are formed at four locations at 90° intervals in the circumferential direction and at the same positions as the guide grooves 26, with two second connecting portions 27b formed at each location at the clockwise side of each first connecting portion 27a. As shown in FIGS. 4 and 6, when the bus bar holder 22 is viewed from the opposing surface 22a, the eight second connecting portions 27b are formed at a central part of the bus bar holder 22 in the radial direction and at the same positions as the second accommodating groove 24b. Each second connecting portion 27b intersects with the second accommodating groove 24b in the radial direction and has a circular shape as viewed from the axial direction. The diameter of the second connecting portion 27b is greater than the diameter of the metal wire 15a and the diameter of the conductive wire 30.

As shown in FIGS. 3 and 5, eight third connecting portions 27c are formed in the bus bar holder 22 of the first embodiment. When the bus bar holder 22 is viewed from the non-opposing surface 22b, the eight third connecting portions 27c are formed at four locations at 90° intervals in the circumferential direction and at the same positions as the guide grooves 26, with two third connecting portions 27c formed at each location between a first connecting portion 27a and a second connecting portion 27b. As shown in FIGS. 4 and 6, when the bus bar holder 22 is viewed from the opposing surface 22a, the eight third connecting portions 27c are formed near the inner circumference of the bus bar holder 22 and at substantially the same location as the third accommodating groove 24c. When the third connecting portion 27c is viewed from the opposing surface 22a, the third connecting portion 27c intersects with the third accommodating groove 24c in the radial direction and is U-shaped as viewed from the axial direction so as to open radially inward. The width of each third connecting portion 27c in the radial direction is greater than the diameter of the metal wire 15a and the diameter of the conductive wire 30. The width of the third connecting portion 27c in the circumferential direction is greater than the diameter of the metal wire 15a and the diameter of the conductive wire 30. The first connecting portions 27a, the second connecting portions 27b, and the third connecting portions 27c, which are adjacent to one another in the circumferential direction, are separated from one another by 15° in the circumferential direction.

As shown in FIGS. 3 and 5, a first engaging portion 28a, a second engaging portion 28b, and a third engaging portion 28c are formed in the bus bar holder 22 are formed as holes extending through the bus bar holder 22 in the axial direction. The first engaging portion 28a extends through the bus bar holder 22 in the axial direction from the bottom of the first accommodating groove 24a to the non-opposing surface 22b between two of the eight third connecting portions 27c (two third connecting portions 27c at the left side as viewed in FIGS. 3 and 5) which are adjacent to each other in the circumferential direction. The first engaging portion 28a has a circular shape as viewed from the axial direction, and the diameter of the first engaging portion 28a is equal to the diameter of the conductive wire 30. When the bus bar holder 22 is viewed from the non-opposing surface 22b (i.e., states shown in FIGS. 3 and 5), the second engaging portion 28b extends through the bus bar holder 22 in the axial direction from the bottom of the second accommodating groove 24b to the non-opposing surface 22b at a circumferentially central part between the two guide grooves 26 located at a leading side of the first engaging portion 28a in the counterclockwise direction. When the bus bar holder 22 is viewed from the non-opposing surface 22b, the second engaging portion 28b is U-shaped so as to open into the second connecting portions 27b that is adjacent in the circumferential direction and located at a leading side of the second engaging portion 28b in the counterclockwise direction. The width of the second engaging portion 28b in the radial direction is equal to the outer diameter of the conductive wire 30. When the bus bar holder 22 is viewed from the non-opposing surface 22b, the third engaging portion 28c extends through the bus bar holder 22 in the axial direction from the bottom of the third accommodating groove 24c to the non-opposing surface 22b at a circumferentially central part of the two guide grooves 26 located at the leading side of the second engaging portion 28b in the counterclockwise direction. The third engaging portion 28c has a circular shape as viewed from the axial direction and has a diameter that is equal to the diameter of the conductive wire 30.

As shown in FIGS. 3 and 4, the U-phase bus bar 31 is molded into an arcuate shape by curving a single conductive wire 30. The curvature of the arcuate U-phase bus bar 31 is equal to that of the first accommodating groove 24a. As shown in FIGS. 1 and 2A, a radius R1 of the U-phase bus bar 31 is set to be less than the distance between outer ends of the coils U1 to U4, V1 to V4, and W1 to W4 in the radial direction and a center axis L3 of the stator core 11. Further, the radius R1 is set to be longer than the distance between inner ends of the coils U1 to U4, V1 to V4, and W1 to W4 in the radial direction and the center axis L3 of the stator core 11. As shown in FIGS. 3 and 4, the two ends of the U-phase bus bar 31 in the circumferential direction are opposed to each other, and the U-phase bus bar 31 has a substantially annular shape. A U-phase power feeding portion 31a is formed integrally with one circumferential end of the U-phase bus bar 31. The U-phase power feeding portion 31a is bent from the U-phase bus bar 31 and extends along the axial direction. As shown in FIG. 7, the length of the U-phase power feeding portion 31a in the axial direction is greater than the thickness of the bus bar holder 22 in the axial direction. As shown in FIGS. 3 and 4, the U-phase power feeding portion 31a of the U-phase bus bar 31 is inserted into the first engaging portion 28a from the opposing surface 22a and arranged in the first accommodating groove 24a. The U-phase bus bar 31 arranged on the bus bar holder 22 is positioned in the radial direction relative to the bus bar holder 22 by the first positioning projection 25a and the second positioning projection 25b located at two radial sides of the first accommodating groove 24a, and movement of the U-phase bus bar 31 in the radial direction with respect to the bus bar holder 22 is restricted. The U-phase power feeding portion 31a of the U-phase bus bar 31 is inserted into and engaged with the first engaging portion 28a. This engages the U-phase bus bar 31 with the first engaging portion 28a in the circumferential direction through the U-phase power feeding portion 31a. Accordingly, the U-phase power feeding portion 31a is engaged with the first engaging portion 28a. This positions the U-phase bus bar 31 in the circumferential direction relative to the bus bar holder 22, and movement of the U-phase bus bar 31 in the circumferential direction relative to the bus bar holder 22 is restricted. The U-phase bus bar 31 arranged in the first accommodating groove 24a is exposed from the eight first connecting portions 27a at the side of the non-opposing surface 22b.

The V-phase bus bar 32 is molded into an arcuate shape by curving a single conductive wire 30. The curvature of the arcuate V-phase bus bar 32 is equal to that of the second accommodating groove 24b. A radius R2 of the V-phase bus bar 32 is set to be less than the radius R1 of the U-phase bus bar 31. The two ends of the V-phase bus bar 32 in the circumferential direction are opposed to each other, and the V-phase bus bar 32 is formed to have a substantially annular shape. A V-phase power feeding portion 32a is formed integrally with one circumferential end of the V-phase bus bar 32. The V-phase power feeding portion 32a is bent from the V-phase bus bar 32 and extends in the axial direction. The length of the V-phase power feeding portion 32a in the axial direction is equal to that of the U-phase power feeding portion 31a in the axial direction. The V-phase bus bar 32 is arranged in the second accommodating groove 24b while inserting the V-phase power feeding portion 32a from the opposing surface 22a in the second engaging portion 28b. The V-phase bus bar 32 arranged on the bus bar holder 22 is positioned in the radial direction relative to the bus bar holder 22 by the second positioning projection 25b and the third positioning projection 25c located at the two radial sides of the second accommodating groove 24b, and movement of the V-phase bus bar 32 in the radial direction relative to the bus bar holder 22 is restricted. The V-phase power feeding portion 32a of the V-phase bus bar 32 is inserted into and engaged with the second engaging portion 28b, and the V-phase bus bar 32 is engaged with the second engaging portion 28b in the circumferential direction through the V-phase power feeding portion 32a. Accordingly, the V-phase power feeding portion 32a is engaged with the second engaging portion 28b. This positions the V-phase power feeding portion 32a in the circumferential direction of the V-phase bus bar 32 with respect to the bus bar holder 22, and movement of the V-phase power feeding portion 32a in the circumferential direction of the V-phase bus bar 32 relative to the bus bar holder 22 is restricted. The V-phase bus bar 32 arranged in the second accommodating groove 24b is exposed from the eight second connecting portion 27b at the side of the non-opposing surface 22b.

The W-phase bus bar 33 is molded into an arcuate shape by curving a single conductive wire 30. The curvature of the arcuate W-phase bus bar 33 is equal to that of the third accommodating groove 24c. A radius R3 of the W-phase bus bar 33 is set to be less than the radius R2 of the V-phase bus bar 32. As shown in FIGS. 1 and 2A, the radius R3 is set to be greater than the distance between inner ends of the coils U1 to U4, V1 to V4, and W1 to W4 in the radial direction and the center axis L3 of the stator core 11. As shown in FIGS. 3 and 4, the two circumferential ends of the W-phase bus bar 33 are opposed to each other, and the W-phase bus bar 33 is formed to have a substantially annular shape. A W-phase power feeding portion 33a is formed integrally with one circumferential end of the W-phase bus bar 33. The W-phase power feeding portion 33a is bent from the W-phase bus bar 33 and extends along the axial direction. The length of the W-phase power feeding portion 33a in the axial direction is equal to that of the U-phase power feeding portion 31a in the axial direction. The W-phase bus bar 33 is arranged in the third accommodating groove 24c while inserting the W-phase power feeding portion 33a from the side of the opposing surface 22a into the third engaging portion 28c. The W-phase bus bar 33 arranged on the bus bar holder 22 is positioned in the radial direction relative to the bus bar holder 22 by the third positioning projection 25c and the fourth positioning projection 25d located at the two radial sides of the third accommodating groove 24c, and movement of the W-phase bus bar 33 relative to the bus bar holder 22 in the radial direction is restricted. The W-phase power feeding portion 33a of the W-phase bus bar 33 is inserted into and engaged with the third engaging portion 28c. This engages the W-phase bus bar 33 with the third engaging portion 28c in the circumferential direction through the W-phase power feeding portion 33a. Accordingly, the W-phase power feeding portion 33a is engaged with the third engaging portion 28c, and the W-phase power feeding portion 33a is positioned in the circumferential direction of the W-phase bus bar 33 relative to the bus bar holder 22, and movement of the W-phase bus bar 33 in the circumferential direction relative to the bus bar holder 22 is restricted. The W-phase bus bar 33 arranged in the third accommodating groove 24c is exposed from the eighth third connecting portion 27c at the side of the non-opposing surface 22b.

The U-phase bus bar 31, the V-phase bus bar 32, and the W-phase bus bar 33 are respectively accommodated in the corresponding first accommodating groove 24a, second accommodating groove 24b, and third accommodating groove 24c as described above. Thus, the bus bars 31 to 33 are held by the bus bar holder 22 in a state where they are arranged so as to form a plurality of layers in the radial direction without overlapping over one another in the axial direction. The U-phase bus bar 31, the V-phase bus bar 32, and the W-phase bus bar 33 are held by the bus bar holder 22 so that they are separated from one another in the radial direction, and the distance between one another in the radial direction is kept constant. As shown in FIGS. 1 and 2A, the bus bar holder 22, which holds the three bus bars 31 to 33, is arranged on axial end of the stator core 11 (i.e., on the side of one ends of coils U1 to U4, V1 to V4, and W1 to W4 in the axial direction) so that the opposing surface 22a is opposed to the circumferentially arranged coils U1 to U4, V1 to V4, and W1 to W4 in the axial direction. The bus bar holder 22 is arranged relative to the stator core 11 and the coils U1 to U4, V1 to V4, and W1 to W4 so that circumferential positions of the twenty-four guide grooves 26 are the same as the circumferential positions of the twenty-four connection ends 16. The center axis L2 of the bus bar holder 22 arranged on the side of one axial end of the stator core 11 coincides with the center axis L3 of the stator core 11. The bus bars 31 to 33 are located concentrically with the center axis L3 of the stator core 11. The U-phase bus bar 31, the V-phase bus bar 32, and the W-phase bus bar 33 form a plurality of layers in the radial direction (the same as radial direction of the stator core 11) of the coils U1 to U4, V1 to V4, and W1 to W4 within a range of the width in the radial direction of the coils U1 to U4, V1 to V4, and W1 to W4.

The connection wires 16a which are portions at the distal side ends of the connection ends 16 are respectively accommodated in the guide grooves 26 at the side of the non-opposing surface 22b. This guides the connection wires 16a with the guide grooves 26 to extend along the radial direction relative to the bus bar holder 22. Each of the connection wires 16a is arranged to extend in the radial direction at the side of the non-opposing surface 22b. This overlaps the connection wires 16a with the U-phase bus bar 31, the V-phase bus bar 32, and the W-phase bus bar 33 in the axial direction. Further, the connection wires 16a are arranged in the guide grooves 26 so that the connection wires 16a intersect with one of the first connecting portion 27a, the second connecting portion 27b, and the third connecting portion 27c in the radial direction, and the connection wires 16a are exposed from this connecting portion at the side of the opposing surface 22a.

Figure 8:
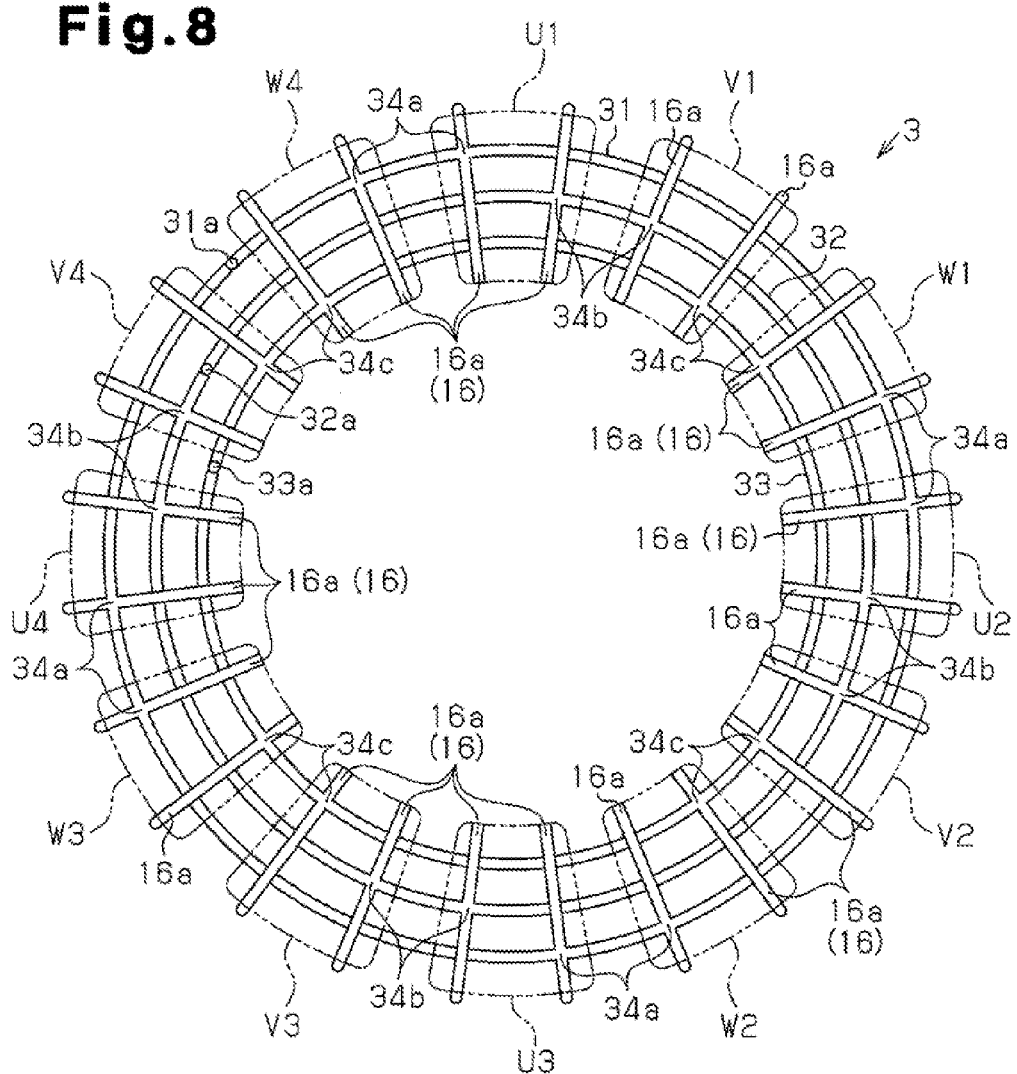
FIG. 8 is a schematic view of the stator shown in FIG. 1.

As shown in FIG. 8, a total of eight connection wires 16a, namely, one of the connection wires 16a of the coil U1, one of the connection wires 16a of the coil W1, one of the connection wires 16a of the coil U2, one of the connection wires 16a of the coil W2, one of the connection wires 16a of the coil U3, one of the connection wires 16a of the coil W3, one of the connection wires 16a of the coil U4, and one of the connection wires 16a of the coil W4 intersect with the U-phase bus bar 31 at the inner side of the first connecting portions 27a. That is, as shown in FIGS. 3 and 4, first connection intersection portions 34a, in which the connection wires 16a and the U-phase bus bar 31 intersect with each other, are formed at the inner side of the eight first connecting portions 27a. In other words, the first connecting portions 27a, which extend through the bus bar holder 22 in the axial direction, are formed in the bus bar holder 22 at eight locations in correspondence with the eight first connection intersection portions 34a. By intersecting the U-phase bus bar 31 with the eight connection wires 16a at the inner side of the first connecting portions 27a, the first connection intersection portions 34a fall within an axial thickness range of the bus bar holder 22. By welding the first connection intersection portions 34a at the inner side of the first connecting portions 27a, the eight connection wires 16a are electrically connected to the U-phase bus bar 31.

As shown in FIG. 8, a total of eight connection wires 16a, namely, the other connection wire 16a of the coil U1, one of the connection wires 16a of the coil V1, the other connection wire 16a of the coil U2, one of the connection wires 16a of the coil V2, the other connection wire 16a of the coil U3, one of the connection wires 16a of the coil V3, the other connection wire 16a of the coil U4, and one of the connection wires 16a of the coil V4 intersect with the V-phase bus bar 32 at the inner side of the second connecting portion 27b. That is, as shown in FIGS. 3 and 4, eight second connection intersection portions 34b in which the eight connection wires 16a and the V-phase bus bar 32 intersect with each other are formed at the inner side of the eight second connecting portions 27b. In other words, the second connecting portions 27b extending through the bus bar holder 22 in the axial direction are formed in the bus bar holder 22 at eight locations in correspondence with the eight second connection intersection portions 34b. By intersecting the V-phase bus bar 32 with the eight connection wires 16a at the inner side of the second connecting portions 27b, the second connection intersection portions 34b fall within the axial thickness range of the bus bar holder 22. By welding the second connection intersection portions 34b at the inner side of the second connecting portions 27b, the eight connection wires 16a are electrically connected to the V-phase bus bar 32.

As shown in FIG. 8, a total of eight connection wires 16a, namely, the other connection wire 16a of the coil V1, the other connection wire 16a of the coil W1, the other connection wire 16a of the coil V2, the other connection wire 16a of the coil W2, the other connection wire 16a of the coil V3, the other connection wire 16a of the coil W3, the other connection wire 16a of the coil V4, and the other connection wire 16a of the coil W4 intersect with the W-phase bus bar 33 at the inner side of the third connecting portions 27c. That is, as shown in FIGS. 3 and 4, third connection intersection portions 34c in which the connection wires 16a and the W-phase bus bar 33 intersect with each other are formed at the inner side of the eight third connecting portions 27c. In other words, the third connecting portions 27c extending through the bus bar holder 22 in the axial direction are formed in the bus bar holder 22 at eight locations in correspondence with the eight third connection intersection portions 34c. By intersecting the W-phase bus bar 33 with the eight connection wires 16a at the inner side of the third connecting portions 27c, the third connection intersection portions 34c fall within the axial thickness range of the bus bar holder 22. By welding the third connection intersection portions 34c at the inner side of the third connecting portions 27c, the eight connection wires 16a are electrically connected to the W-phase bus bar 33.

Figure 10:
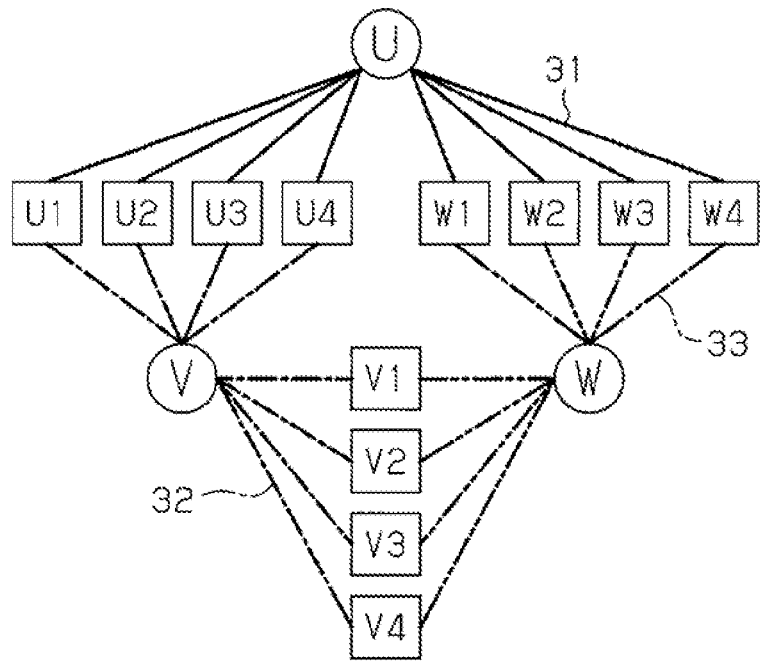
FIG. 10 is a diagram showing a connection state of coils in the bus bar device shown in FIG. 1.

The connection wires 16a connected to the bus bars 31 to 33 also configure the bus bar device 21. Three intersection portions are formed by overlapping the connection wires 16a on the three bus bars 31 to 33 in the axial direction. However, the connection wires 16a are electrically connected to the bus bars 31 to 33 only at the desired first connection intersection portions 34a, second connection intersection portions 34b, and third connection intersection portions 34c so that the connection ends 16 of desired coils U1 to U4, V1 to V4, and W1 to W4 are connected to one another. The twenty-four connection wires 16a are arranged in the circumferential direction in the order of the two connection wires 16a connected to the U-phase bus bar 31 and adjacent in the circumferential direction, the two connection wires 16a connected to the V-phase bus bar 32 and adjacent in the circumferential direction, and two connection wires 16a connected to the W-phase bus bar 33 and adjacent to each other in the circumferential direction. Further, the twenty-four connection wires 16a and the bus bars 31 to 33 are connected to one another as described above. Thus, as shown in FIG. 10, the U-phase coils U1 to U4 are connected in parallel to one another through the U-phase bus bar 31 and the V-phase bus bar 32, V-phase coils V1 to V4 are connected in parallel to one another through the V-phase bus bar 32 and the W-phase bus bar 33, and W-phase coils W1 to W4 are connected in parallel to one another through the W-phase bus bar 33 and the U-phase bus bar 31. The twelve coils U1 to U4, V1 to V4, and W1 to W4 are electrically connected to one another through the bus bar device 21, and the coils U1 to U4, V1 to V4, and W1 to W4 are delta-connected to one another through the bus bar device 21. In FIG. 10, the U-phase bus bar 31 is shown by solid lines, the V-phase bus bar 32 is shown by single-dashed lines, and the W-phase bus bar 33 is shown by double-dashed lines.

As shown in FIG. 1, the U-phase power feeding portion 31a is electrically connected to a power feeding terminal (not shown), which supplies U-phase alternating current. The V-phase power feeding portion 32a is electrically connected to a power feeding terminal (not shown), which supplies V-phase alternating current. The W-phase power feeding portion 33a is electrically connected to a power feeding terminal (not shown), which supplies W-phase alternating current. Phases of the U-phase alternating current, V-phase alternating current, and W-phase alternating current are shifted from one another by 120°. The brushless motor 1 is designed so that if current is supplied to the coils U1 to U4, V1 to V4, and W1 to W4 through the bus bar device 21, the rotor 4 is rotated in accordance with rotating magnetic field generated by the stator 3.

The operation of the bus bar device 21 of the first embodiment will be described below.

The connection wires 16a, which connect the U-phase bus bar 31, the V-phase bus bar 32, and the W-phase bus bar 33 with the coils U1 to U4, V1 to V4, and W1 to W4, are arranged so that the connection wires 16a are overlapped with the bus bars 31 to 33 in the axial direction, and the connection wires 16a are electrically connected to the bus bars 31 to 33 in the first to third connection intersection portions 34a to 34c, which intersect with the bus bars 31 to 33. That is, the connection wires 16a are connected to the bus bars 31 to 33 not at locations outward from the three bus bars 31 to 33 in the radial direction nor inward from the three bus bars 31 to 33 in the radial direction, but in a range where the three bus bars 31 to 33 are arranged. This allows for miniaturization of the bus bar device 21 in the radial direction without significantly reducing the radii of the bus bars 31 to 33, which are formed from the conductive wires 30. Even if the connection wires 16a are not accurately positioned and arranged relative to the bus bars 31 to 33, the connection wires 16a are arranged overlapping the bus bars 31 to 33 in the axial direction. This allows for easy formation of the first to third connection intersection portions 34a to 34c, in which the connection wires 16a intersect with the bus bars 31 to 33.

Next, a method for manufacturing the stator 3 of the first embodiment will be described.

Figure 9:
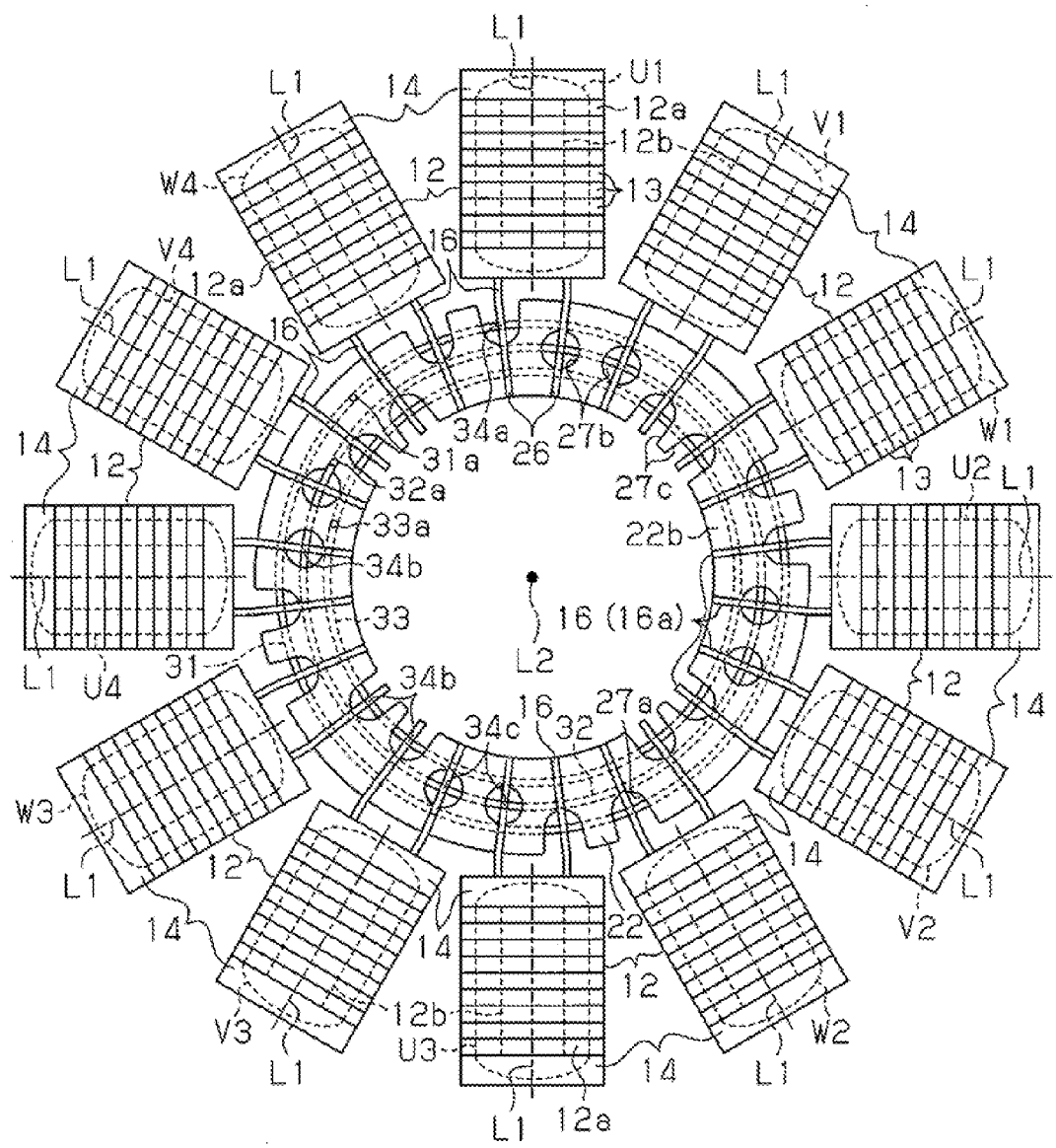
FIG. 9 is a diagram illustrating a method for manufacturing the stator shown in FIG. 1.

First, a core segment arranging step for arranging twelve core segments 12 at arrangement positions where the U-phase bus bar 31, the V-phase bus bar 32, and the W-phase bus bar 33 are arranged is carried out. As shown in FIG. 9, the insulators 14 are mounted on the twelve core segments 12, and the coils U1 to U4, V1 to V4, and W1 to W4 are wound around the insulators 14. The connection ends 16 of the coils U1 to U4, V1 to V4, and W1 to W4 extend straight along the axial directions of the core segments 12 (i.e., direction of the center axis L1 of the connection portion 12a that is the same as the stacking direction of the core sheets 13). Bases of the connection ends 16 are held by the end holding portions 14a provided on the insulators 14. This maintains the connection ends 16 in a state in which they extend along the direction of the center axis L1 of the connection portion 12a. In each of the connection ends 16, the insulative coating 15b is removed to expose the metal wire 15a. In the core segment arranging step, the twelve core segments 12 are arranged along the circumferential direction so that the twenty-four connection ends 16 are arranged radially inward from the twelve core segments 12. More specifically, each of the core segments 12 is arranged so that an end surface 12c, which is an end surface from which the connection end 16 is drawn out, faces radially inward, and so that an end surface 12d located on a side opposite from the end surface 12c faces radially outward in the core segment 12. Further, the twelve core segments 12 are arranged so that distal ends of all of the teeth 12b face the same direction (distal ends of teeth 12b face the farther side of the plane of FIG. 9), and so that the center axes L1 of the connection portions 12a of the twelve core segments 12 are arranged radially. The twelve core segments 12 are arranged in the circumferential direction so that the coils are arranged in the order of the coil U1, the coil V1, the coil W1, the coil U2, the coil V2, the coil W2, the coil U3, the coil V3, the coil W3, the coil U4, the coil V4, and the coil W4.

Next, a bus bar arranging step for arranging the U-phase bus bar 31, the V-phase bus bar 32, and the W-phase bus bar 33 on the radially arranged connection ends 16 is carried out. In the bus bar arranging step, the bus bar holder 22, which holds the U-phase bus bar 31, the V-phase bus bar 32, and the W-phase bus bar 33, is arranged at the inner side of the twelve core segments 12 so that the bus bar holder 22 is overlapped with the radially arranged twenty-four connection ends 16 (connection wires 16a). Here, the bus bar holder 22 is arranged so that the non-opposing surface 22b is opposed to the twenty-four connection ends 16 (connection wires 16a). The bus bar holder 22 is arranged so that the opposing surface 22a faces a direction extending toward distal ends of the teeth 12b from their basal ends and so that the non-opposing surface 22b faces a direction extending toward the basal ends of the teeth 12b from their distal ends. The twenty-four connection ends 16 (connection wires 16a) are arranged in the twenty-four guide grooves 26. This arranges the connection ends 16 (connection wires 16a) so that they intersect and overlap with the U-phase bus bar 31, the V-phase bus bar 32, and the W-phase bus bar 33 in the axial direction. As a result, the eight first connection intersection portions 34a, in which the eight connection ends 16 and the U-phase bus bar 31 intersect with each other, the eight second connection intersection portions 34b, in which the eight connection ends 16 and the V-phase bus bar 32 intersect with each other, and the eight third connection intersection portions 34c, in which the eight connection ends 16 and the W-phase bus bar 33 intersect with each other, are formed.

Next, a connecting step for welding the first connection intersection portion 34a, the second connection intersection portion 34b, and the third connection intersection portion 34c and for electrically connecting the U-phase bus bar 31, the V-phase bus bar 32, and the W-phase bus bar 33 and the connection ends 16 (connection wires 16a) to one another is carried out. In the connecting step, by welding the first connection intersection portion 34a from the axial direction of the bus bar holder 22 inside of the first connecting portion 27a, the U-phase bus bar 31 and the eight connection ends 16 (connection wires 16a) are electrically connected to each other. By welding the second connection intersection portion 34b from the axial direction of the bus bar holder 22 at the inner side of the second connecting portion 27b, the V-phase bus bar 32 and the other eight connection ends 16 (connection wires 16a) are electrically connected to each other. Further, by welding the third connection intersection portion 34c from the axial direction of the bus bar holder 22 at the inner side of the third connecting portion 27c, the W-phase bus bar 33 and remaining eight connection ends 16 (connection wires 16a) are electrically connected to each other. In the connecting step of the first embodiment, the U-phase bus bar 31, the V-phase bus bar 32, and the W-phase bus bar 33 and the connection ends 16 (connection wires 16a) are electrically connected to one another by resistance welding.

Next, a core segment molding step for molding the circumferentially arranged core segments 12 to form the annular stator core 11 is carried out. In this core segment molding step, the connection ends 16 are bent at the outer side of the bus bars 31 to 33 in the radial direction so that the U-phase bus bar 31, the V-phase bus bar 32, and the W-phase bus bar 33 are arranged at one axial side of the core segments 12. That is, each of the connection ends 16 is bent at the outer circumferential edge of the bus bar holder 22, and each core segment 12 is pivoted relative to the bus bar holder 22 about the bent portion of the connection end 16 so that the axial end surface 12c of the core segment 12 at the side of the connection end 16 is opposed to the opposing surface 22a in the axial direction. As shown in FIGS. 1 and 2A, this arranges the twelve core segments 12 in the circumferential direction so that distal ends of the teeth 12b face the radially inward direction. The twelve core segments 12 are connected to one another by fitting the ends of the connection portions 12a of the adjacent core segments 12 in the circumferential direction and molded into an annularly shape. The stator core 11 is formed in this manner, and the bus bar device 21 is arranged at one axial side of the stator core 11 (the side of one of the axial ends of the circumferentially arranged coils U1 to U4, V1 to V4, and W1 to W4 in the axial direction). The core segment molding step completes the stator 3.

As described above, the first embodiment has the following advantages.

(1) The connection wires 16a, which connect the U-phase bus bar 31, the V-phase bus bar 32, and the W-phase bus bar 33 with the coils U1 to U4, V1 to V4, and W1 to W4, are arranged so that the connection wires 16a are overlapped with the bus bars 31 to 33 in the axial direction. The connection wires 16a are electrically connected to the bus bars 31 to 33 in the first to third connection intersection portions 34a to 34c, which intersect with the bus bars 31 to 33. That is, the connection wires 16*a* are connected to the bus bars 31 to 33 not at locations outward from the three bus bars 31 to 33 in the radial direction nor inward from the three bus bars 31 to 33 in the radial direction but in a range in which the three bus bars 31 to 33 are arranged in the radial direction of the bus bar device 21. This allows for miniaturization of the bus bar device 21 in the radial direction without significantly reducing the radii of the bus bars 31 to 33, which are formed from the conductive wires 30. That is, the outer diameter of the bus bar device 21 can be reduced without significantly reducing the radii of the bus bars 31 to 33, and the width of the bus bar device 21 in the radial direction can also be reduced. Even when the connection wires 16*a* are not accurately positioned and arranged relative to the bus bars 31 to 33, the connection wires 16*a* are arranged so that they are overlapped with the bus bars 31 to 33 in the axial direction. This easily forms the first to third connection intersection portions 34*a* to 34*c* in which the connection wires 16*a* intersect the bus bars 31 to 33. Accordingly, the connection wires 16*a* are easily arranged on the bus bars 31 to 33. This facilitates the manufacturing of the bus bar device 21.

(2) The connection wires 16*a* are not overlapped with one another in the axial direction. Thus, enlargement of the bus bar device 21 in the axial direction can be suppressed. Further, the connection wires 16*a* are arranged next to one another in the circumferential direction so that they are not overlapped with one another in the axial direction. This shortens the connection wires 16*a*. As a result, the bus bar device 21 can be reduced in weight, and the manufacturing cost of the bus bar device 21 can be decreased.

(3) In the annular bus bar holder 22, the bus bars 31 to 33 are respectively accommodated in the first to third accommodating grooves 24*a* to 24*c*. This holds the bus bars 31 to 33 while restricting movement of the bus bars 31 to 33 in the radial direction with the first to fourth positioning projection 25*a* to 25*d*. Since the movement of the bus bars 31 to 33 in the radial direction is restricted by the bus bar holder 22, the connection wires 16*a* can be easily connected to the bus bars 31 to 33. This suppresses short-circuiting of the bus bars 31 to 33 that would be caused by vibration when the brushless motor 1 is driven and suppresses the generation of noise that would be caused by the vibration of the bus bars 31 to 33.

(4) The bus bar holder 22 includes the guide grooves 26, which guide the arrangement of the connection wires 16*a* on the bus bars 31 to 33. Accordingly, by accommodating the connection wires 16*a* in the guide grooves 26, the connection wires 16*a* can be further easily arranged relative to the bus bars 31 to 33. Further, the connection wires 16*a* are accommodated (guided) in the guide grooves 26 and positioned relative to the bus bar holder 22. This suppresses movement of the connection wires 16*a* relative to the bus bar holder 22. Accordingly, the connection wires 16*a* are further easily connected to the bus bars 31 to 33. Further, short-circuiting between the connection wires 16*a* that would be caused by vibration when the brushless motor 1 is driven is suppressed. Since relative movement between the bus bars 31 to 33 and the connection wires 16*a* is suppressed, damage of the connecting portions between the bus bars 31 to 33 and the connection wires 16*a* is suppressed.

(5) The bus bars 31 to 33 are all arranged at one axial end of the bus bar holder 22 (i.e., at the side of the opposing surface 22*a*), and the connection wires 16*a* are all arranged at the other axial end of the bus bar holder 22 (i.e., at the side of the non-opposing surface 22*b*). Accordingly, insulation is easily provided between the bus bars 31 to 33 and the connection wires 16*a*, which are not connected to one another. Further, when the first to third connection intersection portions 34*a* to 34*c* are formed within the range of the axial thickness of the bus bar holder 22 and the connection wires 16*a* are connected to the bus bars 31 to 33 like in the first embodiment, the bus bar holder 22 suppresses contact of the components of the brushless motor 1 arranged around the bus bar device 21 with the first to third connection intersection portions 34*a* to 34*c*. Accordingly, since the connected portions between the bus bars 31 to 33 and the connection wires 16*a* are protected by the bus bar holder 22, the connection reliability of the connection wires 16*a* to the bus bars 31 to 33 is improved.

(6) The bus bar holder 22 includes the hole-shaped first to third connecting portions 27*a* to 27*c*, which extend through the bus bar holder 22 in the axial direction at positions corresponding to the first to third connection intersection portions 34*a* to 34*c*. Accordingly, the connection wires 16*a* can be connected to the bus bars 31 to 33 from both axial sides of the bus bar holder 22 in the first to third connection intersection portions 34*a* to 34*c*. Thus, the connection wires 16*a* are further easily connected to the bus bars 31 to 33, and the connection reliability of the connection wires 16*a* to the bus bars 31 to 33 is improved. Further, since the connection wires 16*a* can be connected to the bus bars 31 to 33 from both axial sides of the bus bar holder 22 in the first to third connection intersection portions 34*a* to 34*c*, the bus bars 31 to 33 and the connection wires 16*a* can be connected by resistance welding.

(7) The bus bars 31 to 33 are easily positioned in the circumferential direction relative to the bus bar holder 22 by the first to third engaging portions 28*a* to 28*c*. Since the movement of the bus bars 31 to 33 in the circumferential direction relative to the bus bar holder 22 is restricted by the first to third engaging portions 28*a* to 28*c*, the connection wires 16*a* are further easily connected to the bus bars 31 to 33.

(8) The conductive wires 30 forming the bus bars 31 to 33 are conductive metal wires having no insulative coatings. Thus, the connection reliability of the connection wires 16*a* to the bus bars 31 to 33 is further improved. The bus bars 31 to 33 are separated from one another in the radial direction thereby ensuring insulation.

(9) The three bus bars 31 to 33 are arranged so that they form the plurality of layers in the radial direction of the coils U1 to U4, V1 to V4, and W1 to W4 (same direction as the radial direction of the stator core 11) within the range of the coils U1 to U4, V1 to V4, and W1 to W4 in the radial direction. Accordingly, the bus bar device 21 suppresses enlargement of the stator 3 in the radial direction. Since the stator 3 suppresses enlargement in the radial direction, enlargement of the brushless motor 1 in the radial direction is suppressed.

(10) The connection wires 16*a* are the connection ends 16, which are bent to overlap the bus bars 31 to 33 in the axial direction. Therefore, by carrying out a simple forming operation, i.e., by bending the connection ends 16, the connection ends 16, i.e., the connection wires 16*a* are easily arranged to intersect and overlap the bus bars 31 to 33. Further, since there is no need to form separate components as the connection wires 16*a*, the number of components can be reduced in the stator 3. When the stator 3 is provided with connection wires in addition to the connection ends 16, the connection wires and the bus bars 31 to 33 have to be electrically connected to one another. In addition, the connection wires and the connection ends 16 have to be electrically connected to one another. In this case, when the connection wires and the connection ends 16 are not accurately positioned and arranged in parallel, it may be difficult to mount the connection ends or connect the connection ends like in the conventional bus bar device described in patent document 1. However, when the connection wires 16a are the connection ends 16 like in the first embodiment, there is no need to electrically connect the connection wires 16a and the connection ends 16. Accordingly, the stator 3 is easily manufactured. As a result, the manufacturing cost of the stator 3 can be decreased. Further, when the connection ends 16 are the connection wires 16a, the connection ends 16 only need to be arranged to overlap and intersect the bus bars 31 to 33. Thus, there is not need for laying out the connection ends 16 in a complicated manner. Accordingly, the connection ends 16 can be shortened, and the space required for arranging the connection ends 16 can be reduced in size. As a result, enlargement of the stator 3 can be suppressed.

(11) The bus bar device 21, which is reduced in size in the radial direction, can delta-connect the twelve coils U1 to U4, V1 to V4, and W1 to W4. Accordingly, the stator 3 can be miniaturized in the radial direction. Further, there are only three bus bars, namely, the U-phase bus bar 31, the V-phase bus bar 32, and the W-phase bus bar 33. Thus, the bus bar device 21 can further be miniaturized in the radial direction. As a result, the stator 3 can be further miniaturized in the radial direction.

(12) In the core segment arranging step, the connection ends 16, which extend straight along the axial direction of the core segments 12, are radially arranged at the inner side of the twelve circumferentially arranged core segments 12. In the bus bar arranging step, the three bus bars 31 to 33 are arranged to be overlapped with the radially arranged connection ends 16. Accordingly, when the first to third connection intersection portions 34a to 34c are welded in the connecting step, the core segments 12 and the coils U1 to U4, V1 to V4, and W1 to W4 are arranged at the outer side of the bus bars 31 to 33 in the radial direction and not at the axial sides of the bus bars 31 to 33. Thus, a welding device or jig can be arranged near the first to third connection intersection portions 34a to 34c from the axial direction of the bus bars 31 to 33. This facilitates welding of the first to third connection intersection portions 34a to 34c.

(13) The bus bars 31 to 33 are formed from the conductive wires 30. Thus, scrap material is less prone to be generated. Accordingly, reduction in the yield of the bus bars 31 to 33 is suppressed.

(14) The U-phase power feeding portion 31a, the V-phase power feeding portion 32a, and W-phase power feeding portion 33a are formed integrally with one circumferential end of each of the U-phase bus bar 31, the V-phase bus bar 32, and the W-phase bus bar 33. Thus, there is no need to fix separate power feeding portions, which are connected to the phase power feeding terminals, to the U-phase bus bar 31, the V-phase bus bar 32, and the W-phase bus bar 33. This reduces the number of components and decreases the manufacturing cost.

(15) The U-phase power feeding portion 31a, the V-phase power feeding portion 32a, and W-phase power feeding portion 33a are supported by the bus bar holder 22 by insertion into the first to third engaging portions 28a to 28c. Accordingly, in the stator 3, the positions of the U-phase power feeding portion 31a, the V-phase power feeding portion 32a, and W-phase power feeding portion 33a are easily stabilized.

(16) The bus bars 31 to 33 and the connection wires 16a, which are formed by the connection ends 16, are welded to first to third connection intersection portions 34a to 34c, which intersect each other, for electrical connection. Thus, the connection wires 16a can be connected to a plurality of locations on the single U-phase bus bar 31, and there is no need to form a portion having a complicated shape for connecting the connection wires 16a on the U-phase bus bar 31.

In the same manner, the connection wires 16a can be connected to a plurality of locations of the single V-phase bus bar 32 and the single W-phase bus bar 33, and there is not need to form portions having complicated shapes for connecting the connection wires 16a on the V-phase bus bar 32 and the W-phase bus bar 33. Accordingly, an increase in the number of bus bars 31 to 33 is suppressed, and the bus bars 31 to 33 can be formed with a simple shape, i.e., arcuate shape. As a result, the bus bars 31 to 33 can be easily manufactured. Further, since there is not need to form portions having complicated shapes for connecting the connection wires 16a to the bus bars 31 to 33 on the connection wires 16a, the connection wires 16a can have a simple shape, i.e., a straight shape. Further, the bus bars 31 to 33 are concentrically arranged. Thus, the bus bars 31 to 33 are arranged to form three layers in the radial direction. This reduces the number of the bus bars 31 to 33 overlapped with one another in the radial direction to as small as three, and the bus bar device 21 can be miniaturized in the radial direction.

Second Embodiment

A second embodiment of the present invention will now be described with reference to the drawings. In the second embodiment, same reference numerals are given to those components that are the same as the corresponding components of the first embodiment. Such components will not be described.

Figure 12:
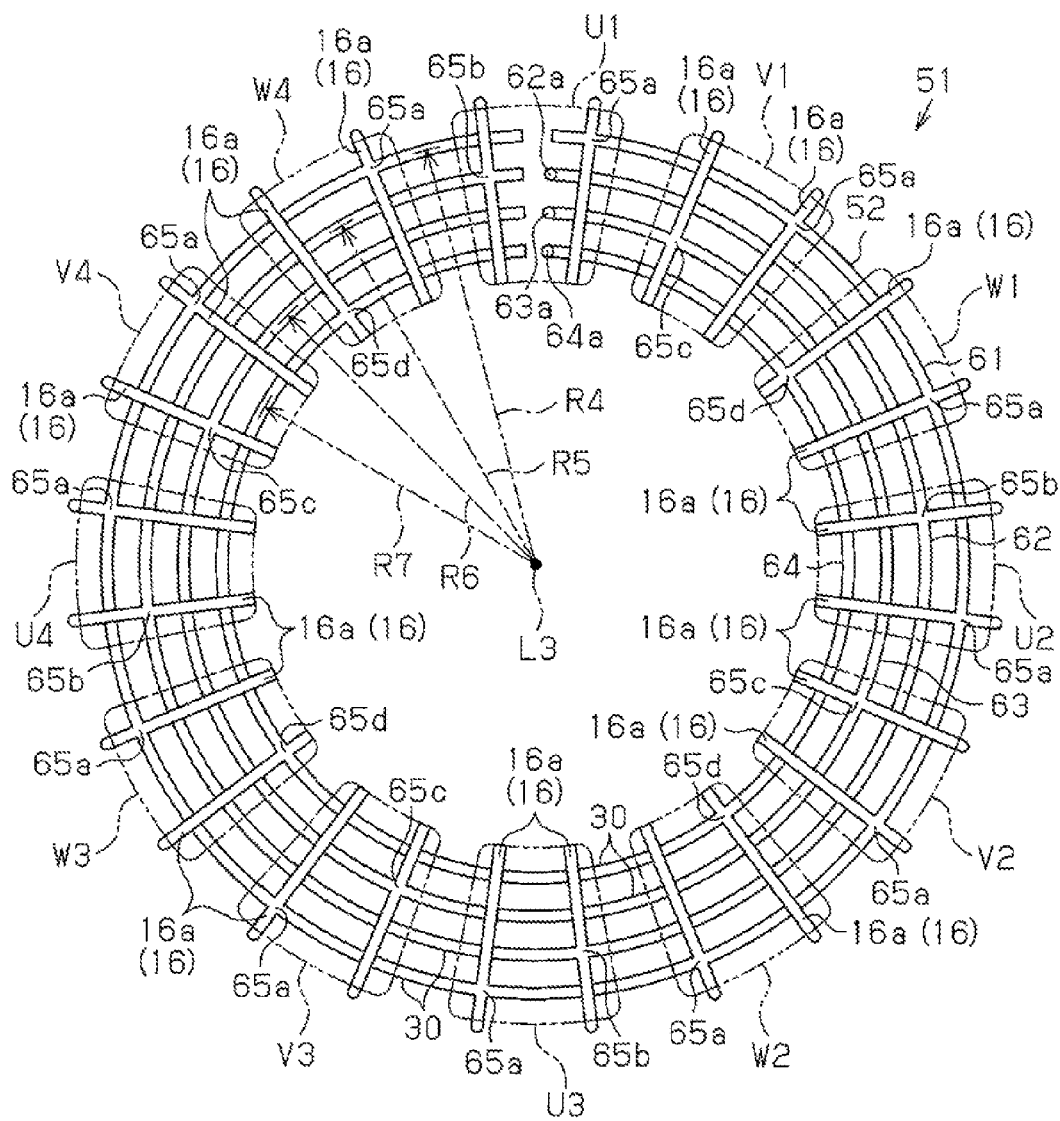
FIG. 12 is a schematic view of a stator according to the second embodiment of the invention.

As shown in FIG. 12, in the second embodiment, the brushless motor 1 includes a stator 51 in lieu of the stator 3 of the first embodiment. This stator 51 includes a bus bar device 52 instead of the bus bar device 21 of the first embodiment. The bus bar device 52 includes one common bus bar 61, one U-phase bus bar 62, one V-phase bus bar 63, and one W-phase bus bar 64. In the same manner as the bus bars 31 to 33 of the first embodiment, the bus bars 61 to 64 are held by an annular plate-like bus bar holder (not shown), which is made of insulative synthetic resin, in a state in which movement in the radial direction is restricted.

The common bus bar 61 is formed by molding a single conductive wire 30 into a curved and arcuate shape. The radius R4 of the common bus bar 61 is set to be less than the distance between outer ends of coils U1 to U4, V1 to V4, and W1 to W4 in the radial direction and a center axis L3 of the stator core 11 (see FIG. 1) and set to be greater than the distance between inner ends of the coils U1 to U4, V1 to V4, and W1 to W4 in the radial direction and the center axis L3 of the stator core 11. The two circumferential ends of the common bus bar 61 are opposed to each other in the circumferential direction, and the common bus bar 61 is formed to be substantially annular.

The U-phase bus bar 62 is formed by molding a single conductive wire 30 into a curved and arcuate shape. The radius R5 of the U-phase bus bar 62 is set to be less than the radius R4 of the common bus bar 61 and set to be greater than the distance between the inner ends of the coils U1 to U4, V1 to V4, and W1 to W4 in the radial direction and the center axis L3 of the stator core 11. The two circumferential ends of the U-phase bus bar 62 are opposed to each other in the circumferential direction, and the U-phase bus bar 62 is formed to be substantially annular. A U-phase power feeding portion 62a is formed integrally with one circumferential end of the U-phase bus bar 62. The U-phase power feeding portion 62a is bent from the U-phase bus bar 62 and extends in the axial direction.

The V-phase bus bar 63 is formed by molding a single conductive wire 30 into a curved and arcuate shape. The radius R6 of the V-phase bus bar 63 is set to be less than the radius R5 of the U-phase bus bar 62 and set to be greater than the distance between the inner ends of the coils U1 to U4, V1 to V4, and W1 to W4 in the radial direction and the center axis L3 of the stator core 11. The two circumferential ends of the V-phase bus bar 63 are opposed to each other in the circumferential direction, and the V-phase bus bar 63 is formed to be substantially annular. A V-phase power feeding portion 63a is formed integrally with one circumferential end of the V-phase bus bar 63. The V-phase power feeding portion 63a is bent from the V-phase bus bar 63 and extends in the axial direction.

The W-phase bus bar 64 is formed by molding a single conductive wire 30 into a curved and arcuate shape. The radius R7 of the W-phase bus bar 64 is set to be less than the radius R6 of the V-phase bus bar 63 and set to be greater than the distance between the inner ends of the coils U1 to U4, V1 to V4, and W1 to W4 in the radial direction and the center axis L3 of the stator core 11. The two circumferential ends of the W-phase bus bar 64 in the direction are opposed to each other in the circumferential direction, and the W-phase bus bar 64 is formed to be substantially annular. A W-phase power feeding portion 64a is formed integrally with one circumferential end of the W-phase bus bar 64. The W-phase power feeding portion 64a is bent from the W-phase bus bar 64 and extends in the axial direction.

The common bus bar 61, the U-phase bus bar 62, the V-phase bus bar 63, and the W-phase bus bar 64 are held by the bus bar holder (not shown) in a state in which the bus bars 61 to 64 are arranged to form a plurality of layers in the radial direction without overlapping one another in the axial direction. More specifically, the U-phase bus bar 62 is arranged at the inner side of the common bus bar 61, the V-phase bus bar 63 is arranged at the inner side of the U-phase bus bar 62, and the W-phase bus bar 64 is arranged at the inner side of the V-phase bus bar 63. As a result, the bus bars 61 to 64 form the plurality of layers in the radial direction. Further, the adjacent bus bars 61 to 64 are separated from each other in the radial direction and held by the bus bar holder in a state in which the interval in the radial direction is kept constant. The bus bars 61 to 64 arranged on one axial end of each of the coils U1 to U4, V1 to V4, and W1 to W4 together with the bus bar holder are concentric with the center axis L3 of the stator core 11. The bus bars 61 to 64 form the plurality of layers in the radial direction of the coils U1 to U4, V1 to V4, and W1 to W4 (this direction is the same as the radial direction of the stator core 11) within a range of the radial widths of the coils U1 to U4, V1 to V4, and W1 to W4. The bus bars 61 to 64 are positioned in the circumferential direction so that the two circumferential ends of the bus bars 61 to 64 are located at one axial end of the coil U1.

A total of twenty-four connection wires 16a, which are portions at the distal side of the connection ends 16, are arranged so that the connection wires 16a extend along the radial direction. As a result, the connection wires 16a are arranged to overlap and intersect the common bus bar 61, the U-phase bus bar 62, the V-phase bus bar 63 and the W-phase bus bar 64 in the axial direction. One of the connection wires 16a of the coils U1 to U4, V1 to V4, and W1 to W4 intersect with the common bus bar 61 and thereby form first connection intersection portions 65a intersecting the common bus bar 61. The first connection intersection portions 65a are welded to electrically connect one of the connection wires 16a of the coils U1 to U4, V1 to V4, and W1 to W4 to the common bus bar 61. The other one of the connection wires 16a of the coils U1 to U4 intersect with the U-phase bus bar 62 and thereby form second connection intersection portions 65b intersecting the U-phase bus bar 62. The second connection intersection portions 65b are welded to electrically connect the other connection wires 16a of the coils U1 to U4 to the U-phase bus bar 62. The other one of the connection wires 16a of the coils V1 to V4 intersect with the V-phase bus bar 32 and thereby form third connection intersection portions 65c intersecting the V-phase bus bar 32. The third connection intersection portions 65c are welded to electrically connect the other connection wires 16a of the coils V1 to V4 to the V-phase bus bar 63. The other one of the connection wires 16a of the coils W1 to W4 intersect with the W-phase bus bar 64 and form fourth connection intersection portions 65d intersecting the W-phase bus bar 64. The fourth connection intersection portions 65d are welded to electrically connect the other connection wires 16a of the coils W1 to W4 to the W-phase bus bar 64.

Figure 11:
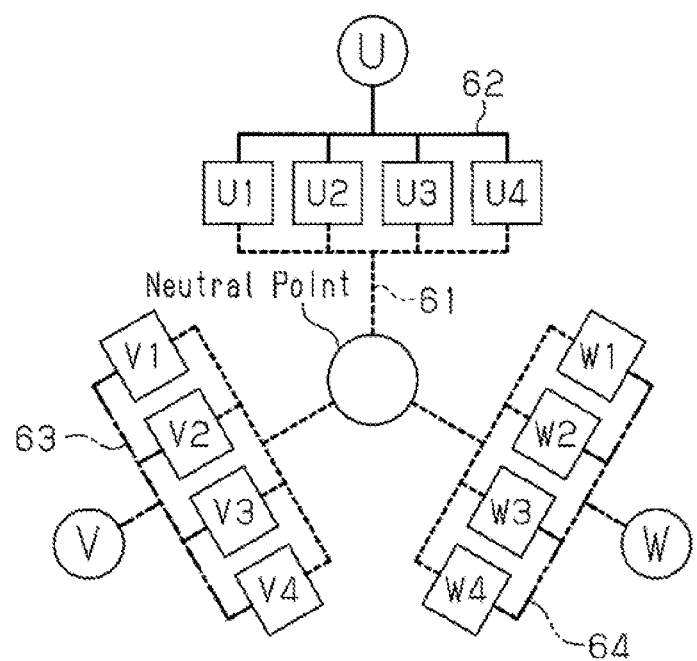
FIG. 11 is a diagram showing a connection state of coils in a bus bar device according to a second embodiment of the invention.

As described above, the connection wires 16a connected to the bus bars 61 to 64 also form the bus bar device 52. The connection wires 16a are electrically connected to the bus bars 61 to 64 only at the first to fourth connection intersection portions 65a to 65d so that the connection ends 16 of desired coils U1 to U4, V1 to V4, and W1 to W4 are connected to one another. Each of the connection wires 16a is electrically connected to only one of the four bus bars 61 to 64. The twenty-four connection wires 16a and the bus bars 61 to 64 are connected to one another as described above, and every second connection wire 16a, that is, a total of twelve connection wires 16a, are connected to the common bus bar 61. Further, every sixth connection wire 16a, that is, a total of four connection wires 16a, are connected to the U-phase bus bar 62. Every sixth connection wire 16a, that is, a total of four connection wires 16a, are connected to the V-phase bus bar 63. Every sixth connection wire 16a, that is, a total of four connection wires 16a, are connected to the W-phase bus bar 64. As a result, as shown in FIG. 11, the U-phase coils U1 to U4 are connected to one another in parallel by the U-phase bus bar 62 and the common bus bar 61, the V-phase coils V1 to V4 are connected to one another in parallel by the V-phase bus bar 63 and the common bus bar 61, and the W-phase coils W1 to W4 are connected to one another in parallel by the W-phase bus bar 64 and the common bus bar 61. The common bus bar 61 functions as a neutral point. The twelve coils U1 to U4, V1 to V4, and W1 to W4 are electrically connected to one another through the bus bar device 52 and Y-connected by the bus bar device 52. In FIG. 11, the common bus bar 61 is shown by broken lines, the U-phase bus bar 62 is shown by solid lines, the V-phase bus bar 63 is shown by single-dashed lines, and the W-phase bus bar 64 is shown by double-dashed lines.

As shown in FIG. 12, the U-phase power feeding portion 62a, the V-phase power feeding portion 63a, and the W-phase power feeding portion 64a are respectively electrically connected to power feeding terminals (not shown), which supply alternate current power having phases shifted from one another by 120°, in the same manner as the U-phase power feeding portion 31a, the V-phase power feeding portion 32a, and the W-phase power feeding portion 33a in the first embodiment. In the same manner as the stator 3 of the first embodiment, the stator 51 of the second embodiment is manufactured by the core segment arranging step, the bus bar arranging step, the connecting step, and the core segment molding step.

The second embodiment has the following advantage in addition to advantages (1) to (10) and (12) to (16) of the first embodiment.

(17) The bus bar device 52, which is reduced in size in the radial direction, can Y-connect the twelve coils U1 to U4, V1 to V4, and W1 to W4. Accordingly, the stator 51 can be reduced in size in the radial direction.

Third Embodiment

A third embodiment of the present invention will now be described with reference to the drawings. In the third embodiment, same reference numerals are given to those components that are the same as the corresponding components of the first embodiment. Such components will not be described.

Figure 13:
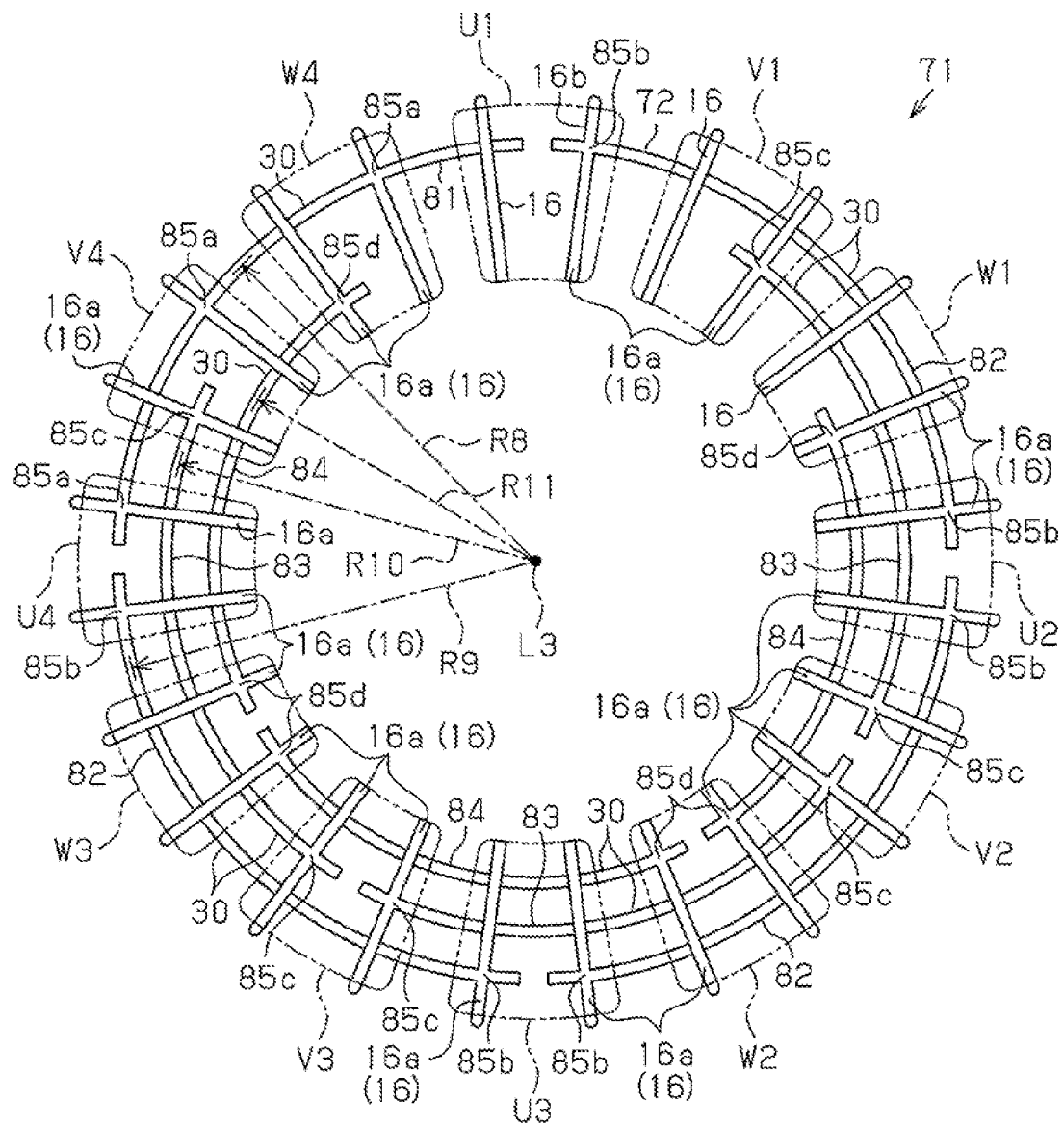
FIG. 13 is a schematic view of a stator according to a third embodiment of the invention.

As shown in FIG. 13, in the second embodiment, the brushless motor 1 includes a stator 71 in lieu of the stator 3 of the first embodiment. The stator 71 includes a bus bar device 72 in lieu of the bus bar device 21 of the first embodiment. The bus bar device 72 includes one common bus bar 81, three U-phase bus bars 82 supplied with U-phase current, three V-phase bus bars 83 supplied with V-phase current, and three W-phase bus bars 84 supplied with W-phase current. In the same manner as the bus bars 31 to 33 of the first embodiment, the bus bars 81 to 84 are held by an annular plate-like bus bar holder (not shown), which is made of insulative synthetic resin, in a state in which movement of the bus bars 81 to 84 in the radial direction is restricted.

The common bus bar 81 is formed by molding a single conductive wire 30 into a curved and arcuate shape. The radius R8 of the common bus bar 81 is set to be less than the distance between an outer ends of coils U1 to U4, V1 to V4, and W1 to W4 in the radial direction and a center axis L3 of a stator core 11 (see FIG. 1) and set to be greater than the distance between inner ends of the coils U1 to U4, V1 to V4, and W1 to W4 in the radial direction and the center axis L3 of the stator core 11. The length of the common bus bar 81 in the circumferential direction is set to a value allowing the common bus bar 81 to extend across six connection wires 16a arranged at 15° intervals in the circumferential direction.

Each of the U-phase bus bars 82 is formed by molding a single conductive wire 30 into a curved and arcuate shape. The U-phase bus bars 82 are formed to have the same shape as the common bus bar 81. That is, the radius R9 of the U-phase bus bar 82 is equal to the radius R8 of the common bus bar 61. The length of the U-phase bus bar 82 in the circumferential direction is set to a value allowing the U-phase bus bar 82 to extend across six connection wires 16a arranged at 15° intervals in the circumferential direction.

Each of the V-phase bus bars 83 is formed by molding a single conductive wire 30 into a curved and arcuate shape. The radius R10 of the V-phase bus bar 83 is set to be less than the radius R9 of the U-phase bus bar 82 and set to be greater than the distance between the inner ends of the coils U1 to U4, V1 to V4, and W1 to W4 in the radial direction and the center axis L3 of the stator core 11. The length of the V-phase bus bar 83 in the circumferential direction is set to a value allowing the V-phase bus bar 83 to extend across six connection wires 16a arranged at 15° intervals in the circumferential direction.

Each of the W-phase bus bars 84 is formed by molding a single conductive wire 30 into a curved and arcuate shape. The radius R11 of the W-phase bus bar 84 is set to be less than the radius R10 of the V-phase bus bar 83 and set to be greater than the distance between inner ends of the coils U1 to U4, W1 to W4, and W1 to W4 in the radial direction and the center axis L3 of the stator core 11. The length of the W-phase bus bar 84 in the circumferential direction is set to a value allowing the W-phase bus bar 84 to extend across six connection wires 16a arranged at 15° intervals in the circumferential direction.

The common bus bar 81, the U-phase bus bars 82, the V-phase bus bars 83, and the W-phase bus bars 84 are held by the bus bar holder (not shown) in a state in which they are arranged to form a plurality of layers in the radial direction without overlapping one another in the axial direction. More specifically, the single common bus bar 81 and the three U-phase bus bars 82 are arranged at equal angular intervals (90° intervals in the third embodiment) on the same circle in the circumferential direction. The three V-phase bus bars 83 are arranged at 90° intervals in the circumferential direction at the inner side of the common bus bar 81 and the U-phase bus bars 82, and the V-phase bus bars 83 are shifted from the three U-phase bus bars 82 by 30° in the circumferential direction (clockwise direction in FIG. 13). The three W-phase bus bars 84 are arranged at 90° intervals in the circumferential direction at the inner side of the V-phase bus bars 83, and the W-phase bus bars 84 are shifted from the three V-phase bus bars 83 by 30° in the circumferential direction (clockwise direction in FIG. 13). The bus bars 81 to 84 that are adjacent to each other in the radial direction are separated from each other in the radial direction. The bus bars 81 to 84 that are adjacent to each other in the circumferential direction are separated from each other in the circumferential direction. The bus bars 81 to 84 that are arranged at one axial end of the coils U1 to U4, V1 to V4, and W1 to W4 together with the bus bar holder are concentric with the center axis L3 of the stator core 11. The bus bars 81 to 84 form a plurality of layers in the radial direction of the coils U1 to U4, V1 to V4, and W1 to W4 (the same direction as the radial direction of the stator core 11) within a range of radial widths of the coils U1 to U4, V1 to V4, and W1 to W4.

Among the twenty-four connection ends 16, three connection ends 16, namely, one of the connection ends 16 in the coil U1, one of the connection ends 16 in the coil V1, and one of the connection ends 16 in the coil W1, are respectively electrically connected to power feeding terminals (not shown), which supply alternating current power having phases that are shifted from one another by 120°. The remaining twenty-one connection ends 16 are formed so that they are bent near their bases and extend along the radial direction thereby forming twenty-one connection wires 16a. The twenty-one connection wires 16a are overlapped with and intersect the common bus bar 81, the U-phase bus bars 82, the V-phase bus bars 83, and the W-phase bus bars 84 in the axial direction.

Here, one of the connection wires 16a of the coil U1 is defined as a reference connection wire 16b. Three connection wires 16a, namely, the sixteenth one from the reference connection wire 16b in the clockwise direction, which is one of the connection wires 16a of the coil U4, the eighteenth one, which is one of the connection wires 16a of the coil V4, and the twentieth one, which is one of the connection wires 16a of the coil W4, intersect with the common bus bar 81 and form first connection intersection portions 85a intersecting with the common bus bars 81. The first connection intersection portions 85a are welded to electrically connect one connection wire 16a of the coil U4, one connection wire 16a of the coil V4, and one connection wire 16a of the coil W4 to the common bus bar 61.

The reference connection wire 16b and the third one from the reference connection wire 16b in the clockwise direction, which is one of the connection wires 16a of the coil U2, are separated from each other by 75° in the circumferential direction and both intersect with the one of the three U-phase bus bars 82 located at the leading side of the common bus bar 81 in the clockwise direction as the connection wires 16a and form second connection intersection portions 85b intersecting with the U-phase bus bar 82. Two of the connection wires 16a, namely, the fourth one from the reference connection wire 16b in the clockwise direction, which is the other connection wire 16a of the coil U2, and the ninth one, which is one of the connection wires 16a of the coil U3, are separated from each other by 75° in the circumferential direction. The two connection wires 16*a* intersect a central one of the three U-phase bus bars 82 and form second connection intersection portions 85*b* intersecting with the U-phase bus bar 82. Two of the connection wires 16*a*, namely, the tenth one from the reference connection wire 16*b* in the clockwise direction, which is the other connection wire 16*a* of the coil U3, and the fifteenth one, which is the other connection wire 16*a* of the coil U4, are separated from each other by 75° in the circumferential direction. The two connection wires 16*a* intersect with the remaining U-phase bus bar 82 and form second connection intersection portions 85*b* intersecting with the remaining U-phase bus bar 82. The second connection intersection portions 85*b* are welded to electrically connect the six connection wires 16*a* to the U-phase bus bars 82, which intersect with the connection wires 16*a*.

Two of the connection wires 16*a*, namely, the first one from the reference connection wire 16*b* in the clockwise direction, which is the connection wire 16*a* in coil V1 and the fifth one, which is one of the connection wires 16*a* of the coil V2, are separated from each other by 75° in the circumferential direction. The two connection wires 16*a* intersect the one of the three V-phase bus bars 83 located at a leading side of the common bus bar 81 in the clockwise direction and form third connection intersection portions 85*c*, which intersect with the V-phase bus bar 83. Two of the connection wires 16*a*, namely, the sixth one from the reference connection wire 16*b* in the clockwise direction, which is the other connection wire 16*a* of the coil V2, and the eleventh one, which is one of the connection wires 16*a* of the coil V3, are separated from each other by 75° in the circumferential direction. The two connection wires 16*a* intersect a central one of the three V-phase bus bars 83 and form third connection intersection portions 85*c*, which intersect with the V-phase bus bar 83. Two of the connection wires 16*a*, namely, the twelfth one from the reference connection wire 16*b* in the clockwise direction, which is the other one of the connection wires 16*a* of the coil V3, and the seventeenth one, which is the other connection wire 16*a* of the coil V4, are separated from each other by 75° in the circumferential direction. The two connection wires 16*a* intersect with the remaining V-phase bus bar 83 and form third connection intersection portions 85*c*, which intersect with the V-phase bus bar 83. The third connection intersection portions 85*c* are welded to electrically connect the six connection wires 16*a* to the V-phase bus bars 83, which intersect with the connection wires 16*a*.

Two of the connection wires 16*a*, namely, the second one from the reference connection wire 16*b* in the clockwise direction, which is the connection wire 16*a* of the coil W1, and the seventh one, which is one of the connection wires 16*a* of the coil W2, are separated from each other by 75° in the circumferential direction. The two connection wires 16*a* intersect with the one of the three W-phase bus bars 84 located at a leading side of the common bus bar 81 in the clockwise direction and form fourth connection intersection portions 85*d* intersecting with the W-phase bus bar 84. Two of the connection wires 16*a*, namely, the eighth one from the reference connection wire 16*b* in the clockwise direction, which is the other one of the connection wires 16*a* of the coil W2, and the thirteenth one, which is one of the connection wires 16*a* of the coil W3, are separated from each other by 75° in the circumferential direction. The two connection wires 16*a* intersect with a central one of the three W-phase bus bars 84 and form fourth connection intersection portions 85*d* intersecting with the W-phase bus bar 84. Two of the connection wires 16*a*, namely, the fourteenth one from the reference connection wire 16*b* in the clockwise direction, which is the other one of the connection wires 16*a* of the coil W3, and the nineteenth one, which is the other one of the connection wires 16*a* of the coil W4, are separated from each other by 75° in the circumferential direction. The two connection wires 16*a* intersect with the remaining W-phase bus bar 84 and form fourth connection intersection portions 85*d* intersecting with the W-phase bus bar 84. The fourth connection intersection portions 85*d* are welded to electrically connect the six connection wires 16*a* to the W-phase bus bars 84, which intersect with the connection wires 16*a*.

Figure 14:
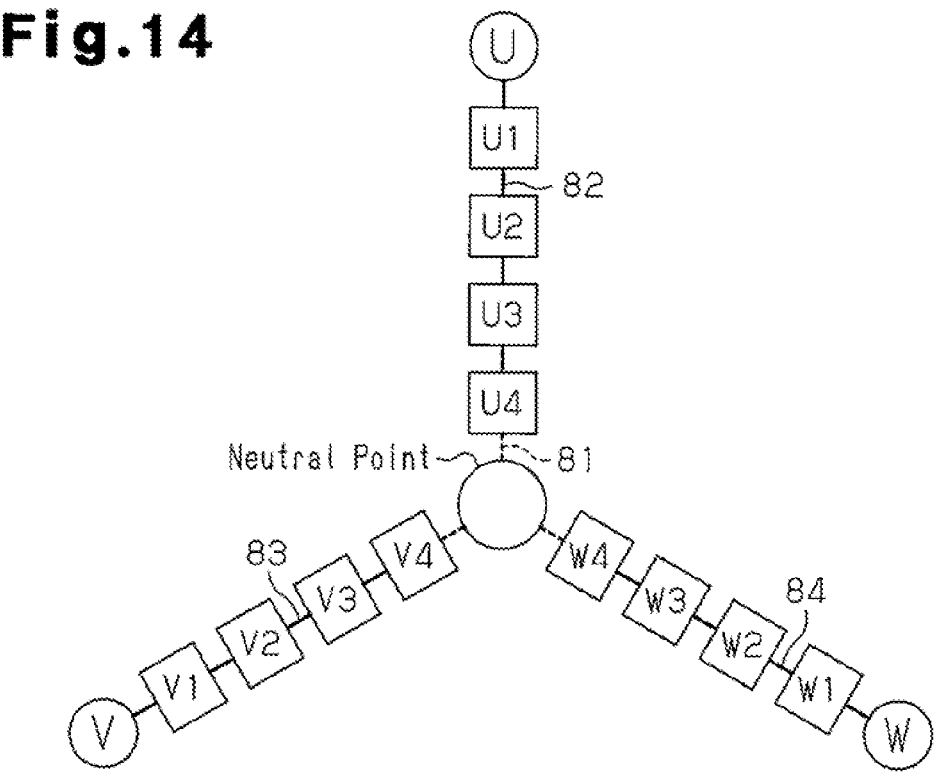
FIG. 14 is a diagram showing a connection state of coils in a bus bar device shown in FIG. 13.

The connection wires 16*a* connected to the bus bars 81 to 84 also form the bus bar device 72. The connection wires 16*a* are electrically connected to the bus bars 81 to 85 only at the first to fourth connection intersection portions 85*a* to 85*d* so that the connection ends 16 of desired coils U1 to U4, V1 to V4, and W1 to W4 are connected to one another. Each of the connection wires 16*a* is electrically connected only to one of the four bus bars 81 to 84. The twenty-one connection wires 16*a* and the bus bars 81 to 84 are connected to one another as described above. Thus, the U-phase coils U1 to U4 are connected in series by the U-phase bus bar 82, the V-phase coils V1 to V4 are connected in series by the V-phase bus bar 83, and the W-phase coils W1 to W4 are connected in series by the W-phase bus bar 84 as shown in FIG. 14. The common bus bar 61 functions as a neutral point. The twelve coils U1 to U4, V1 to V4, and W1 to W4 are electrically connected to one another through the bus bar device 72 and Y-connected by the bus bar device 72.

In the same manner as the stator 3 of the first embodiment, the stator 71 of the third embodiment is manufactured through the core segment arranging step, the bus bar arranging step, the connecting step, and the core segment molding step.

The third embodiment has the following advantages in addition to the merits (1) to (6), (8) to (10), (12), (13) and (16) of the first embodiment.

(18) The bus bar device 72, which is reduced in size in the radial direction, allows for the twelve coils U1 to U4, V1 to V4, and W1 to W4 to be Y-connected. Accordingly, the stator 71 can be reduced in size in the radial direction.

(19) The radii R9 of the three U-phase bus bars 82 are fixed. Thus, the U-phase bus bars 82 are arranged on the same circle. In the same manner, the radii R10 of the three V-phase bus bars 83 are fixed. Thus, the U-phase bus bars 83 are arranged on the same circle. Further, the radii R11 of the three W-phase bus bars 84 are fixed. Thus, the U-phase bus bars 84 are arranged on the same circle. In the third embodiment, the radius R8 of the common bus bar 81 is the same as the radius R9 of the U-phase bus bar 82. Thus, the common bus bar 81 is arranged on the same circle as the U-phase bus bars 82. Accordingly, in the bus bar device 72 of the third embodiment, the bus bars 81 to 84 are arranged so that three layers are formed in the radial direction. Hence, the U-phase bus bars 82 do not form a plurality of layers in the radial direction with one another, the V-phase bus bars 83 do not form a plurality of layers in the radial direction with one another, and the W-phase bus bars 84 do not form a plurality of layers in the radial direction with one another. As a result, the number of bus bars 81 to 84 overlapped in the radial direction can be reduced. Thus, the bus bar device 72, which includes the three U-phase bus bars 82, the three V-phase bus bars 83, and the two W-phase bus bars 84, can be reduced in size in the radial direction.

Fourth Embodiment

A fourth embodiment of the present invention will now be described with reference to the drawings. In the fourth embodiment, same reference numerals are given to those components that are the same as the corresponding components of the first embodiment. Such components will not be described.

Figure 16:
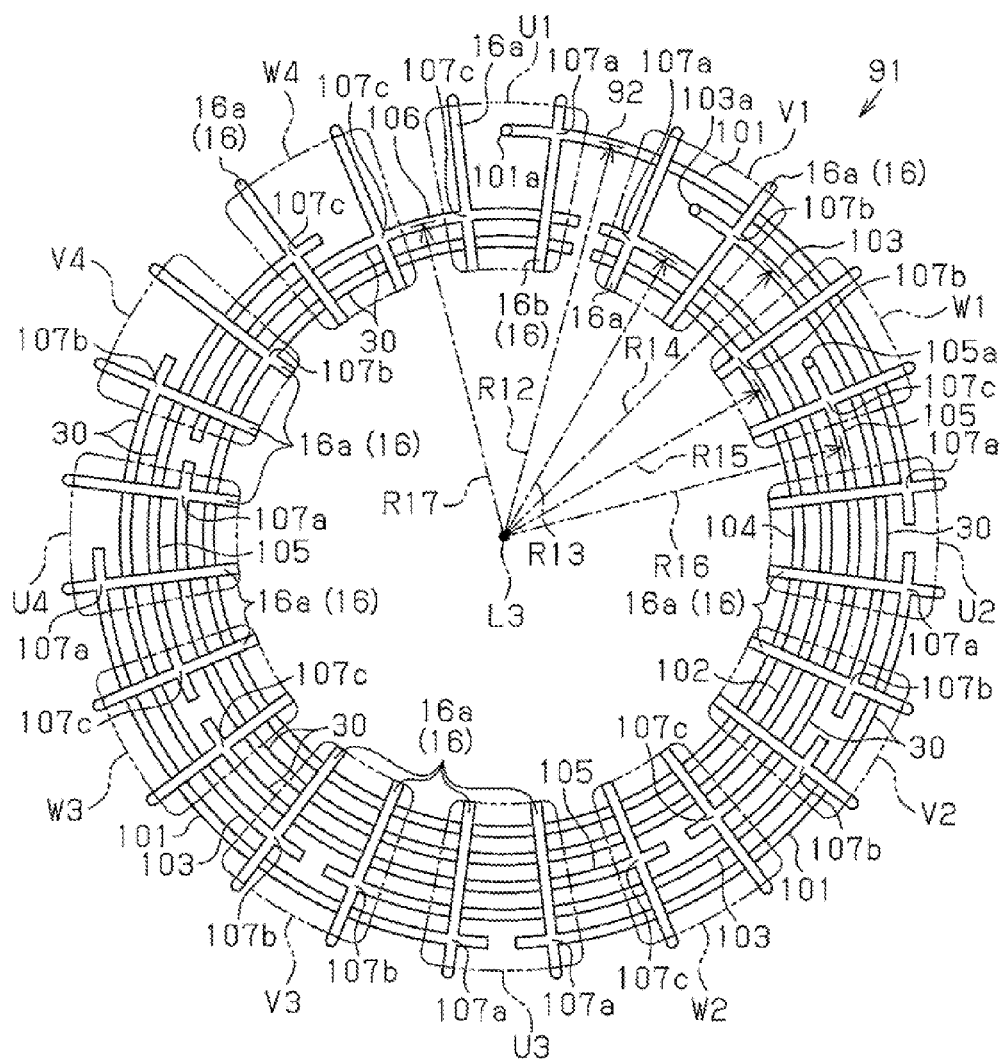
FIG. 16 is a schematic view of a stator according to the fourth embodiment of the invention.

As shown in FIG. 16, in the fourth embodiment, the brushless motor 1 includes a stator 91 in lieu of the stator 3 of the first embodiment. The stator 91 includes a bus bar device 92 in lieu of the bus bar device 21 of the first embodiment. The bus bar device 92 includes three first U-phase bus bars 101, one second U-phase bus bar 102, three first V-phase bus bars 103, one second V-phase bus bar 104, three first W-phase bus bars 105, and one second W-phase bus bar 106. In the same manner as the bus bars 31 to 33 of the first embodiment, the bus bars 101 to 106 are held by an annular plate-like bus bar holder (not shown), which is made of insulative synthetic resin, in a state in which movement of the bus bars 101 to 106 in the radial direction is restricted.

Each of the three first U-phase bus bars 101 is formed by molding a single conductive wire 30 into a curved and arcuate shape. The radius R12 of the first U-phase bus bar 101 is set to be less than the distance between outer ends of coils U1 to U4, V1 to V4, and W1 to W4 in the radial direction and a center axis L3 of a stator core 11 (see FIG. 1) and is to be greater than the distance between inner ends of the coils U1 to U4, V1 to V4, and W1 to W4 in the radial direction and the center axis L3 of the stator core 11. The length of the first U-phase bus bar 101 in the circumferential direction is set to a value allowing the first U-phase bus bar 101 to extend across six connection wires 16a arranged at 15° intervals in the circumferential direction.

The single second U-phase bus bar 102 is formed by molding a single conductive wire 30 into a curved and arcuate shape. The radius R13 of the second U-phase bus bar 102 is set to be less than the radius 12 of the first U-phase bus bar 101 and set to be greater than the distance between the inner ends of the coils U1 to U4, V1 to V4, and W1 to W4 in the radial direction and the center axis L3 of the stator core 11. The length of the second U-phase bus bar 102 in the circumferential direction is set to a value allowing the second U-phase bus bar 102 to extend across eighteen connection wires 16a arranged at 15° intervals in the circumferential direction.

Each of the three first V-phase bus bars 103 is formed by molding a single conductive wire 30 into a curved and arcuate shape. The radius R14 of the first V-phase bus bar 103 is set to be less than the radius R12 of the first U-phase bus bar 101 and set to be greater than the radius R13 of the second U-phase bus bar 102. The length of the first V-phase bus bar 103 in the circumferential direction is set to a value allowing the first V-phase bus bar 103 to extend across six connection wires 16a arranged at 15° intervals in the circumferential direction.

The single second V-phase bus bar 104 is formed by molding a single conductive wire 30 into a curved and arcuate shape. The radius R15 of the second V-phase bus bar 104 is set to be less than the radius R13 of the second U-phase bus bar 102 and set to be greater than the distance between the inner ends of the coils U1 to U4, V1 to V4, and W1 to W4 in the radial direction and the center axis L3 of the stator core 11. The length of the second V-phase bus bar 104 in the circumferential direction is set to a value allowing the second V-phase bus bar 104 to extend across eighteen connection wires 16a arranged at 15° intervals in the circumferential direction.

Each of the three first W-phase bus bars 105 is formed by molding a single conductive wire 30 into a curved and arcuate shape. The radius R16 of the first W-phase bus bar 105 is set to be less than the radius R14 of the first V-phase bus bar 103 and set to be greater than the radius R13 of the second U-phase bus bar 102. The length of the first W-phase bus bar 105 in the circumferential direction is set to a value that allows the first W-phase bus bar 105 to extend across six connection wires 16a arranged at 15° intervals in the circumferential direction.

The single second W-phase bus bar 106 is formed by molding a single conductive wire 30 into a curved and arcuate shape. The radius R17 of the second W-phase bus bar 106 is set to be the same as the radius R13 of the second U-phase bus bar 102. The length of the second W-phase bus bar 106 in the circumferential direction is set to a value allowing the second W-phase bus bar 106 to extend across at least two connection wires 16a arranged at 15° intervals in the circumferential direction.

The three first U-phase bus bars 101, the single second U-phase bus bar 102, the three first V-phase bus bars 103, the single second V-phase bus bar 104, the three first W-phase bus bars 105, and the single second W-phase bus bar 106 are held by the bus bar holder (not shown) in a state forming a plurality of layers in the radial direction without overlapping each other in the axial direction. More specifically, the three first U-phase bus bars 101 are arranged at equal angular intervals (90° intervals in fourth embodiment) in the circumferential direction on the same circle. The three first V-phase bus bars 103 are arranged at 90° intervals in the circumferential direction inside of the three first U-phase bus bars 101, and the three first V-phase bus bars 103 are shifted from the three first U-phase bus bars 101 by 30° in the circumferential direction (clockwise direction in FIG. 16). The three first W-phase bus bars 105 are arranged at 90° intervals in the circumferential direction at the inner side of the three first V-phase bus bars 103, and the three first W-phase bus bars 105 are shifted from the three first V-phase bus bars 103 by 30° in the circumferential direction (clockwise direction in FIG. 16). At the inner side of the three first W-phase bus bars 105, the second U-phase bus bar 102 and the second W-phase bus bar 106 are arranged adjacent to each other in the circumferential direction on the same circle. The second V-phase bus bar 104 is arranged at the inner side of the second U-phase bus bar 102 and the second W-phase bus bar 106. The bus bars 101 to 106 which are adjacent to each other in the radial direction are separated from each other in the radial direction, and the bus bars 101 to 106 which are adjacent to each other in the circumferential direction are separated from each other in the circumferential direction. The bus bars 101 to 106 which are arranged on one axial side of the coils U1 to U4, V1 to V4, and W1 to W4 in together with the bus bar holder are concentric with the center axis L3 of the stator core 11. The bus bars 101 to 106 form the plurality of layers in the radial direction of the coils U1 to U4, V1 to V4, and W1 to W4 (the same direction as the radial direction of the stator core 11) within the range of radial widths of the coils U1 to U4, V1 to V4, and W1 to W4.

A total twenty-four connection wires 16a, which are distal portions of the connection ends 16, are arranged extending along the radial direction to overlap and intersect the bus bars 101 to 106 in the axial direction.

One of the two connection wires 16a of the coil U1 (connection wire 16a located at a leading side in the clockwise direction in FIG. 16) is defined as a reference connection wire 16b. Two of the connection wires 16a, namely, the reference connection wire 16b and the fifth one in the clockwise direction, which is one of the connection wires 16a in the fifth coil U2, are separated from one each other by 75° in the circumferential direction. The two connection wires 16a and 16b intersect with one of the first U-phase bus bars 101 as the connection wires 16a and form first connection intersection portions 107a, which intersect with the first U-phase bus bar 101. Two of the connection wires 16a, namely, the sixth one from the reference connection wire 16b in the clockwise direction, which is the other connection wire 16a in the sixth coil U2, and the eleventh one, which is one of the connection wires 16a of the coil U3, are separated from each other by 75° in the circumferential direction. The two connection wires 16a intersect another first U-phase bus bar 101 and form first connection intersection portions 107a, which intersect with the first U-phase bus bar 101. Two of the connection wires 16a, namely, the twelfth one from the reference connection wire 16b in the clockwise direction, which is the other connection wire 16a of the coil U3, and the seventeenth one, which is one of the connection wires 16a of the coil U4, are separated by 75° from one each other in the circumferential direction. The two connection wires 16a intersect with the remaining first U-phase bus bar 101 and form first connection intersection portions 107a, which intersects with the first U-phase bus bar 101. Further, two of the connection wires 16a, namely, the first one from the reference connection wire 16b in the clockwise direction, which is one of the connection wires 16a of the coil V1, and the eighteenth one, which is the other connection wire 16a of the coil U4, are separated from one another by 255° in the circumferential direction. The two connection wires 16a intersect with the second U-phase bus bar 102 and form first connection intersection portions 107a, which intersect with the second U-phase bus bar 102. The first connection intersection portions 107a are welded and electrically connect the eight connection wires 16a to the first U-phase bus bars 101 intersecting with the connection wires 16a or the second U-phase bus bar 102 intersecting with the connection wires 16a.

Two of the connection wires 16a, namely, the second one from the reference connection wire 16b in the clockwise direction, which is the other connection wire 16a of the second coil V1, and the seventh one, which is one of the connection wires 16a of the coil V2, are separated from one another by 75° in the circumferential direction. The two connection wires 16a intersect with one of the first V-phase bus bars 103 and form second connection intersection portions 107b, which intersect with the first V-phase bus bar 103. Two of the connection wires 16a, namely, the eighth one from the reference connection wire 16b in the clockwise direction, which is the other connection wire 16a of the coil V2, and the thirteenth one, which is one of the connection wires 16a of the coil V3, are separated from each other by 75° in the circumferential direction. The two connection wires 16a intersect with another first V-phase bus bars 103 and form second connection intersection portions 107b, which intersect with the first V-phase bus bar 103. Two of the connection wires 16a, namely, the fourteenth one from the reference connection wire 16b in the clockwise direction, which includes the other connection wire 16a of the coil V3, and the nineteenth one, which is one of the connection wires 16a of the coil V4, are separated from one another by 75° in the circumferential direction. The two connection wires 16a intersect with the remaining first V-phase bus bar 103 and form second connection intersection portions 107b, which intersect with the first V-phase bus bar 103. Two of the connection wires 16a, namely, the third one from the reference connection wire 16b in the clockwise direction, which is one of the connection wires 16 in the coil W1, and the twentieth one, which is the other connection wire 16a of the coil V4, and are separated from one another by 255° in the circumferential direction. The two connection wires 16a intersect with the second V-phase bus bar 104 and form second connection intersection portions 107b, which intersect with the second U-phase bus bar 102. The second connection intersection portions 107b are welded to electrically connect the eight connection wires 16a to the first V-phase bus bars 103 intersecting with the connection wires 16a or the second V-phase bus bar 104 intersecting with the connection wires 16a.

Two of the connection wires 16a, namely, the fourth one from the reference connection wire 16b in the clockwise direction, which includes the other connection wire 16a of coil W1, and the ninth one, which is one of the connection wires 16a of the coil W2, are separated from one another by 75° in the circumferential direction. The two connection wires 16a intersect with one of the first W-phase bus bars 105 and form third connection intersection portions 107c, which intersect with the first W-phase bus bar 105. Two of the connection wires 16a, namely, the tenth one from the reference connection wire 16b in the clockwise direction, which is the other connection wire 16a of the coil W2, and the fifteenth one, which is one of the connection wires 16a of the coil W3, are separated from one another by 75° in the circumferential direction. The two connection wires 16a intersect with another first W-phase bus bar 105 and form third connection intersection portions 107c, which intersect with the first W-phase bus bar 105. Two of the connection wires 16a, namely, a sixteenth one from the reference connection wire 16b in the clockwise direction, which is the other connection wire 16a of the coil W3, and a twenty-first one, which is one of the connection wires 16a of the coil W4, are separated from one another by 75° in the circumferential direction. The two connection wires 16a intersect with the remaining first W-phase bus bar 105 and form third connection intersection portions 107c, which intersect with the first W-phase bus bar 105. Two of the connection wires 16a, namely, a twenty-second one from the reference connection wire 16b in the clockwise direction, which is the other connection wire 16a of the coil W4, and a twenty-third one, which is the other connection wire 16a of the coil U1, are separated from one another by 15° in the circumferential direction. The two connection wires 16a intersect with the second W-phase bus bar 106 and form third connection intersection portions 107c, which intersect with the second W-phase bus bar 106. The third connection intersection portions 107c are welded and electrically connect the eight connection wires 16a to the first W-phase bus bar 105 intersecting with the connection wires 16a or the second W-phase bus bar 106 intersecting with the connection wires 16a.

Figure 15:
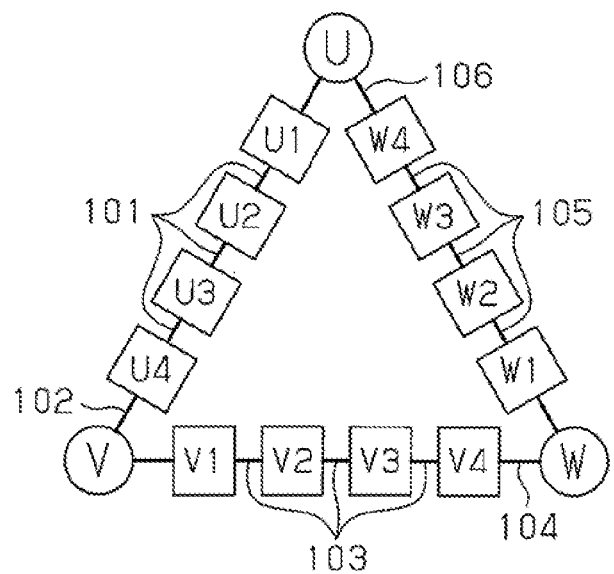
FIG. 15 is a diagram showing a connection state of coils in a bus bar device according to a fourth embodiment of the invention.

The connection wires 16a connected to the bus bars 101 to 106 also form the bus bar device 92. The connection wires 16a are electrically connected to the bus bars 101 to 106 only at the first to third connection intersection portions 107a to 107c so that the connection ends 16 of desired coils U1 to U4, V1 to V4, and W1 to W4 are connected to one another. Each of the connection wires 16a is electrically connected only to one of the bus bars 101 to 106. Since the twenty-four connection wires 16a and the bus bars 101 to 106 are connected to one another as described above, the U-phase coils U1 to U4 are connected to one another in series by the first U-phase bus bar 101, the V-phase coils V1 to V4 are connected to one another in series by the first V-phase bus bar 103, and the W-phase coils W1 to W4 are connected to one another in series by the first W-phase bus bar 105 as shown in FIG. 15. The series-connected U-phase coils U1 to U4 and the series-connected V-phase coils V1 to V4 are connected in series by the second U-phase bus bar 102. Further, the series-connected V-phase coils V1 to V4 and the series-connected W-phase coils W1 to W4 are connected in series by the second V-phase bus bar 104. The series-connected W-phase coils W1 to W4 and the series-connected U-phase coils U1 to U4 are connected in series by the second W-phase bus bar 106. The twelve coils U1 to U4, V1 to V4, and W1 to W4 are electrically connected to one another by the bus bar device 92, and the coils are delta-connected to one another by the bus bar device 92.

As shown in FIG. 16, one of the three first U-phase bus bars 101 to which one of the connection wires 16a of the coil U1 is connected includes a circumferential end defining a U-phase power feeding portion 101a, which is bent from the first U-phase bus bar 101 and extends along the axial direction. The U-phase power feeding portion 101a is formed integrally with the first U-phase bus bar 101. One of the three first V-phase bus bars 103 to which the other connection wire 16a of the coil V1 is connected includes a circumferential end defining a V-phase power feeding portion 103a, which is bent from the first V-phase bus bar 103 and extends along the axial direction. The V-phase power feeding portion 103a is formed integrally with the first V-phase bus bar 103. One of the three first W-phase bus bars 105 to which the other connection wire 16a of the coil W1 is connected includes a circumferential end defining a W-phase power feeding portion 105a, which is bent from the first W-phase bus bar 105 and extends along the axial direction. The W-phase power feeding portion 105a is formed integrally with the first W-phase bus bar 105. In the same manner as the U-phase power feeding portion 31a, the V-phase power feeding portion 32a, and the W-phase power feeding portion 33a of the first embodiment, the U-phase power feeding portion 101a, the V-phase power feeding portion 103a, and the W-phase power feeding portion 105a are electrically connected to power feeding terminals (not shown), which supply alternating current power having phases that are shifted from one another by 120°.

In the same manner as the stator 3 of the first embodiment, the stator 91 of the fourth embodiment is manufactured through the core segment arranging step, the bus bar arranging step, the connecting step, and the core segment molding step.

The fourth embodiment has the following advantage in addition to advantages (1) to (10) and (12) to (16) of the first embodiment as described above.

(20) The twelve coils U1 to U4, V1 to V4, and W1 to W4 can be delta-connected by the bus bar device 92, which is reduced in size in the radial direction. Accordingly, the stator 91 can be reduced in size in the radial direction.

Fifth Embodiment

A fifth embodiment of the present invention will now be described with reference to the drawings. In the fifth embodiment, same reference numerals are given to those components that are the same as the corresponding components of the first embodiment. Such components will not be described.

Figure 17:
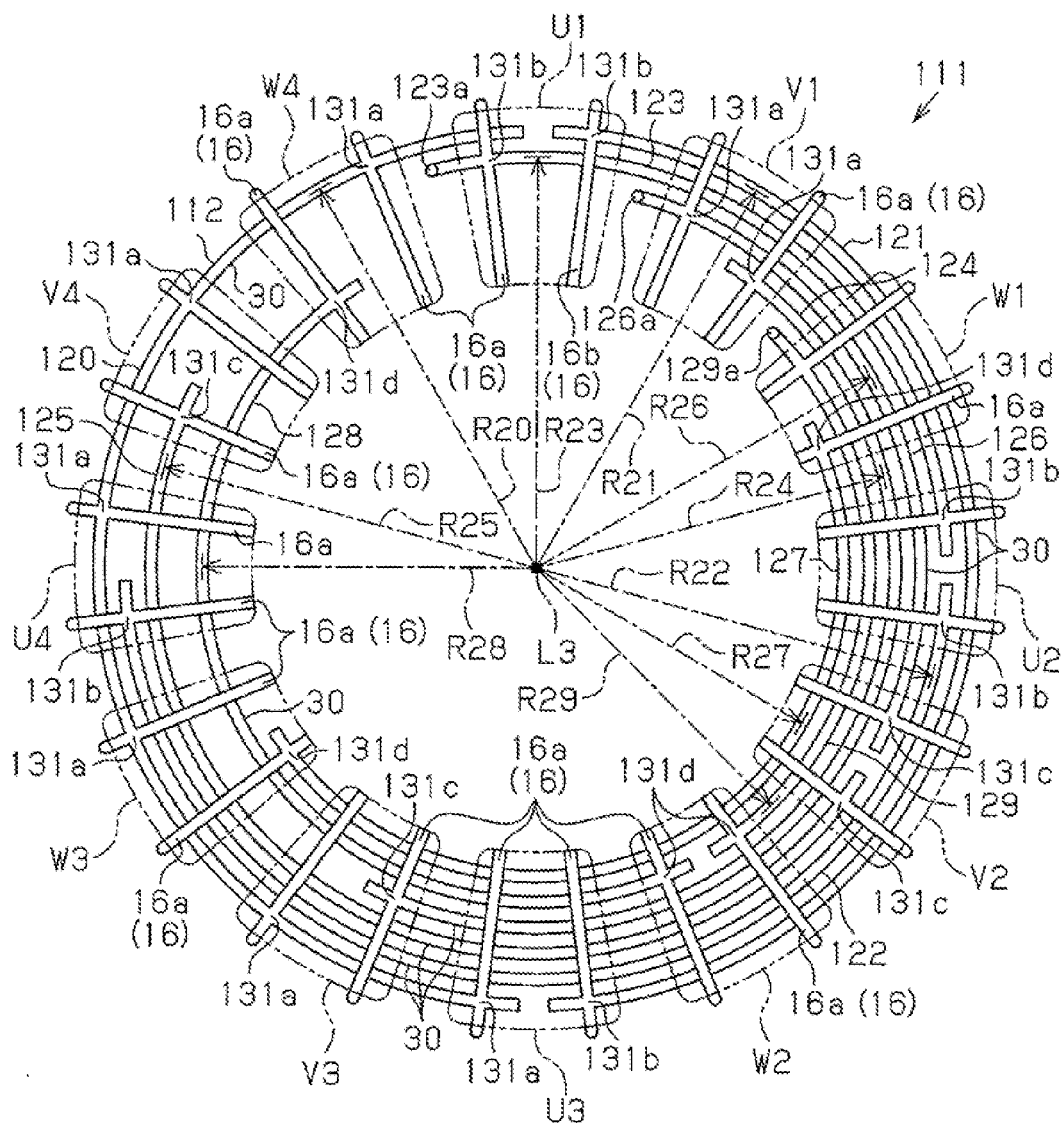
FIG. 17 is a schematic view of a stator according to a fifth embodiment of the invention.

As shown in FIG. 17, in the fifth embodiment, the brushless motor 1 includes a stator 111 in lieu of the stator 3 of the first embodiment. The stator 111 includes a bus bar device 112 in lieu of the bus bar device 21 of the first embodiment. The bus bar device 112 includes one common bus bar 120, three U-phase bus bars 121 to 123, three V-phase bus bars 124 to 126, and three W-phase bus bars 127 to 129. In the same manner as the bus bars 31 to 33 of the first embodiment, the bus bars 120 to 129 are held by an annular plate-like bus bar holder (not shown), which is made of insulative synthetic resin, in a state in which movement of the bus bars 120 to 129 in the radial direction is restricted.

The common bus bar 120 is formed by molding a single conductive wire 30 into a curved and arcuate shape. The radius R20 of the common bus bar 120 is set to be less than the distance between outer ends of coils U1 to U4, V1 to V4, and W1 to W4 in the radial direction and a center axis L3 of a stator core 11 (see FIG. 1) and set to be greater than the distance between inner ends of the coils U1 to U4, V1 to V4, and W1 to W4 in the radial direction and the center axis L3 of the stator core 11. The length of the common bus bar 120 in the circumferential direction is set to a value allowing the common bus bar 120 to extend across at least eleven connection wires 16a arranged at 15° intervals in the circumferential direction.

Each of the first U-phase bus bar 121, the second U-phase bus bar 122, and the third U-phase bus bar 123 is formed by molding a single conductive wire 30 into a curved and arcuate shape. The radius R21 of the first U-phase bus bar 121 is the same as the radius R20 of the common bus bar 120. The radius R22 of the second U-phase bus bar 122 is set to be less than the radius R22 of the first U-phase bus bar 121 and set to be greater than the distance between inner ends of the coils U1 to U4, V1 to V4, and W1 to W4 in the radial direction and the center axis L3 of the stator core 11. The radius R23 of the third U-phase bus bar 123 is the same as the radius R22 of the second U-phase bus bar 122. The length of each of the first U-phase bus bar 121 and the second U-phase bus bar 122 is set to a value allowing the bus bar to extend across twelve connection wires 16a arranged at 15° intervals in the circumferential direction. The length of the third U-phase bus bar 123 in the circumferential direction is set to a value allowing the third U-phase bus bar 123 to extend across seven connection wires 16a arranged at 15° intervals in the circumferential direction.

Each of the first V-phase bus bar 124, the second V-phase bus bar 125, and the third V-phase bus bar 126 is formed by molding a single conductive wire 30 into a curved and arcuate shape. The radius R24 of the first V-phase bus bar 124 is set to be less than the radius R22 of the second U-phase bus bar 122 and set to be greater than the distance between the inner ends of the coils U1 to U4, V1 to V4, and W1 to W4 in the radial direction and the center axis L3 of the stator core 11. The radius R25 of the second V-phase bus bar 125 is set to be less than the radius R22 of the second U-phase bus bar 122 and set to be greater than the radius R24 of the first V-phase bus bar 124. The radius R26 of the third V-phase bus bar 126 is the same as the radius R25 of the second V-phase bus bar 125. The length of each of the first V-phase bus bar 124 and the second V-phase bus bar 125 in the circumferential direction is set to a value that allows the bus bar to extend across twelve connection wires 16a arranged at 15° intervals in the circumferential direction. The length of the third V-phase bus bar 126 in the circumferential direction is set to a value allowing the third V-phase bus bar 126 to extend across seven connection wires 16a arranged at 15° intervals in the circumferential direction.

Each of the first W-phase bus bar 127, the second W-phase bus bar 128, and the third W-phase bus bar 129 is formed by molding a single conductive wire 30 into a curved and arcuate shape. The radius R27 of the first W-phase bus bar 127 is set to be less than the radius R24 of the first V-phase bus bar 124 and set to be greater than the distance between the inner ends of the coils U1 to U4, V1 to V4, and W1 to W4 in the radial direction and the center axis L3 of the stator core 11. The radius R28 of the second W-phase bus bar 128 is set to be less than the radius R24 of the first V-phase bus bar 124 and set to be greater than the radius R27 of the first W-phase bus bar 127. The radius R29 of the third W-phase bus bar 129 is the same as the radius R28 of the second W-phase bus bar 128. The length of each of the first W-phase bus bar 127 and the second W-phase bus bar 128 is set to a value allowing the bus bar to extend across twelve connection wires 16a arranged at 15° intervals in the circumferential direction. The length of the third W-phase bus bar 129 in the circumferential direction is set to a value allowing the third W-phase bus bar 129 to extend across seven connection wires 16a arranged at 15° intervals in the circumferential direction.

The common bus bar 120, the first to third U-phase bus bars 121 to 123, the first to third V-phase bus bars 124 to 126, and the first to third W-phase bus bars 127 to 129 are held by the bus bar holder (not shown) in a state forming a plurality of layers in the radial direction without overlapping each other in the axial direction. More specifically, the common bus bar 120 and the first U-phase bus bar 121 are arranged adjacent to each other in the circumferential direction on the same circle. The second U-phase bus bar 122 is arranged at the inner side of the common bus bar 120 and the first U-phase bus bar 121 so that the second U-phase bus bar 122 is shifted from the first U-phase bus bar 121 by 90° in the circumferential direction (clockwise direction in FIG. 17). The third U-phase bus bar 123 is arranged on the same circle as the second U-phase bus bar 122 at a leading side of the second U-phase bus bar 122 in a counterclockwise direction. The second V-phase bus bar 125 is arranged at the inner side of the second U-phase bus bar 122 so that the second V-phase bus bar 125 is shifted from the second U-phase bus bar 122 by 30° in the circumferential direction (clockwise direction in FIG. 17). The third V-phase bus bar 126 is arranged on the same circle as the second V-phase bus bar 125 at a leading side of the second V-phase bus bar 125 in the counterclockwise direction. The first V-phase bus bar 124 is arranged at the inner side of the second V-phase bus bar 125 and the third V-phase bus bar 126 so that the first V-phase bus bar 124 is shifted from the first U-phase bus bar 121 by 30° in the circumferential direction (clockwise direction in FIG. 17). The second W-phase bus bar 128 is arranged at the inner side of the first V-phase bus bar 124 so that the second W-phase bus bar 128 is shifted from the second V-phase bus bar 125 by 30° in the circumferential direction (clockwise direction in FIG. 17). The third W-phase bus bar 129 is arranged on the same circle as the second W-phase bus bar 128 at a leading side of the second W-phase bus bar 128 in the counterclockwise direction. The first W-phase bus bar 127 is arranged at the inner side of the second W-phase bus bar 128 and the third W-phase bus bar 129 so that the first W-phase bus bar 127 is shifted from the first V-phase bus bar 124 by 30° in the circumferential direction (clockwise direction in FIG. 17).

The bus bars 120 to 129, which are adjacent to each other in the radial direction, are separated from each other in the radial direction. Further, the bus bars 120 to 129, which are adjacent to each other in the circumferential direction, are separated from each other in the circumferential direction. The bus bars 120 to 129, which are arranged on one axial side of the coils U1 to U4, V1 to V4, and W1 to W4 in the axial direction together with the bus bar holder, are concentric with the center axis L3 of the stator core 11. The bus bars 120 to 129 form the plurality of layers in the radial direction of the coils U1 to U4, V1 to V4, and W1 to W4 (the same direction as the radial direction of the stator core 11) within the range of radial widths of the coils U1 to U4, V1 to V4, and W1 to W4.

A total of twenty-four connection wires 16a, which are distal end portions of connection ends 16, are arranged so that the connection wires 16a extend along the radial direction. Thus, the connection wires 16a overlap and intersect with the bus bars 120 to 129 in the axial direction.

One of the two connection wires 16a of the coil U1 (connection wire 16a located at a leading side in the clockwise direction in FIG. 17) is defined as a reference connection wire 16b. Six of the connection wires 16a, namely, the twelfth one from the reference connection wire 16b in the clockwise direction, which include one of the connection wires 16a of the coil U3, the fourteenth one, which is one of the connection wires 16a of the coil V3, the sixteenth one, which is one of the connection wires 16a of the coil W3, the eighteenth one, which is one of the connection wires 16a of the coil U4, the twentieth one, which is one of the connection wires 16a of the coil V4, and the twenty-second one, which is one of the connection wires 16a of the coil W4, are arranged at 30° intervals in the circumferential direction. The six connection wires 16a intersect with the single common bus bar 120 and form six first connection intersection portions 131a, which intersect with the common bus bar 120. The first connection intersection portions 131a are welded to electrically connect the six connection wires 16a to the common bus bar 120, which intersect with the connection wires 16a.

The reference connection wire 16b and the eleventh one from the reference connection wire 16b in the clockwise direction, which is the other connection wire 16a of the coil U3, are separated from each other by 165° in the circumferential direction, intersect with the first U-phase bus bar 121 as the connection wires 16a, and form second connection intersection portions 131b, which intersect with the first U-phase bus bar 121. Two of the connection wires 16a, namely, the sixth one from the reference connection wire 16b in the clockwise direction, which is one of the connection wires 16a of the coil U2, and the seventeenth one, which is the other connection wire 16a of the coil U4, are separated from each other by 165° in the circumferential direction. The connection wires 16a intersect with the second U-phase bus bar 122 and form second connection intersection portions 131b, which intersect with the second U-phase bus bar 122. Two of the connection wires 16a, namely, the twenty-third one from the reference connection wire 16b in the clockwise direction, which is the other connection wire 16a of the coil U1, and the fifth one, which is the other connection wire 16a of the coil U2, are separated from each other by 90° in the circumferential direction. The two connection wires 16a intersect with the third U-phase bus bar 123 and form second connection intersection portions 131b, which intersect with the third U-phase bus bar 123. The second connection intersection portions 131b are welded to electrically connect the six connection wires 16a to the first U-phase bus bar 121, which intersects with the connection wires 16a, or the second U-phase bus bar 122 or third U-phase bus bar 123, which intersect with the connection wires 16a.

Two of the connection wires 16a, namely, the second one from the reference connection wire 16b in the clockwise direction, which is one of the connection wires 16a of the coil V1, and the thirteenth one, which is the other connection wire 16a of the coil V3, are separated from each other by 165° in the circumferential direction. The two connection wires 16a intersect with the first V-phase bus bar 124 and form third connection intersection portion 131c, which intersect with the first V-phase bus bar 124. Further, two of the connection wires 16a, namely, the eighth one from the reference connection wire 16b in the clockwise direction, which is one of the connection wires 16a of the coil V2, and the nineteenth one, which is the other connection wire 16a of the coil V4, are separated from each other by 165° in the circumferential direction. The two connection wires 16a intersect with the second V-phase bus bar 125 and form third connection intersection portions 131c, which intersect with the second V-phase bus bar 125. Two of the connection wires 16a, namely, the first one from the reference connection wire 16b in the clockwise direction, which is the other connection wire 16a of the coil V1, and the seventh one, which is the other connection wire 16a of the coil V2, are separated from each other by 90° in the circumferential direction. The two connection wires 16a intersect with the third V-phase bus bar 126 and form third connection intersection portions 131c, which intersect with the third V-phase bus bar 126. The third connection intersection portions 131c are welded to electrically connect the six connection wires 16a to the first V-phase bus bar 124, which intersects with the connection wires 16a, the second V-phase bus bar 125, which intersects with the connection wires 16a, or the third V-phase bus bar 126, which intersects with the connection wires 16a.

Two of the connection wires 16a, namely, the fourth one from the reference connection wire 16b in the clockwise direction, which is one of the connection wires 16a of the coil W1, and the fifteenth one, which is the other connection wire 16a of the coil W3, are separated from each other by 165° in the circumferential direction. The two connection wires 16a intersect with the first W-phase bus bar 127 and form fourth connection intersection portions 131d, which intersect with the first W-phase bus bar 127. Two of the connection wires 16a, namely, the tenth one from the reference connection wire 16b in the clockwise direction, which includes one of the connection wires 16a of the coil W2, and the twenty-first one, which is the other connection wire 16a of the coil W4, are separated from each other by 165° in the circumferential direction. The two connection wires 16a intersect with the second W-phase bus bar 128 and form fourth connection intersection portions 131d, which intersect with the second W-phase bus bar 128. Two of the connection wires 16a, namely, the third one from the reference connection wire 16b in the clockwise direction, which is the other connection wire 16a of the coil W1, and the ninth one, which is the other connection wire 16a of the coil W2, are separated from each other by 90° in the circumferential direction. The two connection wires 16a intersect with the third W-phase bus bar 129 and form fourth connection intersection portions 131d, which intersect with the third W-phase bus bar 129. The fourth connection intersection portions 131d are welded to electrically connect the six connection wires 16a to the first W-phase bus bar 127, which intersects with the connection wires 16a, the second W-phase bus bar 128, which intersects with the connection wires 16a, or the third W-phase bus bar 129, which intersects with the connection wires 16a.

Figure 18:
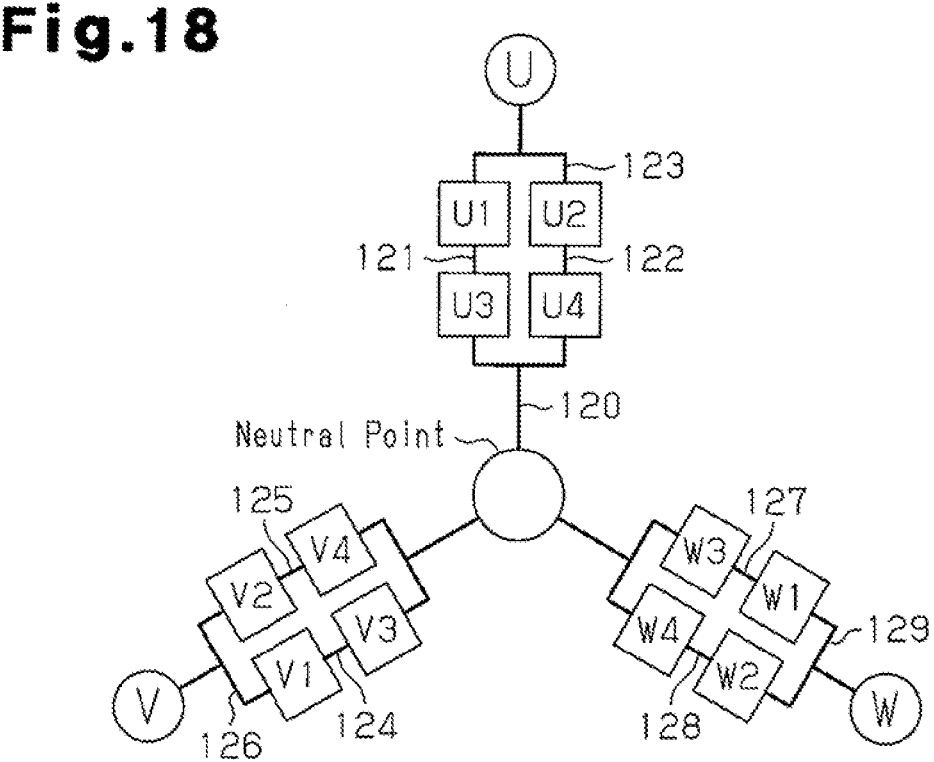
FIG. 18 is a diagram showing a connection state of coils in the bus bar device shown in FIG. 17.

The connection wires 16a connected to the bus bars 120 to 129 also form the bus bar device 112. The connection wires 16a are electrically connected to the bus bars 101 to 106 only at the first to forth connection intersection portions 131a to 131d so that the connection ends 16 of desired coils U1 to U4, V1 to V4, and W1 to W4 are connected to one another. Each of the connection wires 16a is electrically connected to only one of the bus bars 120 to 129. Since the twenty-four connection wires 16a and the bus bars 120 to 129 are connected as described above, the U-phase coils U1 and U3, which are series-connected by the first U-phase bus bar 121, are connected to the U-phase coils U2 and U4, which are series-connected by the second U-phase bus bar 122, in parallel by the third U-phase bus bar 123 and the common bus bar 120, as shown in FIG. 18. The V-phase coils V1 and V3, which are series-connected by the first V-phase bus bar 124, are connected to the V-phase coils V2 and V4, which are series-connected by the second V-phase bus bar 125, in parallel by the third V-phase bus bar 126 and the common bus bar 120. The W-phase coils W1 and W3, which are series-connected by the first W-phase bus bar 127, are connected to the W-phase coils W2 and W4, which are series-connected by the second W-phase bus bar 128, in parallel by the third W-phase bus bar 129 and the common bus bar 120. The common bus bar 120 functions as a neutral point. The twelve coils U1 to U4, V1 to V4, and W1 to W4 are electrically connected to one another through the bus bar device 112 and Y-connected by the bus bar device 112.

As shown in FIG. 17, a U-phase power feeding portion 123a is formed integrally with one circumferential end of the third U-phase bus bar 123. The U-phase power feeding portion 123a is bent from the third U-phase bus bar 123 and extends along the axial direction. A V-phase power feeding portion 126a is formed integrally with one circumferential end of the third V-phase bus bar 126. The V-phase power feeding portion 126a is bent from the third U-phase bus bar 126 and extends along the axial direction. Further, a W-phase power feeding portion 129a is formed integrally with one circumferential end of the third W-phase bus bar 129. The W-phase power feeding portion 129a is bent from the third W-phase bus bar 129 and extends along the axial direction. In the same manner as the U-phase power feeding portion 31a, the V-phase power feeding portion 32a, and the W-phase power feeding portion 33a of the first embodiment, the U-phase power feeding portion 123a, the V-phase power feeding portion 126a, and the W-phase power feeding portion 129a are respectively connected to power feeding terminals (not shown), which supply alternating current power having phases that are shifted from one another by 120°.

In the same manner as the stator 3 of the first embodiment, the stator 111 of the fifth embodiment is manufactured through the core segment arranging step, the bus bar arranging step, the connecting step, and the core segment molding step.

The fifth embodiment has the following advantages in addition to advantages (1) to (10) and (12) to (16) of the first embodiment as described above.

(21) The twelve coils U1 to U4, V1 to V4, and W1 to W4 can be Y-connected by the bus bar device 112 which is reduced in size in the radial direction. Accordingly, the stator 111 can be reduced in size in the radial direction.

Sixth Embodiment

A sixth embodiment of the present invention will now be described with reference to the drawings. In the sixth embodiment, same reference numerals are given to those components that are the same as the corresponding components of the first embodiment. Such components will not be described.

Figure 20:
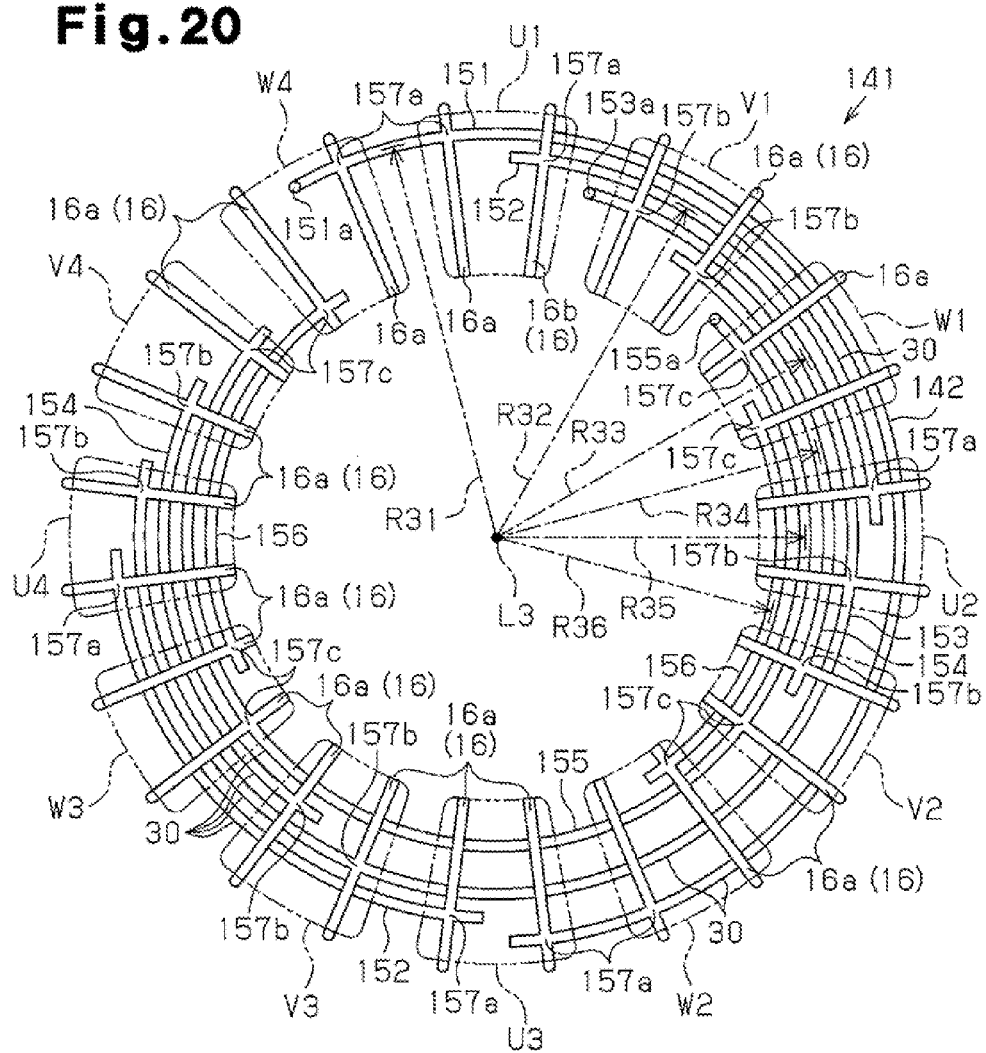
FIG. 20 is a schematic view of a stator according to the sixth embodiment of the invention.

As shown in FIG. 20, in the sixth embodiment, the brushless motor 1 includes a stator 141 in lieu of the stator 3 of the first embodiment. The stator 141 includes a bus bar device 142 in lieu of the bus bar device 21 of the first embodiment. The bus bar device 142 includes one first U-phase bus bar 151, two second U-phase bus bars 152, one first V-phase bus bar 153, two second V-phase bus bars 154, one first W-phase bus bar 155, and two second W-phase bus bars 156. In the same manner as the bus bars 31 to 33 of the first embodiment, the bus bars 151 to 156 are held by an annular plate-like bus bar holder (not shown), which is made of an insulative synthetic resin, in a state in which movement of the bus bars 151 to 156 in the radial direction is restricted.

The first U-phase bus bar 151 is formed by molding a single conductive wire 30 into a curved and arcuate shape. The radius R31 of the first U-phase bus bar 151 is set to be less than the distance between outer ends of coils U1 to U4, V1 to V4, and W1 to W4 in the radial direction and a center axis L3 of a stator core 11 (see FIG. 1) and set to be greater than the distance between inner ends of the coils U1 to U4, V1 to V4, and W1 to W4 in the radial direction and the center axis L3 of the stator core 11. The length of the first U-phase bus bar 151 in the circumferential direction is set to a value allowing the first U-phase bus bar 151 to extend across fourteen connection wires 16a arranged at 15° intervals in the circumferential direction.

Each of the two second U-phase bus bars 152 is formed by molding a single conductive wire 30 into a curved and arcuate shape. The radius R32 of the second U-phase bus bar 152 is set to be less than the radius R31 of the first U-phase bus bar 151 and set to be greater than the distance between inner ends of the coils U1 to U4, V1 to V4, and W1 to W4 in the radial direction and the center axis L3 of the stator core 11. The length of the second U-phase bus bar 152 in the circumferential direction is set to a value that allows the second U-phase bus bar 152 to extend across six connection wires 16a arranged at 15° intervals in the circumferential direction.

The first V-phase bus bar 153 is formed by molding a single conductive wire 30 into a curved and arcuate shape. The radius R33 of the first V-phase bus bar 153 is set to be less than the radius R32 of the second U-phase bus bar 152 and set to be greater than the distance between the inner ends of the coils U1 to U4, V1 to V4, and W1 to W4 in the radial direction and the center axis L3 of the stator core 11. The length of the first V-phase bus bar 153 in the circumferential direction is set to a value that allows the bus bar to extend across eighteen connection wires 16a arranged at 15° intervals in the circumferential direction.

Each of the two second V-phase bus bars 154 is formed by molding a single conductive wire 30 into a curved and arcuate shape. The radius R34 of the second V-phase bus bar 154 is set to be less than the radius R33 of the first V-phase bus bar 153 and set to be greater than the distance between the inner ends of the coils U1 to U4, V1 to V4, and W1 to W4 in the radial direction and the center axis L3 of the stator core 11. The length of the second V-phase bus bar 154 is set to a value that allows the bus bar to extend across six connection wires 16a arranged at 15° intervals in the circumferential direction.

The first W-phase bus bar 155 is formed by molding a single conductive wire 30 into a curved and arcuate shape. The radius R35 of the first W-phase bus bar 155 is set to be less than the radius R34 of the second V-phase bus bar 154 and set to be greater than the distance between the inner ends of the coils U1 to U4, V1 to V4, and W1 to W4 in the radial direction and the center axis L3 of the stator core 11. The length of the first W-phase bus bar 155 is set to a value that allows the bus bar to extend across eighteen connection wires 16a arranged at 15° intervals in the circumferential direction.

Each of the two second W-phase bus bars 156 is formed by molding a single conductive wire 30 into a curved and arcuate shape. The radius R36 of the second W-phase bus bar 156 is set to be less than the radius R35 of the first W-phase bus bar 155 and set to be greater than the distance between the inner ends of the coils U1 to U4, V1 to V4, and W1 to W4 in the radial direction and the center axis L3 of the stator core 11. The length of the second W-phase bus bar 156 in the circumferential direction is set to a value that allows the third V-phase bus bar 126 to extend across six connection wires 16a arranged at 15° intervals in the circumferential direction.

The first and second U-phase bus bars 151 and 152, the first and second V-phase bus bars 153 and 154, and the first and second W-phase bus bars 155 and 156 are held by the bus bar holder (not shown) in a state forming a plurality of layers in the radial direction without overlapping each other in the axial direction. More specifically, the two second U-phase bus bars 152 are arranged at the inner side of the first U-phase bus bar 151 on the same circle at 180° intervals in the circumferential direction. The first V-phase bus bar 153 is arranged at the inner side of the two second U-phase bus bars 152 so that the first V-phase bus bar 153 is shifted from the first U-phase bus bar 151 by 45° in the circumferential direction (clockwise direction in FIG. 20). The two second V-phase bus bars 154 are arranged at the inner side of the first V-phase bus bar 153 on the same circle at 180° intervals in the circumferential direction so that the second V-phase bus bars 154 are shifted from the second U-phase bus bars 152 by 30° in the circumferential direction (clockwise direction in FIG. 20). The first W-phase bus bar 155 is arranged at the inner side of the two second V-phase bus bars 154 so that the first W-phase bus bar 155 is shifted from the first V-phase bus bar 153 by 30° in the circumferential direction (clockwise direction in FIG. 20). The two second W-phase bus bar 156 are arranged at the inner side of the first W-phase bus bar 155 on the same circle at 180° intervals in the circumferential direction so that the second W-phase bus bars 156 are shifted from the second V-phase bus bars 154 by 30° in the circumferential direction (clockwise direction in FIG. 20).

The bus bars 151 to 156, which are adjacent to each other in the radial direction, are separated from one another in the radial direction. Further, the bus bars 151 to 156, which are adjacent to each other in the circumferential direction, are separated from each other in the circumferential direction. The bus bars 151 to 156 which are arranged on one axial end of the coils U1 to U4, V1 to V4, and W1 to W4 together with the bus bar holder are concentric with the center axis L3 of the stator core 11. The bus bars 151 to 156 form the plurality of layers in the radial direction of the coils U1 to U4, V1 to V4, and W1 to W4 (the same direction as the radial direction of the stator core 11) within the range of radial widths of the coils U1 to U4, V1 to V4, and W1 to W4.

A total of twenty-four connection wires 16a, which are distal end portions of connection ends 16, are arranged so that the connection wires 16a extend along the radial direction. Thus, the connection wires 16a overlap and intersect with the bus bars 151 to 156 in the axial direction.

One of the two connection wires 16a of the coil U1 (connection wire 16a located at a leading side in the clockwise direction in FIG. 20) is defined as a reference connection wire 16b. Four of the connection wires 16a, namely, the twenty-second from the reference connection wire 16b in the clockwise direction, which is one of the connection wires 16a of the coil W4, the twenty-third one, which is the other connection wire 16a of the coil U1, the tenth one, which is one of the connection wires 16a of the coil W2, and the eleventh one, which is one of the connection wires 16a of the coil U3, are arranged in two locations at a 180° interval in the circumferential direction. The four connection wires 16a intersect with the single first U-phase bus bar 151 and form four first connection intersection portions 157a, which intersect with the first U-phase bus bar 151. The reference connection wire 16b and the fifth one from the reference connection wire 16b in the clockwise direction, namely, one of the connection wires 16a of the coil U2, are separated from each other by 75° in the circumferential direction. The two connection wires intersect with the one of the second U-phase bus bars 152 as the connection wires 16a and form first connection intersection portion 157a, which intersect with the second U-phase bus bar 152. Two of the connection wires 16a, namely, the twelfth one, which is the other connection wire 16a of the coil U3, and the seventeenth one, which is one of the connection wires 16a of the coil U4, are separated from each other by 75° in the circumferential direction, intersect with the other second U-phase bus bar 152, and form first connection intersection portions 157a, which intersect with the second U-phase bus bar 152. The first connection intersection portions 157a are welded to electrically connect the eight connection wires 16a to the first U-phase bus bar 151, which intersects with the connection wires 16a, or the second U-phase bus bars 152, which intersect with the connection wires 16a.

Four of the connection wires 16a, namely, the first one from the reference connection wire 16b in the clockwise direction, which is one of the connection wires 16a of the coil V1, the sixth one, which is the other connection wire 16a of the coil U2, the thirteenth one, which is one of the connection wires 16a of the coil V3, and the eighteenth one, which is the other connection wire 16a of the coil U4, intersect with the first V-phase bus bar 153 and form second connection intersection portions 157b, which intersect with the first V-phase bus bar 153. Two of the connection wires 16a, namely, the second one from the reference connection wire 16b in the clockwise direction, which is the other connection wire 16a of the coil V1, and the seventh one, which is one of the connection wires 16a of the coil V2, are separated from each other by 75° in the circumferential direction. The two connection wires 16a intersect with one of the second V-phase bus bars 154 and form second connection intersection portions 157b, which intersect with the second V-phase bus bar 154. Two of the connection wires 16a, namely, the fourteenth one from the reference connection wire 16b in the clockwise direction, which is the other connection wire 16a of the coil V3, and the nineteenth one, which is one of the connection wires 16a of the coil V4, are separated from each other by 75° in the circumferential direction. The two connection wires 16a intersect with the other second V-phase bus bar 154 and form second connection intersection portions 157b, which intersect with the second V-phase bus bar 154. The second connection intersection portions 157b are welded to electrically connect the eight connection wires 16a to the first V-phase bus bar 153, which intersecting with the connection wires 16a, or the second V-phase bus bars 154, which intersecting with the connection wires 16a.

Four of the connection wires 16a, namely, the third one from the reference connection wire 16b in the clockwise direction, which is one of the connection wires 16a of the coil W1, the eighth one, which is other connection wire 16a of the coil V2, the fifteenth one, which is one of the connection wires 16a of the coil W3, and the twentieth one, which is the other connection wire 16a of the coil W4, intersect with the first W-phase bus bar 155 and form third connection intersection portions 157c, which intersect with the first W-phase bus bar 155. Two of the connection wires 16a, namely, the fourth one from the reference connection wire 16b in the clockwise direction, which is the other connection wire 16a of the coil W1, and the ninth one, which is the other connection wire 16a of the coil W2, are separated from one another by 75° in the circumferential direction. The two connection wires 16a intersect with one of the second W-phase bus bars 156 and form third connection intersection portions 157c, which intersect with the second W-phase bus bar 156. Two of the connection wires 16a, namely, the sixteenth one from the reference connection wire 16b in the clockwise direction, which includes the other connection wire 16a of the coil W3, and the twenty-first one, which is the other connection wire 16a of coil W4, are separated from each other by 75° in the circumferential direction. The two connection wires 16a intersect with the other second W-phase bus bar 156 and form third connection intersection portions 157c, which intersect with the second W-phase bus bar 156. The third connection intersection portions 157c are welded to electrically connect the eight connection wires 16a to the first W-phase bus bar 155, which intersect with the connection wires 16a, or the second W-phase bus bars 156, which intersect with the connection wires 16a.

Figure 19:
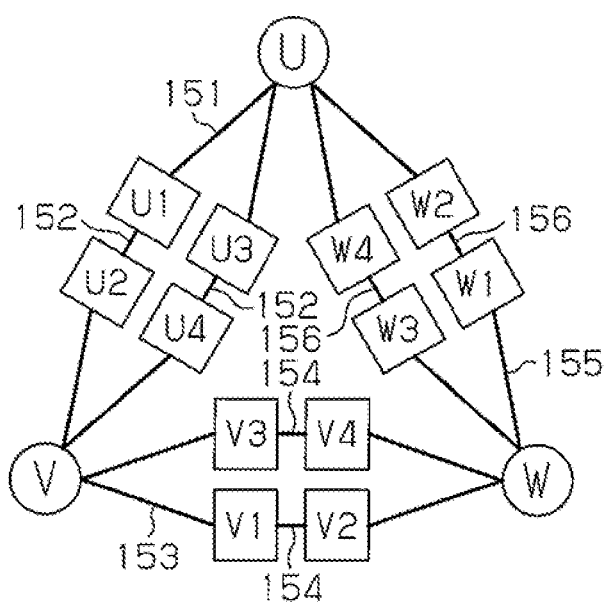
FIG. 19 is a diagram showing a connection state of coils in a bus bar device according to a sixth embodiment of the invention.

The connection wires 16a connected to the bus bars 151 to 156 also form the bus bar device 142. The connection wires 16a are electrically connected to the bus bars 151 to 156 only at the first to third connection intersection portions 157a to 157c so that the connection ends 16 of desired coils U1 to U4, V1 to V4, and W1 to W4 are connected to one another. Each of the connection wires 16a is electrically connected to only one of the bus bars 151 to 156. The twenty-four connection wires 16a and the bus bars 151 to 156 are connected to one another as described above. Thus, the U-phase coils U1 and U2, which are series-connected by one of the second U-phase bus bars 152, are connected to the U-phase coils U3 and U4, which are series-connected to the other second U-phase bus bar 152, in parallel by the first U-phase bus bar 151 and the first V-phase bus bar 153, as shown in FIG. 19. Further, the V-phase coils V1 and V2, which are series-connected to one of the second V-phase bus bars 154, are connected to the V-phase coils V3 and V4, which are series-connected, by the other second V-phase bus bar 154 in parallel by the first V-phase bus bar 153 and the first W-phase bus bar 155. The W-phase coils W1 and W2, which are series-connected by one of the second W-phase bus bars 156, are connected to the W-phase coils W3 and W4, which are series-connected by the other second W-phase bus bar 156, in parallel by the first W-phase bus bar 155 and the first U-phase bus bar 151. The twelve coils U1 to U4, V1 to V4, and W1 to W4 are electrically connected to one another by the bus bar device 142 and delta-connected to one another by the bus bar device 142.

As shown in FIG. 20, a U-phase power feeding portion 151a is formed integrally with one circumferential end of the first U-phase bus bar 151. The phase power feeding portion 151a is bent from the first U-phase bus bar 151 and extends along the axial direction. A V-phase power feeding portion 153a is formed integrally with one circumferential end of the first V-phase bus bar 153. The V-phase power feeding portion 153a is bent from the first V-phase bus bar 153 and extends along the axial direction. A W-phase power feeding portion 155a is formed integrally with one circumferential end of the first W-phase bus bar 155. The W-phase power feeding portion 155a is bent from the first W-phase bus bar 155 and extends along the axial direction. In the same manner as the U-phase power feeding portion 31a, the V-phase power feeding portion 32a, and the W-phase power feeding portion 33a of the first embodiment, the U-phase power feeding portion 151a, V-phase power feeding portion 153a, and W-phase power feeding portion 155a are connected to power feeding terminals (not shown), which supply alternating current power having phases that are shifted from one another by 120°.

In the same manner as the stator 3 of the first embodiment, the stator 141 of the sixth embodiment is manufactured through the core segment arranging step, the bus bar arranging step, the connecting step, and the core segment molding step.

The sixth embodiment has the following advantage in addition to advantages (1) to (10) and (12) to (16) of the first embodiment as described above.

(22) The twelve coils U1 to U4, V1 to V4, and W1 to W4 can be delta-connected to one another by the bus bar device 142, which is reduced in size in the radial direction. Accordingly, the stator 141 can be reduced in size in the radial direction.

The embodiments of the invention may be modified as described below.

The stators 3, 51, 71, 91, 111, and 141 of the embodiments are manufactured through the core segment arranging step, the bus bar arranging step, the connecting step, and the core segment molding step as described in the first embodiment. However, the method for manufacturing the stators 3, 51, 71, 91, 111, and 141 is not limited in such a manner. The stators 3, 51, 71, 91, 111, and 141 may be manufactured by a manufacturing method that will now be described. The manufacturing method of the stator will now be described using the stator 3 as an example.

First, in a bus bar arranging step, three bus bars 31 to 33 are arranged to form a plurality of layers in the radial direction on one axial side of twelve coils U1 to U4, V1 to V4, and W1 to W4, which are arranged in the circumferential direction. Next, in a connection wire arranging step, the connection ends 16 are bent so the connection wires 16*a*, which are formed by the connection ends 16, are arranged so that the connection wires 16*a* overlap and intersect with the bus bars 31 to 33 in the axial direction. Next, in a connecting step, the first to third connection intersection portions 34*a* to 34*c*, in which the connection wires 16*a* and the bus bars 31 to 33 intersect with one another, are welded to electrically connect the connection wires 16*a* and the bus bars 31 to 33.

As a result, the bus bars 31 to 33 and the connection wires 16*a* are electrically connected to one another by welding the first to third connection intersection portions 34*a* to 34*c*, at which the bus bars 31 to 33 and the connection wires 16*a* intersect with one another. Accordingly, to electrically connect the bus bars 31 to 33 and the connection wires 16*a* to one another, separate components such as connection terminals do not have to be used. Thus, there is no need for forming other components to electrically connect the bus bars 31 to 33 and the connection wires 16*a*, and there is no need for arranging other components on the bus bars 31 to 33 and the connection wires 16*a* to electrically connect the bus bars 31 to 33 and the connection wires 16*a*. Further, the connection wire 16*a* is formed from the connection end 16. Thus, there is not need to connect the connection end 16 to the connection wire 16*a*. Further, by bending the connection ends 16, the connection wires 16*a* can be easily arranged on the bus bars 31 to 33 so that the connection wires 16*a* overlap and intersect with the bus bars 31 to 33 in the axial direction. This easily connects the bus bars 31 to 33 and the coils U1 to U4, V1 to V4, and W1 to W4 and facilitates manufacturing of the stator 3.

The connection end 16 may be held by the insulator 14. For example, a holding portion, which projects in the axial direction, is formed on the insulator 14 at the inner side of the coils U1 to U4, V1 to V4, and W1 to W4 in the radial direction, and distal ends of the connection ends 16 (i.e., radial ends of connection wires 16*a*) are held by the holding portion. Since the base of the connection end 16 is held by the end holding portions 14*a*, both ends of the connection wire 16*a* are held by the insulator 14. In this case, the connection end 16 is held by the insulator 14. This stabilizes the position of the connection wire 16*a*, which is formed from the connection end 16. Since the connection wire 16*a* is held by the insulator 14, if the position of the connection wire 16*a* is stabilized, the bus bar holder 22 can be omitted. If the bus bar holder 22 is omitted, it is possible to reduce the number of parts of each of the bus bar devices 21, 52, 72, 92, 112, and 142, and the bus bar devices 21, 52, 72, 92, 112, and 142 can be reduced in weight and size in the axial direction.

In the first embodiment, the connection wires 16*a* that form the bus bar device 21 are the connection ends 16, which are bent so that the connection ends 16 are overlapped with the bus bars 31 to 33 in the axial direction. However, the connection wires 16*a* do not have to be formed from the connection ends 16. It is only necessary that the connection wires 16*a* are arranged so that they overlap and intersect with the bus bars 31 to 33 in the axial direction and the connection wires 16*a* are connected to the coils U1 to U4, V1 to V4, and W1 to W4. For example, the connection wires 16*a* may be rod-shaped members formed by cutting a conductive wire into length substantially equal to a radial width of each of the coils U1 to U4, V1 to V4, and W1 to W4. In this case, the connection wires 16*a* are arranged so that they overlap the bus bars 31 to 33 in the axial direction to extend along the radial direction and so that radial outer ends of the connection wires 16*a* are electrically connected to the connection ends 16. This can also be applied to the bus bar devices 52, 72, 92, 112, and 142 of the second to sixth embodiments.

In the first embodiment, the bus bars 31 to 33 are arranged within the range of the radial widths of the coils U1 to U4, V1 to V4, and W1 to W4. However, the bus bars 31 to 33 may be arranged over a greater range than the range of the radial widths of the coils U1 to U4, V1 to V4, and W1 to W4. For example, the bus bars 31 to 33 may be arranged within a range of radial width of the core segments 12. This can also be applied to the stators 51, 71, 91, 111, and 141 of the second to sixth embodiments.

In the first embodiment, since the bus bars 31 to 33 are formed from the conductive wire 30, the bus bars have the same cross-sectional area in a direction perpendicular to the longitudinal direction. In the bus bar device 21 having the bus bars 31 to 33 arranged so that the plurality of layers is formed in the radial direction, the distance between connection intersection portions decreases in bus bars located inward in the radial direction. That is, the distance between the second connection intersection portions 34*b* in the V-phase bus bar 32 arranged at the inner side of the U-phase bus bar 31 is less than the distance between the first connection intersection portions 34*a* in the U-phase bus bar 31, which is located outward in the radial direction. Further, the distance between the third connection intersection portions 34*c* in the W-phase bus bar 33 arranged at the inner side of the V-phase bus bar 32 is less than the distance between the second connection intersection portions 34*b* in the V-phase bus bar 32. Thus, the electrical resistance between the second connection intersection portions 34*b* in the V-phase bus bar 32 is less than electrical resistance between the first connection intersection portions 34*a* in the U-phase bus bar 31. The electrical resistance between the third connection intersection portions 34*c* in the W-phase bus bar 33 is less than electrical resistance between the second connection intersection portions 34*b* in the V-phase bus bar 32. Thus, the bus bars 31 to 33 may be formed so that a bus bar located more inward in the radial direction is formed from a conductive wire having a smaller cross-sectional area in a manner that the electrical resistance between the first connection intersection portions 34*a* in the U-phase bus bar 31, the electrical resistance between the second connection intersection portions 34*b* in the V-phase bus bar 32, and the electrical resistance between the third connection intersection portions 34*c* in the W-phase bus bar 33 become equal to each other. By forming a bus bar located more inward in the radial direction from a conductive wire having a smaller cross-sectional area, the electrical resistances between the first to third connection intersection portions 34*a* to 34*c* in the bus bars 31 to 33 can easily be set to be equal. Since the electrical resistances between the first to third connection intersection portions 34*a* to 34*c* in the bus bars 31 to 33 are equal to each other, an attraction force or a repulsion force generated by the stator 3 for the rotor 4 can be uniform. Thus, it is possible to suppress the generation of vibration and noise of the brushless motor 1 including the stator 3. This modification can also be applied to the bus bar devices 52, 72, 92, 112, 142, and 161 of the second to sixth embodiments.

In the bus bar device 21 of the first embodiment, the U-phase bus bar 31, the V-phase bus bar 32, and the W-phase bus bar 33 may be formed from conductive wires having different cross-sectional areas. In this case, by merely differentiating the cross-sectional areas of the conductive wires of the bus bars 31 to 33, it is possible to easily change the electrical resistance between the first connection intersection portions 34a in the U-phase bus bar 31, the electrical resistance between the second connection intersection portions 34b in the V-phase bus bar 32, and the electrical resistance between the third connection intersection portions 34c in the W-phase bus bar 33. For example, if the U-phase bus bar 31, the V-phase bus bar 32, and the W-phase bus bar 33 are formed from conductive wires having different cross-sectional areas, it is possible to easily differentiate electrical resistance between the first connection intersection portions 34a in the U-phase bus bar 31, electrical resistance between the second connection intersection portions 34b in the V-phase bus bar 32, and electrical resistance between the third connection intersection portions 34c in the W-phase bus bar 33. Thus, it is possible to differentiate current supplied to the U-phase coils U1 to U4, current supplied to the V-phase coils V1 to V4, and current supplied to the W-phase coils W1 to W4. If currents supplied to the coils U1 to U4, V1 to V4, and W1 to W4 are different from one another for each phase, an attraction force or a repulsion force generated by the stator 3 to the rotor 4 can be non-uniform. Therefore, when vibration is used for notification or the like, it is possible to make the brushless motor 1 having the stator 3 intentionally generate the vibration when necessary. This can also be applied to the bus bar device 72 of the third embodiment.

In each of the embodiments, the bus bar devices 21, 52, 72, 92, 112, 142, and 161 are formed corresponding to the U-phase alternating current, V-phase alternating current, and W-phase alternating current of which phases are shifted by 120° from one another. However, the bus bar devices 21, 52, 72, 92, 112, 142, and 161 may be formed corresponding to an alternating current having a number of phases other than three, such as one phase or two or more phases.

In the first embodiment, the bus bars 31 to 33 are formed from the conductive wire 30 which is a conductive metal wire having no insulative coating. However, the bus bars 31 to 33 may be formed from coated conductive wire formed by covering an outer periphery of a conductive metal wire with insulative coating. In this case, insulation properties between the bus bars 31 to 33 which are adjacent to one another in the radial direction can be secured by the insulative coating. Gaps between the bus bars 31 to 33 which are adjacent to one another in the radial direction can be eliminated. By eliminating the gaps between the bus bars 31 to 33 which are adjacent to one another in the radial direction, the bus bar device 21 can further be reduced in size in the radial direction. This can also be applied to the bus bar devices 52, 72, 92, 112, and 142 of the second to sixth embodiments.

In the third embodiment, the radii R9 of the three U-phase bus bars 82 are fixed values, the radii R10 of the three V-phase bus bars 83 are fixed values, and the radii R11 of the three W-phase bus bars 84 are fixed values. However, the radii of the three U-phase bus bars 82 may be different from one another. In the same manner, the radii of the three V-phase bus bars 83 may be different from one another, and the radii of the three W-phase bus bars 84 may be different from one another.

In the first embodiment, the bus bar holder 22 includes the axially extending hole-shaped first engaging portion 28a, second engaging portion 28b, and third engaging portion 28c. However, the shapes of the first to third engaging portions 28a to 28c are not limited in such a manner. It is only necessary that the first to third engaging portions 28a to 28c are formed with shapes allowing for engagement with at least one ends of the bus bars 31 to 33 in the circumferential direction. For example, the first to third engaging portions 28a to 28c may be projections that project from bottom surfaces of the first to third accommodating grooves 24a to 24c in the axial direction and are opposed to the circumferential ends of the bus bars 31 to 33 in the circumferential direction. In this case, advantage (7) of the first embodiment can be obtained. The bus bar holder 22 does not necessarily have to include the first to third engaging portions 28a to 28c.

The bus bar holder 22 does not necessarily have to include the first to third connecting portions 27a to 27c.

Figure 21:
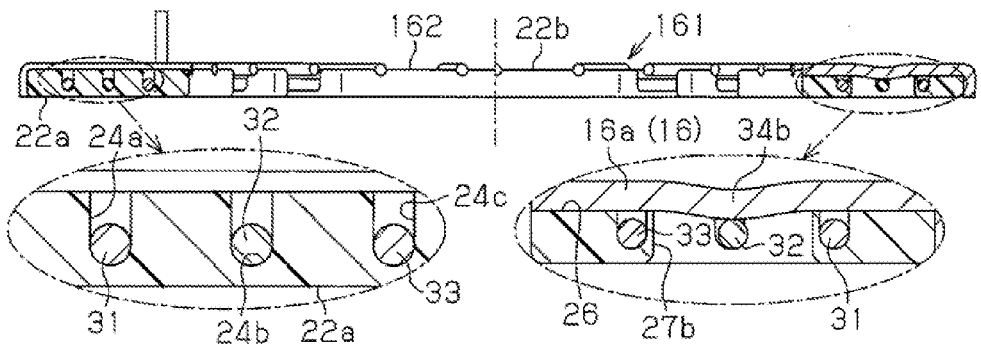
FIG. 21 is a cross-sectional view of a bus bar device of another embodiment taken along line XXI-XXI in FIG. 22A.
Figure 22A:
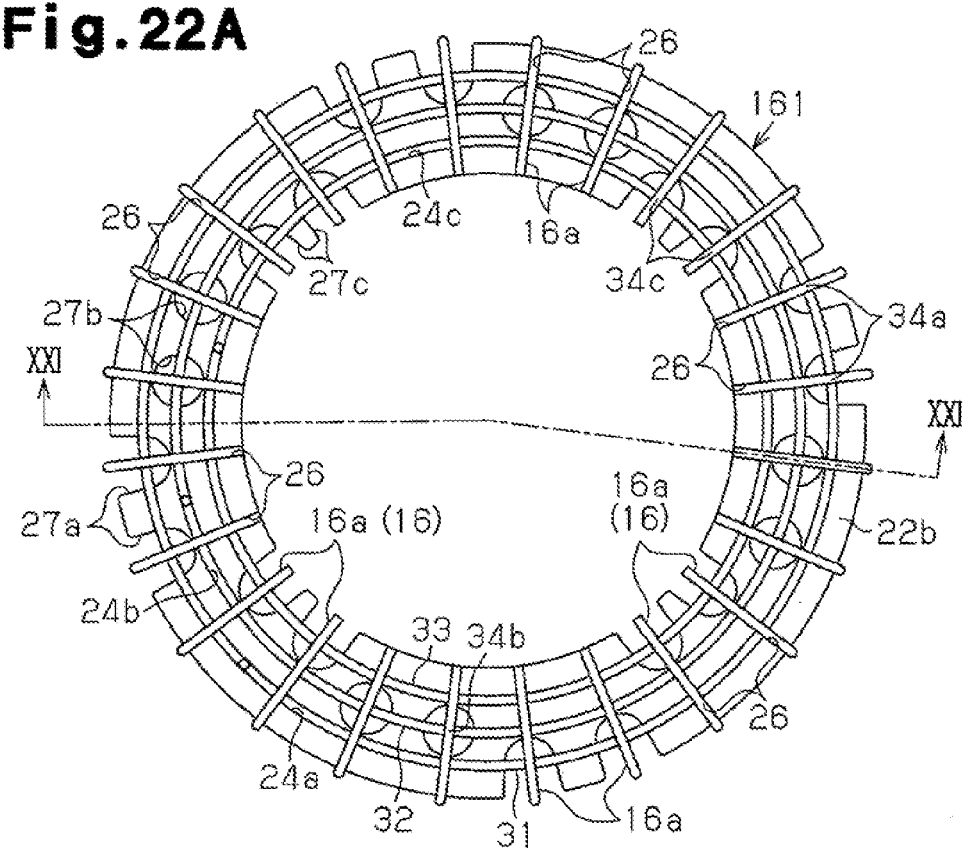
FIG. 22A is a plan view of a bus bar device in another embodiment.
Figure 22B:
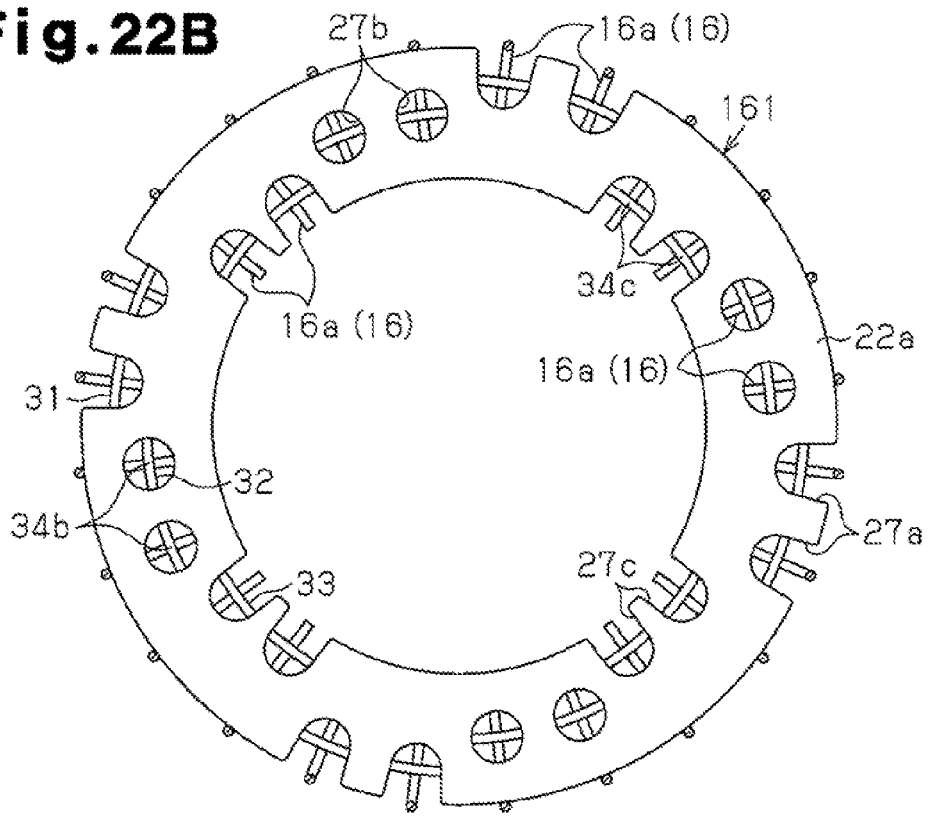
FIG. 22B is a bottom view of the bus bar device shown in FIG. 22A.

In the bus bar device 21 of the first embodiment, all of the bus bars 31 to 33 are arranged on the of one axial side of the bus bar holder 22 (i.e., on the side of opposing surface 22a), and all of the connection wires 16a are arranged on the other axial side end of the bus bar holder 22 (i.e., on the side of non-opposing surface 22b). However, all of the bus bars 31 to 33 and all of the connection wires 16a may be arranged on one axial side end of the bus bar holder 162 like a bus bar device 161 shown in FIGS. 21, 22A, and 22B. In FIGS. 21, 22A, and 22B, the same elements as those of the first embodiment are given the same reference numerals. In the same manner the bus bar holder 22 of the first embodiment, a bus bar holder 162 is made of insulative synthetic resin and formed to have an annular plate shape. First to third accommodating grooves 24a to 24c and a guide groove 26 are formed in an axial end of the bus bar holder 162 on the side of the non-opposing surface 22b. The first to third accommodating grooves 24a to 24c are deeper than the guide groove 26 in the axial direction. Contact of the bus bars 31 to 33 accommodated in the first to third accommodating grooves 24a to 24c with the connection wires 16a is suppressed at locations other than the first to third connection intersection portions 34a to 34c. In this case, the bus bars 31 to 33 and the connection wires 16a can be arranged from the same direction for the bus bar holder 162. Accordingly, since it is possible to easily arrange the bus bars 31 to 33 and the connection wires 16a on the bus bar holder 162, costs for manufacturing the bus bar device 161 can be further reduced. In the example shown in FIGS. 21, 22A, and 22B, the first to third accommodating grooves 24a to 24c and the guide groove 26 are formed in the axial end of the bus bar holder 162 on the side of the non-opposing surface 22b. However, the first to third accommodating grooves 24a to 24c and the guide groove 26 may be formed in an axial end of the bus bar holder 162 on the side of the opposing surface 22a. This can also be applied to the bus bar devices 52, 72, 92, 112, and 142 of the second to sixth embodiments.

In the first embodiment, the guide groove 26, which guides the arrangement of the connection wires 16a relative to the bus bars 31 to 33, is formed in the bus bar holder 22. However, a guide guiding the arrangement of the connection wires 16a relative to the bus bars 31 to 33 is not limited to the groove-shaped guide groove 26. For example, projections projecting in the axial direction from both circumferential sides of the connection wire 16a may be provided on the non-opposing surface 22b as the guides. This also obtains advantage (4) of the first embodiment can be obtained. The bus bar holder 22 may not have a guide such as the guide groove 26. This can also be applied to the bus bar devices 52, 72, 92, 112, and 142 of the second to sixth embodiments.

The bus bar device 21 of the first embodiment includes the annular plate-like bus bar holder 22. However, the shape of the bus bar holder 22 is not limited to the annular plate shape. It is only necessary that the bus bar holder 22 be formed to have an arcuate shape or annular shape extending along the circumferential direction of the bus bars 31 to 33 so that the bus bar holder 22 holds the bus bars 31 to 33 while restricting movement of the bus bars 31 to 33 in the radial direction. In the first embodiment, the bus bar holder 22 holds the bus bars 31 to 33 while restricting movement of the bus bars 31 to 33 in the radial direction by accommodating the bus bars 31 to 33 in the first to third accommodating grooves 24a to 24c. However, the bus bar holder 22 may hold the bus bars 31 to 33 while restricting movement of the bus bars 31 to 33 in the radial direction with projections, which project from the opposing surface 22a in the axial direction and which are formed on both radial sides of the bus bars 31 to 33. This can also be applied to the bus bar devices 52, 72, 92, 112, and 142 of the second to sixth embodiments. The bus bar devices 21, 52, 72, 92, 112, and 142 of the embodiments do not have to include the bus bar holder 22.

In the embodiments, the connection wires 16a are arranged in the circumferential direction so that they are not overlapped with one another in the axial direction. However, the connection wires 16a may be arranged so that they are overlapped with one another in the axial direction.

In the first embodiment, the bus bars 31 to 33 and the connection wires 16a are electrically connected to one another by resistance welding the first to third connection intersection portions 34a to 34c. However, the bus bars 31 to 33 and the connection wires 16a may be electrically connected to one another by a method other than the resistance welding. For example, welding such as laser welding and TIG welding may be employed. The bus bars 31 to 33 and the connection wires 16a may be electrically connected to one another by soldering or press-fitting. This can also be applied to the bus bar devices 52, 72, 92, 112, and 142 of the second to sixth embodiments.

Although the bus bars 31 to 33 are formed to have arcuate shapes in the first embodiment, they do not necessarily have to be arcuate. It is only necessary that the bus bars 31 to 33 be arc-shaped. Here "arc-shaped" is not limited to an arcuate shape, and includes an arch shape formed by bending a conductive wire at a plurality of locations. This can also be applied to the bus bars 61 to 64, 81 to 84, 101 to 106, 120 to 129, and 151 to 156 of the second to sixth embodiments.

In the first embodiment, the bus bars 31 to 33 are conductive metal wires having circular cross-sections and formed from tin-plated copper wire. However, the bus bars 31 to 33 may be formed from metal wires other than tin-plated copper wire (wires of metal such as silver and aluminum). The bus bars 31 to 33 may be formed from conductive metal wire having polygonal cross-sections. The bus bars 31 to 33 may be formed by linearly punching a conductive metal sheet in a pressing process. This can also be applied to the bus bars 61 to 64, 81 to 84, 101 to 106, 120 to 129, and 151 to 156 of the second to sixth embodiments.

In each of the embodiments, the twelve core segments 12 are pivotally connected to one another by fitting circumferential ends of the connection portions 12a of the adjacent core segments 12. However, the stators 3, 51, 71, 91, 111, and 141 of the embodiments may not have a structure for fitting the circumferential ends of the connection portions 12a of the adjacent core segments 12. The stators 3, 51, 71, 91, 111, and 141 of the embodiments do not have to have a structure for pivotally connecting the core segments 12, which are adjacent in the circumferential direction. This also obtains the advantages of the above embodiments.

The stators 3, 51, 71, 91, 111, and 141 of the embodiments have the twelve coils U1 to U4, V1 to V4, and W1 to W4. However, the number of coils in the stators 3, 51, 71, 91, 111 and 141 may be changed as required. In this case, the number of bus bars forming the bus bar devices 21, 52, 72, 92, 112, and 142 is changed in accordance with the number of coils and how the coils are connected.

The invention claimed is:

1. A bus bar device electrically connecting a plurality of coils arranged along a circumferential direction to form an annular shape in entirety, wherein the bus bar device includes the circumferential direction, a radial direction, and an axial direction, the bus bar device comprises:
   a plurality of bus bars arranged to form a plurality of layers in the radial direction, wherein each of the bus bars is formed from an arc-shaped conductive wire;
   a plurality of connection wires respectively connected to the coils, wherein the connection wires are arranged to overlap the bus bars in the axial direction and intersect with the bus bars;
   an arc-shaped or annular bus bar holder, wherein the bus bar holder holds the bus bars so as to restrict movements of the bus bars in the radial direction,
   wherein the bus bars and the connection wires intersect at intersection portions including connection intersection portions at which the plurality of connection wires is electrically connected to the bus bars, and
   wherein the bus bar holder includes a hole-shaped connecting portion located at a portion of the bus bar holder corresponding to the connection intersection portion and extending through the bus bar holder along the axial direction.

2. A bus bar device electrically connecting a plurality of coils arranged along a circumferential direction to form an annular shape in entirety, wherein the bus bar device includes the circumferential direction, a radial direction, and an axial direction, the bus bar device comprises:
   a plurality of bus bars arranged to form a plurality of layers in the radial direction, wherein each of the bus bars is formed from an arc-shaped conductive wire,
   a plurality of connection wires respectively connected to the coils, wherein the connection wires are arranged to overlap the bus bars in the axial direction and intersect with the bus bars, and
   an arc-shaped or annular bus bar holder, wherein the bus bar holder holds the bus bars so as to restrict movements of the bus bars in the radial direction,
   wherein the bus bars and the connection wires intersect at intersection portions including connection intersection portions at which the plurality of connection wires is electrically connected to the bus bars, and
   wherein
   each of the bus bars includes two ends, and
   the bus bar holder includes an engaging portion engaged with at least one of the two ends in the circumferential direction.

3. A bus bar device electrically connecting a plurality of coils arranged along a circumferential direction to form an annular shape in entirety, wherein the bus bar device includes the circumferential direction, a radial direction, and an axial direction, the bus bar device comprises:
   a plurality of bus bars arranged to form a plurality of layers in the radial direction, wherein each of the bus bars is formed from an arc-shaped conductive wire; and
   a plurality of connection wires respectively connected to the coils, wherein the connection wires are arranged to overlap the bus bars in the axial direction and intersect with the bus bars,
   wherein the bus bars and the connection wires intersect at intersection portions including connection intersection portions at which the plurality of connection wires is electrically connected to the bus bars, wherein the bus bars include at least one U-phase bus bar, which extends along the circumferential direction so as to have a fixed radius, at least one V-phase bus bar, which extends along the circumferential direction so as to have a fixed radius, and at least one W-phase bus bar, which extends along the circumferential direction so as to have a fixed radius, wherein the U-phase bus bar is supplied with U-phase current of a three-phase alternating current supplied to a motor, the V-phase bus bar is supplied with V-phase current of the three-phase alternating current, and the W-phase bus bar is supplied with W-phase current of the three-phase alternating current, wherein the U-phase bus bar, the V-phase bus bar, and the W-phase bus bar are arranged concentrically, and wherein the U-phase bus bar, the V-phase bus bar, and the W-phase bus bar are formed from the conductive wires having different cross-sectional areas.

4. The bus bar device according to claim 3, wherein the conductive wires of the bus bars located more inward in the radial direction of the bus bar device have smaller cross-sectional areas so that an electrical resistance between the connection intersection portions is the same in all of the bus bars.

5. A stator comprising:
coils arranged along a circumferential direction, and
a bus bar device arranged on one side of the coils in an axial direction,
wherein the bus bar device electrically connects the coils to form an annular shape in entirety, and includes the circumferential direction, a radial direction, and an axial direction, the bus bar device includes:
  a plurality of bus bars arranged to form a plurality of layers in the radial direction, wherein each of the bus bars is formed from an arc-shaped conductive wire; and
  a plurality of connection wires respectively connected to the coils, wherein the connection wires are arranged to overlap the bus bars in the axial direction and intersect with the bus bars,
wherein the bus bars and the connection wires intersect at intersection portions including connection intersection portions at which the plurality of connection wires is electrically connected to the bus bars, and
wherein the bus bars are arranged so as to form the plurality of layers within a range of widths of the coils in the radial direction.

6. The stator according to claim 5, wherein the connection wires are ends of the coils bent to overlap the bus bars in the axial direction.

7. The stator according to claim 6, further comprising:
a stator core around which the coils are wound; and
a plurality of insulators arranged between the stator core and the coils, wherein the insulators electrically insulate the stator core and the coils,
wherein the ends of the coils are held by the insulators.

8. The stator according to claim 5, wherein
the coils are twelve coils;
the bus bars include one arcuate U-phase bus bar, one arcuate V-phase bus bar, which has a radius that differs from that of the U-phase bus bar, and one arcuate W-phase bus bar, which has a radius that differs from those of the U-phase bus bar and the V-phase bus bar;
the connection wires are twenty-four connection wires, the twenty-four connection wires are arranged along the circumferential direction in an order of two connection wires connected to the U-phase bus bar and adjacent to each other in the circumferential direction, two connection wires connected to the V-phase bus bar and adjacent to each other in the circumferential direction, and two connection wires connected to the W-phase bus bar and adjacent to each other in the circumferential direction; and
the bus bars and the connection wires are configured to delta-connect the twelve coils.

9. The stator according to claim 5, wherein
the coils are twelve coils;
the bus bars includes one arcuate U-phase bus bar, one arcuate V-phase bus bar, which has a radius that differs from that of the U-phase bus bar, one arcuate W-phase bus bar, which has a radius that differs from those of the U-phase bus bar and the V-phase bus bar, and one arcuate common bus bar, which has a radius that differs from those of the U-phase bus bar, the V-phase bus bar, and the W-phase bus bar;
the connection wires are twenty-four connection wires arranged along the circumferential direction;
the twenty-four connection wires include twelve connection wires that are every second connection wire connected to the common bus bar, four connection wires that are every sixth connection wire connected to the U-phase bus bar, another four connection wires that are every sixth connection wire connected to the V-phase bus bar, and another four connection wires that are every sixth connection wire connected to the W-phase bus bar; and
the bus bars and the connection wires are configured to Y-connect the twelve coils.

10. The stator according to claim 5, wherein
the coils are twelve coils;
the bus bars include three arcuate U-phase bus bars extending along the circumferential direction to have a fixed radius, three arcuate V-phase bus bars extending along the circumferential direction to have a fixed radius that differs from that of the U-phase bus bars, three arcuate W-phase bus bars extending along the circumferential direction to have a fixed radius that differs from those of the U-phase bus bars and the V-phase bus bars, and one arcuate common bus bar extending along the circumferential direction to have a radius equal to that of the U-phase bus bars, and the bus bars are arranged concentrically;
the connection wires are twenty-one connection wires arranged along the circumferential direction;
the twenty-one connection wires include
  a reference connection wire connected to one of the three U-phase bus bars,
  three connection wires, which are the sixteenth one, the eighteenth one, and the twentieth one from the reference connection wire in a clockwise direction, connected to the common bus bar,
  a connection wire, which is the third one from the reference connection wire in the clockwise direction, connected to one of the three U-phase bus bars,
  two connection wires, which are the fourth one and ninth one from the reference connection wire in the clockwise direction, connected to another one of the U-phase bus bars,
  two connection wires, which are the tenth one and the fifteenth one from the reference connection wire in the clockwise direction, connected to the remaining one of the U-phase bus bars, two connection wires, which are the first one and the fifth one from the reference connection wire in the clockwise direction, connected to one of the three V-phase bus bars, two connection wires, which are the sixth one and eleventh one from the reference connection wire in the clockwise direction, connected to another one of the V-phase bus bars, two connection wires, which are the twelfth one and the seventeenth one from the reference connection wire in the clockwise direction, connected to the remaining one of the V-phase bus bars, two connection wires, which are the second one and the seventh one from the reference connection wire in the clockwise direction, connected to one of the three W-phase bus bars, two connection wires, which are the eighth one and the thirteenth one from the reference connection wire in the clockwise direction, connected to another one of the W-phase bus bars, and two connection wires, which are the fourteenth one and the nineteenth one from the reference connection wire in the clockwise direction, connected to the remaining one of the W-phase bus bars; and the bus bars and the connection wires are configured to Y-connect the twelve coils.

11. A motor comprising:
the stator according to claim 5; and
a rotor arranged inside the stator.

12. A method for manufacturing the stator according to claim 5, comprising the steps of:

preparing the coils arranged along the circumferential direction, wherein the connection wires, which are formed by ends of the coils, extend along the radial direction;

arranging the bus bars at a side of one end of the coils in the axial direction so that the bus bars form a plurality of layers in the direction;

arranging the connection wires on the bus bars so that the connection wires overlap with the bus bars and intersect with the bus bars in the axial direction by bending the ends of the coils; and welding the connection intersection portions in the intersection portions, at which the connection wires and the bus bars intersect, and electrically connecting the connection wires and the bus bars.

13. A method for manufacturing the stator according to claim 5, comprising the steps of:

arranging a plurality of core segments, around which the coils are respectively wound, along the circumferential direction, wherein the core segments are arranged so that ends of the coils, which extend straight along an axial direction of the core segments, are radially arranged inside the core segments;

arranging the bus bars on the ends of the radially arranged coils, wherein the bus bars are arranged so that the bus bars are overlapped with each other in the radial direction to form a plurality of layers and so that the bus bars overlap and intersect the ends of the coils in the axial direction;

welding the connection intersection portions in the intersection portions, at which the ends of the coils and the bus bars intersect, and electrically connecting the ends of the coils, which form the connection wires, and the bus bars; and bending the ends of the coils outside the bus bars in the radial direction to arrange the bus bars at a side of one end of the core segments in the axial direction and connecting the core segments along the circumferential direction to form an annular stator core.

\* \* \* \* \*